(12) United States Patent
Kawata et al.

(10) Patent No.: US 11,035,021 B2
(45) Date of Patent: Jun. 15, 2021

(54) HIGH-STRENGTH STEEL SHEET AND HIGH-STRENGTH GALVANIZED STEEL SHEET

(71) Applicant: NIPPON STEEL & SUMITOMO METAL CORPORATION, Tokyo (JP)

(72) Inventors: Hiroyuki Kawata, Tokyo (JP); Yuji Yamaguchi, Tokyo (JP); Takayuki Kitazawa, Tokyo (JP); Satoshi Uchida, Tokyo (JP); Kohei Ueda, Tokyo (JP); Naoki Maruyama, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 422 days.

(21) Appl. No.: 16/067,393

(22) PCT Filed: Mar. 23, 2017

(86) PCT No.: PCT/JP2017/011883
§ 371 (c)(1),
(2) Date: Jun. 29, 2018

(87) PCT Pub. No.: WO2017/164346
PCT Pub. Date: Sep. 28, 2017

(65) Prior Publication Data
US 2019/0003009 A1    Jan. 3, 2019

(30) Foreign Application Priority Data

Mar. 25, 2016 (JP) .............................. JP2016-062645

(51) Int. Cl.
| | | |
|---|---|---|
| *C21D 9/46* | (2006.01) | |
| *C22C 38/06* | (2006.01) | |
| *C22C 38/58* | (2006.01) | |
| *C23C 2/40* | (2006.01) | |
| *C22C 18/00* | (2006.01) | |
| *C22C 38/12* | (2006.01) | |
| *C25D 5/50* | (2006.01) | |
| *C21D 8/02* | (2006.01) | |
| *C22C 38/14* | (2006.01) | |
| *C22C 38/16* | (2006.01) | |

(Continued)

(52) U.S. Cl.
CPC .............. *C21D 9/46* (2013.01); *B32B 15/013* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C22C 18/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/32* (2013.01); *C22C 38/34* (2013.01); *C22C 38/42* (2013.01); *C22C 38/44* (2013.01); *C22C 38/58* (2013.01); *C23C 2/06* (2013.01); *C23C 2/40* (2013.01); *C25D 3/22* (2013.01); *C25D 5/50* (2013.01); *C25D 7/0614* (2013.01); *C21D 2211/001* (2013.01); *C21D 2211/002* (2013.01); *C21D 2211/003* (2013.01); *C21D 2211/005* (2013.01); *C21D 2211/008* (2013.01); *C21D 2211/009* (2013.01); *C25D 5/36* (2013.01); *Y10T 428/12799* (2015.01)

(58) Field of Classification Search
None
See application file for complete search history.

(56) References Cited

U.S. PATENT DOCUMENTS

| | | | |
|---|---|---|---|
| 9,708,679 B2* | 7/2017 | Kawata | ................. B32B 15/013 |
| 9,988,700 B2* | 6/2018 | Minami | .................... C23C 2/06 |

(Continued)

FOREIGN PATENT DOCUMENTS

| | | |
|---|---|---|
| CN | 103210110 A | 7/2013 |
| EP | 2 738 278 A1 | 6/2014 |

(Continued)

OTHER PUBLICATIONS

Korean Notification of Reasons for Refusal dated Jul. 22, 2019, for corresponding Korean Patent Application No. 10-2018-7018370, with English translation.

(Continued)

*Primary Examiner* — Daniel J. Schleis
(74) *Attorney, Agent, or Firm* — Birch, Stewart, Kolasch & Birch, LLP

(57) ABSTRACT

A high-strength steel sheet includes: a specific chemical composition; and a microstructure represented by, in a ⅛ thickness to ⅜ thickness range with ¼ thickness of a sheet thickness from a surface being a center, in volume fraction, ferrite: 85% or less, bainite: 3% or more and 95% or less, tempered martensite: 1% or more and 80% or less, retained austenite: 1% or more and 25% or less, pearlite and coarse cementite: 5% or less in total, and fresh martensite: 5% or less, in which the solid-solution carbon content in the retained austenite is 0.70 to 1.30 mass %, and to all grain boundaries of retained austenite grains having an aspect ratio of 2.50 or less and a circle-equivalent diameter of 0.80 μm or more, the proportion of interfaces with the tempered martensite or the fresh martensite is 75% or less.

8 Claims, No Drawings

(51) Int. Cl.

| | |
|---|---|
| C23C 2/06 | (2006.01) |
| C22C 38/04 | (2006.01) |
| C22C 38/08 | (2006.01) |
| C22C 38/34 | (2006.01) |
| C25D 7/06 | (2006.01) |
| B32B 15/01 | (2006.01) |
| C21D 6/00 | (2006.01) |
| C22C 38/00 | (2006.01) |
| C22C 38/02 | (2006.01) |
| C22C 38/28 | (2006.01) |
| C22C 38/32 | (2006.01) |
| C22C 38/42 | (2006.01) |
| C22C 38/44 | (2006.01) |
| C25D 3/22 | (2006.01) |
| C25D 5/36 | (2006.01) |

(56) References Cited

U.S. PATENT DOCUMENTS

| | | |
|---|---|---|
| 2011/0036465 A1 | 2/2011 | Kawasaki et al. |
| 2013/0167980 A1 | 7/2013 | Kawata et al. |
| 2013/0236350 A1 | 9/2013 | Kakiuchi et al. |
| 2014/0003990 A1 | 1/2014 | Kou |
| 2014/0162088 A1 | 6/2014 | Kawata et al. |
| 2014/0234660 A1 | 8/2014 | Kawata et al. |
| 2014/0242414 A1 | 8/2014 | Minami et al. |
| 2014/0287263 A1 | 9/2014 | Kawata et al. |
| 2015/0203947 A1 | 7/2015 | Hasegawa et al. |

FOREIGN PATENT DOCUMENTS

| | | |
|---|---|---|
| EP | 2 762 585 A1 | 8/2014 |
| EP | 2 762 603 A1 | 8/2014 |
| JP | 2009-209451 A | 9/2009 |
| JP | 2010-196115 A | 9/2010 |
| JP | 2014-9387 A | 1/2014 |
| JP | 5463685 B2 | 4/2014 |
| KR | 10-2014-0052072 A | 5/2014 |
| WO | WO 2012/036269 A1 | 3/2012 |
| WO | WO 2013/018741 A1 | 2/2013 |
| WO | WO 2013/047739 A1 | 4/2013 |
| WO | WO 2013/047821 A1 | 4/2013 |
| WO | 104508163 A | 4/2015 |

OTHER PUBLICATIONS

International Search Report for PCT/JP2017/011883 dated Jun. 20, 2017.
Written Opinion of the International Searching Authority for PCT/JP2017/011883 (PCT/ISA/237) dated Jun. 20, 2017.
Chinese Office Action and Search Report dated Jul. 24, 2019, for Chinese Patent Application No. 201780005269.0, with English translation.
International Preliminary Report on Patentability and English translation of the Written Opinion of the International Searching Authority (forms PCT/IB/373, PCT/ISA/237 and PCT/IB/338), dated Oct. 4, 2018, for corresponding International Application No. PCT/JP2017/011883.
Extended European Search Report dated Sep. 10, 2019, for corresponding European Patent Application No. 17770386.5.

* cited by examiner

HIGH-STRENGTH STEEL SHEET AND HIGH-STRENGTH GALVANIZED STEEL SHEET

TECHNICAL FIELD

The present invention relates to a high-strength steel sheet and a high-strength galvanized steel sheet.

BACKGROUND ART

In recent years, in a high-strength steel sheet used for automobiles and the like, a demand for further improvement in impact resistance has been increasing. Further, in the high-strength steel sheet used for automobiles and the like, formability such as ductility or hole expandability has also been required in order to obtain a complicated member shape.

For example, a high-strength cold-rolled steel sheet aiming at improvements in ductility and hole expandability has been described in Patent Literature 1, a high-strength steel sheet aiming at improvements in toughness and HAZ toughness has been described in Patent Literature 2, and a high-strength steel sheet aiming at improvements in shape fixability and workability has been described in Patent Literature 3. Further, a high-strength hot-dip galvanized steel sheet aiming at an improvement in bake hardenability while securing ductility has been described in Patent Literature 4, a high-strength hot-dip galvanized steel sheet aiming at an improvement in mechanical cutting property while securing ductility has been described in Patent Literature 5, and a high-strength hot-dip galvanized steel sheet aiming at an improvement in workability has been described in Patent Literature 6.

However, the conventional high-strength steel sheets fail to achieve excellent formability and impact resistance both that are required recently.

CITATION LIST

Patent Literature

Patent Literature 1: Japanese Patent No. 5463685
Patent Literature 2: Japanese Laid-open Patent Publication No. 2014-9387
Patent Literature 3: International Publication Pamphlet No. WO2013/018741
Patent Literature 4: International Publication Pamphlet No. WO2013/047821
Patent Literature 5: International Publication Pamphlet No. WO2013/047739
Patent Literature 6: Japanese Laid-open Patent Publication No. 2009-209451

SUMMARY OF INVENTION

Technical Problem

An object of the present invention is to provide a high-strength steel sheet and a high-strength galvanized steel sheet that are capable of obtaining excellent formability and impact resistance.

Solution to Problem

The present inventors conducted earnest examination in order to solve the above-described problems. As a result, it became clear that it is important to arrange coarse retained austenite, which becomes a starting point of destruction, so as not to be adjacent to tempered martensite and fresh martensite as much as possible, as well as to make a chemical composition and volume fractions of a microstructure appropriate. Further, it became clear that suppression of uneven arrangement of Mn in a manufacturing process is extremely important for control of such an arrangement of retained austenite, tempered martensite, and fresh martensite.

In general, in order to control the volume fractions of a microstructure of a high-strength steel sheet, a parent phase is composed of austenite grains during retention at around the maximum heating temperature of annealing after cold rolling, and cooling conditions thereafter and the like are adjusted. In a region where Mn is arranged unevenly, the austenite grains become coarse during retention, to obtain a structure in which coarse retained austenite and fresh martensite mixedly exist adjacently to each other during cooling. In tempering after annealing, almost the whole of the fresh martensite turns into tempered martensite, but the arrangement in the structure does not change in the tempering, so that in a microstructure after the tempering, the coarse retained austenite and the tempered martensite or the fresh martensite mixedly exist adjacently to each other. For example, the coarse retained austenite exists so as to be surrounded by the tempered martensite. In the high-strength steel sheet having such a microstructure, destruction starting from an interface between the coarse retained austenite and the tempered martensite or the fresh martensite is likely to occur.

Conventionally, conditions of the annealing and conditions of the tempering have been proposed in order to make the chemical composition and the volume fractions of the microstructure appropriate, but only adjustment of these conditions fails to control the uneven arrangement of Mn because the uneven arrangement of Mn progresses with a phase transformation at relatively high temperature. As a result that the present inventors conducted earnest examination in order to suppress the uneven arrangement of Mn, they found out that the uneven arrangement of Mn can be suppressed in a cooling process of hot rolling and a heating process of annealing, and the suppression of the uneven arrangement of Mn enables the parent phase to be composed of finely and homogeneously dispersed austenite grains during retention at around the maximum heating temperature. The parent phase is composed of finely and homogeneously dispersed austenite grains, and thereby the retained austenite and the tempered martensite or the fresh martensite are separated from each other by bainite, ferrite, and the like to make it difficult for the retained austenite to be adjacent to the tempered martensite or the fresh martensite after a phase transformation caused by cooling. Even when the retained austenite surrounded by the tempered martensite exists, the retained austenite does not easily become a starting point of destruction because of being fine. The present inventors devised the following various aspects of the invention based on such findings.

(1)

A high-strength steel sheet includes: a chemical composition represented by, in mass %,
C: 0.075 to 0.400%,
Si: 0.01 to 2.50%,
Mn: 0.50 to 3.50%,
P: 0.1000% or less,
S: 0.0100% or less,
Al: 2.000% or less, N: 0.0100% or less,
O: 0.0100% or less,
Ti: 0.000 to 0.200%,
Nb: 0.000 to 0.100%,
V: 0.000 to 0.500%,
Cr: 0.00 to 2.00%,
Ni: 0.00 to 2.00%,
Cu: 0.00 to 2.00%,
Mo: 0.00 to 1.00%,
B: 0.0000 to 0.0100%,
W: 0.00 to 2.00%,
one type or two types or more selected from the group consisting of Ca, Ce, Mg, Zr, La, and REM: 0.0000 to 0.0100% in total,
a balance: Fe and impurities, and
a parameter Q0 expressed by (Expression 1): 0.35 or more; and
a microstructure represented by, in a ⅛ thickness to ⅜ thickness range with ¼ thickness of a sheet thickness from a surface being a middle, in volume fraction,
ferrite: 85% or less,
bainite: 3% or more and 95% or less,
tempered martensite: 1% or more and 80% or less,
retained austenite: 1% or more and 25% or less,
pearlite and coarse cementite: 5% or less in total, and
fresh martensite: 5% or less, in which
a solid-solution carbon content in the retained austenite is 0.70 to 1.30 mass %,
in all grain boundaries of retained austenite grains having an aspect ratio of 2.50 or less and a circle-equivalent diameter of 0.80 μm or more, a proportion of interfaces with the tempered martensite or the fresh martensite is 75% or less.

$$Q0=Si+0.1Mn+0.6Al \qquad \text{(Expression 1)}$$

(In (Expression 1), Si, Mn, and Al are set to the contents of the respective elements in mass %).

(2)
The high-strength steel sheet according to (1), further contains, in mass %, one type or two types or more selected from the group consisting of
Ti: 0.001 to 0.200%,
Nb: 0.001 to 0.100%, and
V: 0.001 to 0.500%.

(3)
The high-strength steel sheet according to (1) or (2), further contains, in mass %, one type or two types or more selected from the group consisting of
Cr: 0.01 to 2.00%,
Ni: 0.01 to 2.00%,
Cu: 0.01 to 2.00%,
Mo: 0.01 to 1.00%,
B: 0.0001 to 0.0100%, and
W: 0.01 to 2.00%.

(4)
The high-strength steel sheet according to any one of (1) to (3), further contains, in mass %, 0.0001 to 0.0100% in total of one type or two types or more selected from the group consisting of Ca, Ce, Mg, Zr, La, and REM.

(5)
The high-strength steel sheet according to any one of (1) to (4), in which
a density of the retained austenite grains having an aspect ratio of 2.50 or less and a circle-equivalent diameter of 0.80 μm or more is $5.0 \times 10^{10}$ piece/m² or less.

(6)
A high-strength galvanized steel sheet, includes: a galvanized layer formed on a surface of the high-strength steel sheet according to any one of (1) to (5).

(7)
The high-strength galvanized steel sheet according to (6), in which an Fe content in the galvanized layer is 3.0 mass % or less.

(8)
The high-strength galvanized steel sheet according to (6), in which an Fe content in the galvanized layer is 7.0 mass % or more and 13.0 mass % or less.

Advantageous Effects of Invention

According to the present invention, it is possible to obtain excellent formability and impact resistance because the relationship between retained austenite and tempered martensite or fresh martensite and the like are appropriate.

DESCRIPTION OF EMBODIMENTS

Hereinafter, there will be explained embodiments of the present invention.

First Embodiment

First, there will be explained a chemical composition of a high-strength steel sheet according to a first embodiment of the present invention. Although details will be described later, the high-strength steel sheet according to the first embodiment is manufactured by going through a hot rolling step, a pickling step, a cold rolling step, an annealing step, a bainite transformation step, a martensite transformation step, and a tempering step. Thus, the chemical composition of the high-strength steel sheet is suitable for not only properties of the high-strength steel sheet but also these processes. In the following explanation, "%" being the unit of the content of each element contained in the high-strength steel sheet means "mass %" unless otherwise noted. The high-strength steel sheet according to this embodiment includes a chemical composition represented by, in mass %, C: 0.075 to 0.400%, Si: 0.01 to 2.50%, Mn: 0.50 to 3.50%, P: 0.1000% or less, S: 0.0100% or less, Al: 2.000% or less, N: 0.0100% or less, O: 0.0100% or less, Ti: 0.000 to 0.200%, Nb: 0.000 to 0.100%, V: 0.000 to 0.500%, Cr: 0.00 to 2.00%, Ni: 0.00 to 2.00%, Cu: 0.00 to 2.00%, Mo: 0.00 to 1.00%, B: 0.0000 to 0.0100%, W: 0.00 to 2.00%, one type or two types or more selected from the group consisting of Ca, Ce, Mg, Zr, La, and rare earth metal (REM): 0.0000 to 0.0100% in total, a balance: Fe and impurities, and a parameter Q0 expressed by (Expression 1): 0.35 or more. Examples of the impurities include ones contained in raw materials such as ore and scrap and ones contained in a manufacturing step.

$$Q0=Si+0.1Mn+0.6Al \qquad \text{(Expression 1)}$$

(In (Expression 1), Si, Mn, and Al are the contents of the respective elements in mass %).

(C: 0.075 to 0.400%)
C stabilizes austenite to obtain retained austenite, to thereby increase strength and formability. When the C content is less than 0.075%, it is impossible to obtain the retained austenite and it is difficult to secure sufficient strength and formability. Thus, the C content is 0.075% or more. In order to obtain more excellent strength and formability, the C content is preferably 0.090% or more and more preferably 0.100% or more. On the other hand, when the C content is greater than 0.400%, spot weldability deteriorates greatly. Thus, the C content is 0.400% or less. In order to obtain good spot weldability, the C content is preferably 0.320% or less and more preferably 0.250% or less.

(Si: 0.01 to 2.50%)

Si suppresses generation of iron-based carbide in the steel sheet, to thereby stabilize the retained austenite and increase strength and formability. When the Si content is less than 0.01%, a large amount of coarse iron-based carbide is generated in the bainite transformation step, leading to deterioration in strength and formability. Thus, the Si content is 0.01% or more. In order to obtain more excellent strength and formability, the Si content is preferably 0.10% or more and more preferably 0.25% or more. On the other hand, Si embrittles the steel and reduces impact resistance of the steel sheet. When the Si content is greater than 2.50%, the embrittlement is prominent and a trouble such as cracking of a cast slab is likely to occur. Thus, the Si content is 2.50% or less. In order to obtain good impact resistance, the Si content is preferably 2.25% or less and more preferably 2.00% or less.

(Mn: 0.50 to 3.50%)

Mn increases hardenability of the steel sheet to increase the strength. When the Mn content is less than 0.50%, a large amount of soft structure is formed during cooling after annealing, and thus it is difficult to secure a sufficiently high maximum tensile strength. Thus, the Mn content is 0.50% or more. In order to obtain a higher strength, the Mn content is preferably 0.80% or more and more preferably 1.00% or more. On the other hand, Mn embrittles the steel and deteriorates spot weldability. When the Mn content is greater than 3.50%, a coarse Mn concentrated portion is generated in a sheet thickness center portion of the steel sheet and the embrittlement is likely to occur, resulting in that a trouble such as cracking of a cast slab is likely to occur. Thus, the Mn content is 3.50% or less. In order to obtain good spot weldability, the Mn content is preferably 3.20% or less and more preferably 3.00% or less.

(P: 0.1000% or Less)

P is not an essential element, and is contained in the steel, for example, as an impurity. P makes the steel brittle and makes a welded portion generated by spot welding brittle, and thus the lower the P content is, the better it is. When the P content is greater than 0.1000%, the embrittlement is prominent and a trouble such as cracking of a slab is likely to occur. Thus, the P content is 0.1000% or less. In order to obtain an excellent welded joint strength by suppressing the embrittlement of the welded portion, the P content is preferably 0.0400% or less and more preferably 0.0200% or less. Reducing the P content is expensive, and when the P content is tried to be reduced down to less than 0.0001%, the cost increases greatly. Therefore, the P content may be 0.0001% or more, and is preferably 0.0010% or more in view of cost.

(S: 0.0100% or Less)

S is not an essential element, and is contained in the steel, for example, as an impurity. S couples with Mn to form coarse MnS to then reduce formability such as ductility, hole expandability, stretch flangeability, or bendability and deteriorate spot weldability, and thus the lower the S content is, the better it is. When the S content is greater than 0.0100%, the reduction in formability is prominent. Thus, the S content is 0.0100% or less. In order to obtain good spot weldability, the S content is preferably 0.0070% or less, and more preferably 0.0050% or less. Reducing the S content is expensive, and when the S content is tried to be reduced down to less than 0.0001%, the cost increases greatly. Therefore, the S content may be 0.0001% or more, and is preferably 0.0003% or more and more preferably 0.0006% or more in view of cost.

(Al: 2.000% or Less)

Al makes the steel brittle and deteriorates spot weldability, and thus the lower the Al content is, the better it is. When the Al content is greater than 2.000%, the embrittlement is prominent and a trouble such as cracking of a slab is likely to occur. Thus, the Al content is 2.000% or less. In order to obtain good spot weldability, the Al content is preferably 1.500% or less and more preferably 1.300% or less. Reducing the Al content is expensive, and when the Al content is tried to be reduced down to less than 0.001%, the cost increases greatly. Therefore, the Al content may be 0.001% or more. Al is effective as a deoxidizing material, and in order to sufficiently obtain the effect of deoxidation, the Al content is preferably 0.010% or more. Al suppresses generation of coarse carbide, and thus may be contained for the purpose of stabilizing the retained austenite. In order to stabilize the retained austenite, the Al content is preferably 0.100% or more and more preferably 0.250% or more.

(N: 0.0100% or Less)

N is not an essential element, and is contained in the steel, for example, as an impurity. N forms coarse nitrides to reduce formability such as ductility, hole expandability, stretch flangeability, or bendability and cause blowholes at the time of welding, and thus the lower the N content is, the better it is. When the N content is greater than 0.0100%, the deterioration in formability is prominent. Thus, the N content is 0.0100% or less. In order to more securely suppress the blowholes, the N content is preferably 0.0075% or less, and more preferably 0.0060% or less. Reducing the N content is expensive, and when the N content is tried to be reduced down to less than 0.0001%, the cost increases greatly. Therefore, the N content may be 0.0001% or more, and is preferably 0.0003% or more and more preferably 0.0005% or more in view of cost.

(O: 0.0100% or Less)

O is not an essential element, and is contained in the steel, for example, as an impurity. O forms oxides to reduce formability such as ductility, hole expandability, stretch flangeability, or bendability, and thus the lower the O content is, the better it is. When the O content is greater than 0.0100%, the deterioration in formability is prominent. Thus, the O content is 0.0100% or less, preferably 0.0050% or less, and more preferably 0.0030% or less. Reducing the O content is expensive, and when the O content is tried to be reduced down to less than 0.0001%, the cost increases greatly. Therefore, the O content may be 0.0001% or more.

(Parameter Q0: 0.35 or More)

Although details will be described later, there is a concern that during a heat treatment in the annealing step after the martensite transformation step, the retained austenite decomposes into bainite, pearlite, or coarse cementite. Si, Mn, and Al are elements particularly important for suppressing the decomposition of the retained austenite to increase formability, and when the parameter Q0 expressed by (Expression 1) is less than 0.35, it is impossible to obtain the above-described effect. Thus, the parameter Q0 is set to 0.35 or more, preferably set to 0.60 or more, and more preferably set to 0.80 or more.

$$Q0 = Si + 0.1Mn + 0.6Al \quad \text{(Expression 1)}$$

(In (Expression 1), Si, Mn, and Al are the contents of the respective elements in mass %).

Ti, Nb, V, Cr, Ni, Cu, Mo, B, W, Ca, Ce, Mg, Zr, La, and REM are not essential elements, but are arbitrary elements that may be appropriately contained, up to a predetermined amount as a limit, in the high-strength steel sheet.

(Ti: 0.000 to 0.200%)

Ti contributes to strength increase of the steel sheet by precipitate strengthening, fine grain strengthening by growth suppression of ferrite crystal grains, and dislocation strengthening through suppression of recrystallization. A desired purpose is achieved unless Ti is contained, but in order to sufficiently obtain these effects, the Ti content is preferably 0.001% or more and more preferably 0.010% or more. However, when the Ti content is greater than 0.200%, a carbonitride of Ti precipitates excessively, leading to deterioration in formability in some cases. Therefore, the Ti content is 0.200% or less. In view of formability, the Ti content is preferably 0.120% or less.

(Nb: 0.000 to 0.100%)

Nb contributes to strength increase of the steel sheet by precipitate strengthening, fine grain strengthening by growth suppression of ferrite crystal grains, and dislocation strengthening through suppression of recrystallization. A desired purpose is achieved unless Nb is contained, but in order to sufficiently obtain these effects, the Nb content is preferably 0.001% or more and more preferably 0.005% or more. However, when the Nb content is greater than 0.100%, a carbonitride of Nb precipitates excessively, leading to deterioration in formability in some cases. Therefore, the Nb content is 0.100% or less. In view of formability, the Nb content is preferably 0.060% or less.

(V: 0.000 to 0.500%)

V contributes to strength increase of the steel sheet by precipitate strengthening, fine grain strengthening by growth suppression of ferrite crystal grains, and dislocation strengthening through suppression of recrystallization. A desired purpose is achieved unless V is contained, but in order to sufficiently obtain these effects, the V content is preferably 0.001% or more and more preferably 0.010% or more. However, when the V content is greater than 0.500%, a carbonitride of V precipitates excessively, leading to deterioration in formability in some cases. Therefore, the V content is 0.500% or less and more preferably 0.350% or less.

(Cr: 0.00 to 2.00%)

Cr increases hardenability and is effective for increasing strength. A desired purpose is achieved unless Cr is contained, but in order to sufficiently obtain these effects, the Cr content is preferably 0.01% or more and more preferably 0.10% or more. However, when the Cr content is greater than 2.00%, workability in hot working is impaired, leading to a decrease in productivity in some cases. Therefore, the Cr content is 2.00% or less and more preferably 1.20% or less.

(Ni: 0.00 to 2.00%)

Ni suppresses phase transformation at high temperature and is effective for increasing strength. A desired purpose is achieved unless Ni is contained, but in order to sufficiently obtain these effects, the Ni content is preferably 0.01% or more and more preferably 0.10% or more. However, when the Ni content is greater than 2.00%, weldability is sometimes impaired. Therefore, the Ni content is 2.00% or less and preferably 1.20% or less.

(Cu: 0.00 to 2.00%)

Cu exists as fine grains in the steel, to thus increase strength. A desired purpose is achieved unless Cu is contained, but in order to sufficiently obtain these effects, the Cu content is preferably 0.01% or more and more preferably 0.10% or more. However, when the Cu content is greater than 2.00%, weldability is sometimes impaired. Therefore, the Cu content is 2.00% or less and preferably 1.20% or less.

(Mo: 0.00 to 1.00%)

Mo suppresses phase transformation at high temperature and is effective for increasing strength. A desired purpose is achieved unless Mo is contained, but in order to sufficiently obtain these effects, the Mo content is preferably 0.01% or more and more preferably 0.05% or more. However, when the Mo content is greater than 1.00%, workability in hot working is impaired, leading to a decrease in productivity in some cases. Therefore, the Mo content is 1.00% or less and more preferably 0.50% or less.

(B: 0.0000 to 0.0100%)

B suppresses phase transformation at high temperature and is effective for increasing strength. A desired purpose is achieved unless B is contained, but in order to sufficiently obtain these effects, the B content is preferably 0.0001% or more and more preferably 0.0005% or more. However, when the B content is greater than 0.0100%, workability in hot working is impaired, leading to a decrease in productivity in some cases. Therefore, the B content is 0.0100% or less and more preferably 0.0050% or less.

(W: 0.00 to 2.00%)

W suppresses phase transformation at high temperature and is effective for increasing strength. A desired purpose is achieved unless W is contained, but in order to sufficiently obtain these effects, the W content is preferably 0.01% or more and more preferably 0.10% or more. However, when the W content is greater than 2.00%, workability in hot working is impaired, leading to a decrease in productivity in some cases. Therefore, the W content is 2.00% or less and more preferably 1.20% or less.

(One type or two types or more selected from the group consisting of Ca, Ce, Mg, Zr, la, and REM: 0.0000 to 0.0100% in total)

REM refers to an element belonging to the lanthanoid series. For example, REM or Ce is added in misch metal, and sometimes contains elements of the lanthanoid series other than La and Ce in a complex form. The effects of the present invention are exhibited even when elements of the lanthanoid series other than La and Ce are contained. The effects of the present invention are exhibited even when metals La and Ce are contained.

Ca, Ce, Mg, Zr, La, and REM are effective for an improvement in formability. A desired purpose is achieved unless Ca, Ce, Mg, Zr, La, and REM are contained, but in order to sufficiently obtain these effects, the total content of Ca, Ce, Mg, Zr, La, and REM is preferably 0.0001% or more and more preferably 0.0010% or more. However, when the total content of Ca, Ce, Mg, Zr, La, and REM is greater than 0.0100%, ductility is liable to be impaired. Therefore, the total content of Ca, Ce, Mg, Zr, La, and REM is 0.0100% or less and preferably 0.0070% or less.

As the impurities, 0.0100% or less in total of H, Na, Cl, Sc, Co, Zn, Ga, Ge, As, Se, Y, Zr, Tc, Ru, Rh, Pd, Ag, Cd, In, Sn, Sb, Te, Cs, Hf, Ta, Re, Os, Ir, Pt, Au, and Pb is allowed to be contained.

Next, there will be explained a microstructure of the high-strength steel sheet according to the first embodiment. The high-strength steel sheet according to this embodiment includes a microstructure represented by, in a ⅛ thickness to ⅜ thickness range with ¼ thickness of a sheet thickness from a surface being a center, in volume fraction, ferrite: 85% or less, bainite: 3% or more and 95% or less, tempered martensite: 1% or more and 80% or less, retained austenite: 1% or more and 25% or less, pearlite and coarse cementite: 5% or less in total, and fresh martensite: 5% or less.

(Ferrite: 85% or Less)

Ferrite has excellent ductility. However, the ferrite has low strength, and thus when the volume fraction of the ferrite is greater than 85%, it is impossible to obtain a sufficient maximum tensile strength. Therefore, the volume fraction of the ferrite is 85% or less. In order to obtain a higher maximum tensile strength, the volume fraction of the ferrite is preferably 75% or less and more preferably 65% or less. A desired purpose is achieved unless the ferrite is contained, but in order to obtain good ductility, the volume fraction of the ferrite is preferably 5% or more and more preferably 10% or more.

(Bainite: 3% or More and 95% or Less)

Bainite is a structure excellent in balance between strength and formability. When the volume fraction of the bainite is less than 3%, it is impossible to obtain a good balance between strength and formability. Thus, the volume fraction of the bainite is 3% or more. The volume fraction of the retained austenite increases with generation of the bainite, and thus the volume fraction of the bainite is 7% or more and more preferably 10% or more. On the other hand, when the volume fraction of the bainite is greater than 95%, it becomes difficult to secure both the tempered martensite and the retained austenite, to thus fail to obtain a good balance between strength and formability. Therefore, the volume fraction of the bainite is 95% or less, and in order to obtain a more excellent balance between strength and formability, the volume fraction of the bainite is 85% or less and more preferably 75% or less.

Incidentally, the bainite in the present invention includes bainitic ferrite made of lath-shaped body-centered cubic (bcc) crystals and not containing iron-based carbides, granular bainite made of fine bcc crystals and coarse iron-based carbides, upper bainite made of lath-shaped bcc crystals and coarse iron-based carbides, and lower bainite made of plate-shaped bcc crystals and fine iron-based carbides aligned in parallel thereinside.

(Tempered Martensite: 1% or More and 80% or Less)

Tempered martensite greatly improves tensile strength of the steel sheet without impairing impact resistance. When the volume fraction of the tempered martensite is less than 1%, it is impossible to obtain a sufficient tensile strength. Thus, the volume fraction of the tempered martensite is 1% or more. In order to obtain a higher tensile strength, the volume fraction of the tempered martensite is preferably 5% or more and more preferably 10% or more. On the other hand, when the volume fraction of the tempered martensite is greater than 80%, interfaces between the tempered martensite and the retained austenite increase excessively, leading to deterioration in impact resistance. Thus, the volume fraction of the tempered martensite is 80% or less. In order to obtain more excellent impact resistance, the volume fraction of the tempered martensite is 73% or less and more preferably 65% or less.

(Retained Austenite: 1% or More and 25% or Less)

Retained austenite increases a balance between strength and ductility. When the volume fraction of the retained austenite is less than 1%, it is impossible to obtain a good balance between strength and ductility. Thus, the volume fraction of the retained austenite is 1% or more. In order to obtain good formability, the volume fraction of the retained austenite is 2.5% or more and more preferably 4% or more. On the other hand, in order to obtain greater than 25% of the volume fraction of the retained austenite, C of the degree to which weldability is impaired greatly is needed. Therefore, the volume fraction of the retained austenite is 25% or less. The retained austenite is transformed into hard martensite by receiving an impact, to work as a starting point of destruction. When the volume fraction of the retained austenite is greater than 21%, the martensite transformation is likely to occur. Thus, the volume fraction of the retained austenite is preferably 21% or less and more preferably 17% or less.

As the solid-solution carbon content in the retained austenite is higher, stability of the retained austenite is higher, resulting in that excellent impact resistance can be obtained. When the solid-solution carbon content in the retained austenite is less than 0.70 mass %, it is impossible to sufficiently obtain this effect. Thus, the solid-solution carbon content in the retained austenite is 0.70 mass % or more. The solid-solution carbon content in the retained austenite is preferably 0.77 mass % or more and more preferably 0.84 mass % or more. On the other hand, when the solid-solution carbon content in the retained austenite increases excessively, the transformation from the retained austenite into the martensite caused by a tensile deformation does not sufficiently progress, and work hardening ability decreases on the contrary in some cases. When the solid-solution carbon content in the retained austenite is greater than 1.30 mass %, it is impossible to obtain sufficient work hardening ability. Thus, the solid-solution carbon content in the retained austenite is 1.30 mass % or less, preferably 1.20 mass % or less, and more preferably 1.10 mass % or less.

Retained austenite grains having an aspect ratio of 2.50 or less and a circle-equivalent diameter of 0.80 μm or more are transformed into hard martensite by receiving an impact to easily work as a starting point of destruction. Particularly, in the vicinity of an interface between the retained austenite grains corresponding to the above and the tempered martensite or the fresh martensite, the retained austenite is bound by the hard tempered martensite or the fresh martensite, and on the retained austenite side, a high strain is caused with deformation, and the retained austenite is transformed into martensite easily. Therefore, the interface between the retained austenite and the tempered martensite or the fresh martensite peels off and destruction is likely to occur.

Then, when to all grain boundaries of the retained austenite grains having an aspect ratio of 2.50 or less and a circle-equivalent diameter of 0.80 μm or more, the proportion of interfaces with the tempered martensite or the fresh martensite, namely the proportion of portions in contact with the tempered martensite or the fresh martensite is greater than 75%, the destruction caused by destruction of the interface is prominent. Thus, in this embodiment, this proportion is 75% or less. In this embodiment, this proportion is 75% or less, so that it is possible to suppress the destruction starting from the above-described retained austenite grains and increase the impact resistance. In order to obtain more excellent impact resistance, this proportion is preferably 60% or less and more preferably 40% or less.

The coarse retained austenite grains to be a starting point of destruction are reduced, and thereby the impact resistance further improves. From this view, the density of the retained austenite grains having an aspect ratio of 2.50 or less and a circle-equivalent diameter of 0.80 μm or more is preferably $5.0 \times 10^{10}$ piece/m$^2$ or less and more preferably $3.0 \times 10^{10}$ piece/m$^2$ or less.

(Fresh Martensite: 5% or Less)

Fresh martensite greatly improves tensile strength, but becomes a starting point of destruction, leading to deterioration in impact resistance. When the volume fraction of the fresh martensite is greater than 5%, the deterioration in impact resistance is prominent. Therefore, the volume fraction of the fresh martensite is 5% or less. In order to obtain excellent impact resistance, the volume fraction of the fresh martensite is preferably 1% or less and more preferably 0%.

(Pearlite and Coarse Cementite: 5% or Less in Total)

Pearlite and coarse cementite deteriorate ductility. When the volume fraction of the pearlite and the coarse cementite is greater than 5% in total, the deterioration in ductility is prominent. Therefore, the volume fraction of the pearlite and the coarse cementite is 5% or less in total. Here, in this embodiment, the coarse cementite means cementite having a circle-equivalent diameter of 1.0 μm or more. An electron microscope observation makes it possible to measure the circle-equivalent diameter of the cementite easily and judge whether or not this cementite is coarse.

The volume fractions of the ferrite, the bainite, the tempered martensite, the fresh martensite, the pearlite, and the coarse cementite can be measured by using the following method. A sample is taken from an observation surface that is a thicknesswise cross section parallel to the rolling direction of the steel sheet, the observation surface is polished and nital etched, and the ⅛ thickness to ⅜ thickness range with ¼ thickness of the sheet thickness from the surface being a center is observed with a field emission scanning electron microscope (FE-SEM) and area fractions are measured, which can be assumed as the volume fractions.

The volume fraction of the retained austenite is evaluated by an X-ray diffraction method. In the ⅛ thickness to ⅜ thickness range of the sheet thickness from the surface, a surface parallel to the sheet surface is mirror-finished and an area fraction of fcc iron is measured by the X-ray diffraction method, which can be assumed as the volume fraction of the retained austenite.

The solid-solution carbon content (Cγ [mass %]) in the retained austenite can be found by using the following expression after an X-ray diffraction test is performed under the same condition as that of the volume fraction measurement of the retained austenite and an average lattice constant a [nm] of the retained austenite is found.

$$C\gamma=2.264\times10^2\times(a-0.3556)$$

The aspect ratio, the circle-equivalent diameter, and the interfaces of the retained austenite grains are evaluated by performing a high-resolution crystal orientation analysis by a transmission EBSD method (electron back scattering diffraction method) by using a FE-SEM. In the ⅛ thickness to ⅜ thickness range of the sheet thickness, a thin piece parallel to the sheet surface is cut out, the thin piece is subjected to mechanical polishing and electrolytic polishing, and a periphery around a hole made in the thin piece is observed, thereby making it possible to accurately observe the fine retained austenite grains. Incidentally, "OIM Analysis 6.0" manufactured by TSL Corporation can be used for analysis of data obtained by the transmission EBSD method. The observation by the transmission EBSD method is performed by five or more regions each having a size of $2.0\times10^{-10}$ m$^2$ or more being set in the above-described thin piece. From results of the observation, the region judged as the fcc iron is set as the retained austenite.

There will be explained methods of obtaining the aspect ratio and the circle-equivalent diameter of the retained austenite grains. First, only the fcc iron is extracted from measured crystal orientations to draw a crystal orientation map. A boundary generating a crystal misorientation of 10° or more is assumed as a crystal grain boundary. The aspect ratio is set to a value obtained by dividing a major axis length of a grain by a minor axis length thereof. The circle-equivalent diameter is obtained by an area being found from the number of measurement points contained in each grain and multiplying the area by 4/it to find the square root of the resultant.

There will be explained a method of finding the proportion of interfaces with the tempered martensite or the fresh martensite to the grain boundaries of the retained austenite grains. First, with respect to data obtained from the bcc iron, a grain boundary generating a crystal misorientation of 4° or more is set as a crystal grain boundary, and "Grain Average Fit" being an index representing strain of a crystal lattice in each crystal grain is calculated.

A grain high in Grain Average Fit is the tempered martensite or the fresh martensite. In response to the sum StM+SfM [%] of an area fraction StM [%] of the tempered martensite and an area fraction SfM [%] of the fresh martensite, which are obtained by the observation using the FE-SEM, a histogram with Grain Average Fit set as the horizontal axis and the vertical axis set to the area of each crystal grain is created. Then, a portion corresponding to StM+SfM [%] from the side of Grain Average Fit being high is regarded as the tempered martensite or the fresh martensite.

On the crystal orientation map of the retained austenite, the boundary generating a crystal misorientation of 4° is drawn as the crystal grain boundary, and further on the same map, the region regarded as the tempered martensite or the fresh martensite is displayed, thereby finding a configuration of the retained austenite, the tempered martensite, and the fresh martensite. Then, this configuration makes it possible to find the proportion of the interfaces with the tempered martensite or the fresh martensite to all the grain boundaries of the retained austenite grains having an aspect ratio of 2.50 or less and a circle-equivalent diameter of 0.80 μm or more.

The sheet thickness of the high-strength steel sheet in this embodiment is not limited, but is preferably 0.4 mm or more and 5.0 mm or less. When the sheet thickness is less than 0.4 mm, it is sometimes difficult to keep the shape of the steel sheet even. When the sheet thickness is greater than 5.0 mm, it is sometimes difficult to control heating conditions and cooling conditions in a manufacturing process, failing to obtain a predetermined microstructure.

Second Embodiment

First, there will be explained a high-strength galvanized steel sheet according to a second embodiment of the present invention. The high-strength galvanized steel sheet according to this embodiment includes the high-strength steel sheet according to the first embodiment and a galvanized layer formed on a surface thereof. The galvanized layer is a hot-dip galvanized layer or an alloyed galvanized layer, for example. The galvanized layer may be an electrogalvanized layer.

In the case of the hot-dip galvanized layer being used, in order to increase adhesion between the surface of the high-strength steel sheet and the hot-dip galvanized layer, the Fe content in the hot-dip galvanized layer is preferably 3.0 mass % or less. Further, as the Al content in the hot-dip galvanized layer is higher, the adhesion between the surface of the high-strength steel sheet and the hot-dip galvanized layer is more likely to deteriorate, and when the Al content is greater than 0.5 mass %, the deterioration in adhesion is prominent. Thus, the Al content in the hot-dip galvanized layer is preferably 0.5 mass % or less.

In the case of the alloyed galvanized layer being used, in order to increase adhesion between the surface of the high-strength steel sheet and the alloyed galvanized layer, the Fe content in the alloyed galvanized layer is preferably 7.0 mass % or more and 13.0 mass % or less.

The galvanized layer may contain one type or two types or more selected from the group consisting of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM. There is sometimes a preferred case that corrosion resistance or workability of the galvanized layer improves, or the like depending on the content of each element.

The Fe content and the Al content in the galvanized layer can be measured by the following method. First, a galvanized steel sheet having predetermined dimensions is immersed in a hydrochloric acid having a concentration of 3 to 10% at room temperature to which an inhibitor has been added to dissolve a galvanized layer. Next, a solution in which the galvanized layer has been dissolved is diluted, concentrations of Zn, Al, and Fe in the diluted solution are analyzed by an inductively coupled plasma (ICP) method, to then find a mass ratio of Zn, Al, and Fe in the galvanized layer. Thereafter, from the mass ratio of Zn, Al, and Fe in the galvanized layer, the Fe content and the Al content in the galvanized layer are calculated. As the inhibitor, it is only necessary to use hexamethylenetetramine defined in JIS K 8847, for example.

Next, there will be explained a method of manufacturing the high-strength steel sheet according to the first embodiment. This manufacturing method includes a hot rolling step, a pickling step, a cold rolling step, an annealing step, a bainite transformation step, a martensite transformation step, and a tempering step, and may include a softening annealing step. This manufacturing method is preferably applied to manufacture of a high-strength steel sheet having a sheet thickness of 0.4 mm or more and 5.0 mm or less. When the sheet thickness is less than 0.4 mm, it sometimes becomes difficult to keep the shape of the steel sheet even. When the sheet thickness is greater than 5.0 mm, it sometimes becomes difficult to control heating conditions and cooling conditions in a manufacturing process, failing to obtain a predetermined microstructure.

In order to manufacture the high-strength steel sheet according to the first embodiment, a slab having the above-described chemical composition is first cast. For the slab to be subjected to hot rolling, a continuously cast slab or one manufactured by a thin slab caster or the like can be used. The cast slab may be once cooled down to ordinary temperature, but is more preferably subjected to hot rolling directly in a high-temperature state because it is possible to reduce energy necessary for heating.

(Hot Rolling Step)

In the hot rolling step, when a heating temperature of the slab is less than 1080° C., coarse inclusions arising from the casting remain unmelted, and there is a possibility that the steel sheet fractures after hot rolling. Therefore, the heating temperature of the slab is set to 1080° C. or more, and preferably set to 1150° C. or more. The upper limit of the heating temperature of the slab is not limited in particular, but heating over 1300° C. needs a large amount of energy, and thus it is preferably set to 1300° C. or less.

When a completing temperature of the hot rolling is less than 850° C., a rolling reaction force increases, thereby making it difficult to stably obtain a desired sheet thickness. Therefore, the completing temperature of the hot rolling is set to 850° C. or more. In view of rolling reaction force, the completing temperature of the hot rolling is preferably set to 870° C. or more. On the other hand, in order to increase the completing temperature of the hot rolling to greater than 1020° C., an apparatus to heat the steel sheet is required between finish of the slab heating and completion of the hot rolling, to require a high cost. Therefore, the completing temperature of the hot rolling is set to 1020° C. or less. Further, when the completing temperature of the hot rolling is too high, the shape of the steel sheet is deformed in a cooling process thereafter and a shape correction process is required after cooling is completed in some cases, and thus it is not preferred in view of cost. Therefore, the completing temperature of the hot rolling is preferably set to 1000° C. or less and more preferably set to 980° C. or less.

When an average cooling rate in a range of 850° C. to 700° C. is less than 8.0° C./second between completion of the hot rolling and coiling, coarse ferrite is generated, Mn segregation increases, and a microstructure in which hard structures are arranged unevenly is made. As a result, the possibility that the retained austenite comes into contact with the tempered martensite or the fresh martensite in the high-strength steel sheet increases excessively. Therefore, in this method, the average cooling rate in the range of 850° C. to 700° C. is set to 8.0° C./second or more. In order to prevent the retained austenite and the tempered martensite in the high-strength steel sheet from being adjacent to each other and increase the impact resistance of the steel sheet, the average cooling rate in the range of 850° C. to 700° C. is preferably set to 12.0° C./second or more and more preferably set to 16.0° C./second or more. It is possible to manufacture the high-strength steel sheet according to the first embodiment without limiting the upper limit of the average cooling rate in the range of 850° C. to 700° C.

When a temperature at which a hot-rolled steel sheet is coiled as a coil (coiling temperature) $T_c$ is greater than 700° C., the phase transformation progresses at high temperature during slow cooling down to room temperature after coiling, coarse ferrite is generated, Mn segregation increases, and a microstructure in which hard structures are arranged unevenly is made. As a result, the possibility that the retained austenite comes into contact with the tempered martensite or the fresh martensite in the high-strength steel sheet increases excessively. Therefore, in this manufacturing method, the coiling temperature $T_c$ is set to 700° C. or less. In order to prevent the retained austenite and the tempered martensite in the high-strength steel sheet from being adjacent to each other and increase the impact resistance of the steel sheet, the coiling temperature $T_c$ is preferably set to 660° C. or less. On the other hand, when the coiling temperature $T_c$ is set to less than 400° C., strength of the hot-rolled steel sheet increases excessively to cause a concern that the steel sheet fractures in the pickling step and the cold rolling step. Therefore, the coiling temperature $T_c$ is set to 400° C. or more. In order to accurately cool the steel sheet, the coiling temperature $T_c$ is preferably set to 500° C. or more.

When a cooling rate down to room temperature is accelerated after the coiling, the phase transformation after the coiling progresses at lower temperature, and thus a microstructure in which hard structures are dispersed appropriately is made, and the possibility that the retained austenite comes into contact with the tempered martensite or the fresh martensite in the high-strength steel sheet decreases. Therefore, an average cooling rate down to 350° C. from the coiling temperature $T_c$ is set to $5.0 \times 10^{-3}$° C./second or more. On the other hand, when the steel sheet coiled as a coil is cooled extremely fast, a large temperature deviation occurs in the coil and with the temperature deviation, unevenness occurs even in phase transformation behavior, and thus a microstructure in which hard structures partially aggregate is made and the possibility that the retained austenite comes into contact with the tempered martensite or the fresh martensite in the high-strength steel sheet increases on the contrary. In order to avoid this, the average cooling rate down to 350° C. from the coiling temperature $T_c$ is set to $1.0 \times 10^{-2}$° C./second or less and preferably set to $9.0 \times 10^{-3}$° C./second or less.

(Pickling Step)

In the pickling step after the hot rolling step, pickling of the hot-rolled steel sheet obtained in the hot rolling step is performed. In the pickling, oxides existing on a surface of the hot-rolled steel sheet are removed. The pickling is important for improvements in conversion treatability and platability of the hot-rolled steel sheet. The pickling of the hot-rolled steel sheet may be performed one time, or a plurality of times.

(Cold Rolling Step)

In the cold rolling step after the pickling step, cold rolling of the hot-rolled steel sheet is performed to obtain a cold-rolled steel sheet. When the total reduction ratio in cold rolling is greater than 85%, the ductility of the steel sheet decreases greatly and a risk of fracture of the steel sheet during the cold rolling increases. Therefore, in the cold rolling, the total reduction ratio is set to 85% or less, preferably set to 75% or less, and more preferably set to 70% or less. The lower limit of the total reduction ratio in the cold rolling step is not determined particularly, and no problem is caused even when the cold rolling is not performed. However, when the total reduction ratio in the cold rolling is less than 0.05%, the shape of the steel sheet becomes uneven and galvanizing does not adhere uniformly, resulting in impairment of an external appearance in some cases. Therefore, the total reduction ratio in the cold rolling is preferably set to 0.05% or more and more preferably set to 0.10% or more. Incidentally, the cold rolling is preferably performed through several paths, and the number of paths of the cold rolling and a distribution of a reduction ratio to the respective paths are not in question.

When the total reduction ratio in the cold rolling is greater than 10% and less than 20%, in the annealing step after the cold rolling step, recrystallization does not progress sufficiently and coarse crystal grains in which a large amount of dislocations are contained and malleability has been lost remain near a surface layer, leading to deterioration in bendability and fatigue resistance in some cases. In order to avoid this, it is effective to reduce the total reduction ratio and make accumulation of dislocations to the crystal grains slight to leave the malleability of the crystal grains. In view of making the accumulation of dislocations to the crystal grains slight, the total reduction ratio in the cold rolling is preferably set to 10% or less, and more preferably set to 5.0% or less. Further, in order to obtain good bendability and fatigue resistance, it is effective to increase the total reduction ratio in the cold rolling step, make the recrystallization sufficiently progress in the annealing step, and turn a worked structure into recrystallized grains in which accumulation of dislocations is reduced. In order to make the recrystallization in the annealing step progress sufficiently, the total reduction ratio is preferably set to 20% or more and more preferably set to 30% or more.

(Softening Annealing Step)

This manufacturing method may include the softening annealing step between the hot rolling step and the cold rolling step. In the softening annealing step, softening annealing intended for softening the steel sheet is performed. Performing the softening annealing makes it possible to reduce the rolling reaction force in the cold rolling to improve the shape of the steel sheet. However, when an annealing treatment temperature in the softening annealing step is greater than 680° C., the grain diameter of cementite becomes coarse, the nucleation frequency of austenite grains in the annealing step decreases, and some austenite grains grow excessively, so that the density of coarse austenite grains increases, leading to deterioration in impact property. Therefore, the annealing treatment temperature is preferably set to 680° C. or less. The lower limit of the annealing treatment temperature is not determined in particular, but when it is less than 300° C., it is impossible to obtain a sufficient softening effect. Therefore, the annealing treatment temperature is preferably set to 300° C. or more.

The softening annealing step may be provided either before or after the pickling step. The pickling may be performed both before and after the softening annealing step.

(Annealing Step)

In the annealing step after the cold rolling step, annealing of the cold-rolled steel sheet is performed. In the annealing step, the cold-rolled steel sheet obtained in the cold rolling step is heated up to a maximum heating temperature $T_{max}$ at an average heating rate in a range of $A_{C1}$ point to ($A_{C1}$ point+25)° C. of 0.5° C./second or more. When the average heating rate in the range of $A_{C1}$ point to ($A_{C1}$ point+25) ° C. is less than 0.5° C./second, the austenite grains generated immediately above the $A_{C1}$ point grow excessively and a microstructure in which hard structures are arranged unevenly is made. As a result, the possibility that the retained austenite comes into contact with the tempered martensite or the fresh martensite in the high-strength steel sheet increases excessively. In order to prevent the retained austenite and the tempered martensite in the high-strength steel sheet from being adjacent to each other and increase the impact resistance of the steel sheet, the average heating rate in the range of $A_{C1}$ point to ($A_{C1}$ point+25)° C. is preferably set to 0.8° C./second or more. The upper limit of the average heating rate in the range of $A_{C1}$ point to ($A_{C1}$ point+25)° C. is not set in particular, but when the heating rate increases excessively, the cementite in the steel remains unmelted and there is a concern of deterioration in properties. Therefore, the average heating rate in the range of $A_{C1}$ point to ($A_{C1}$ point+25)° C. is preferably set to 100° C./second or less.

When the maximum heating temperature $T_{max}$ is less than (the $A_{C1}$ point+40)° C., the cementite in the steel remains unmelted and there is a concern of deterioration in properties. Therefore, the maximum heating temperature $T_{max}$ is set to (the $A_{C1}$ point+40)° C. or more. In order to increase the fraction of hard structures and more increase the strength, the maximum heating temperature $T_{max}$ is preferably set to (the $A_{C1}$ point+55)° C. or more. On the other hand, when the maximum heating temperature $T_{max}$ is greater than 1000° C., the diameter of austenite becomes coarse and the property of the high-strength steel sheet deteriorates drastically in some cases. Therefore, the maximum heating temperature $T_{max}$ is preferably set to 1000° C. or less.

The $A_{C1}$ point and the $A_{C3}$ point of the steel sheet are a start point and a completion point of an austenite reverse transformation respectively. The $A_{C1}$ point and the $A_{C3}$ point of the steel sheet are obtained in a manner that a small piece is cut out from the steel sheet obtained after the hot rolling to be heated up to 1200° C. at 10° C./second and a cubical expansion during the heating is measured.

In the annealing step, a retention time $t_{max}$ in a temperature range of maximum heating temperature $T_{max}$ to ($T_{max}$−10)° C. greatly affects the property of the high-strength steel sheet. When this retention time $t_{max}$ is too long, the Mn segregation progresses and a microstructure in which hard structures are arranged unevenly is made. As a result, the possibility that the retained austenite comes into contact with the tempered martensite or the fresh martensite in the high-strength steel sheet increases excessively. Thus, in this manufacturing method, in order to increase the impact resistance, a parameter Q1 expressed by (Expression 2), which relates to the retention time $t_{max}$, is set to 2.0 or less.

[Mathematical expression 1]

$$Q1 = 0.61 \times \log_{10} \left\{ \frac{\begin{array}{c} 2.03 \times 10^{13} \times \exp\left(-\frac{3.25 \times 10^4}{T_{max}+273}\right) \times (T-A_{C1})^{-0.5} \times \\ \frac{(A_{C3}-T)^{0.8} \times (A_{C3}-A_{C1})^{-0.8} \times W_{Mn}^{0.533} + 0.012}{300 \times 10^{12} \times \exp\left(-\frac{360 \times 10^4}{T_{max}+273}\right) \times} \times \\ (4.45 \times 10^2 + 9.51 \times 10^{-1} \times T_{max} - 2.18 \times 10^1 \times T_{max}^{0.6}) \end{array}}{\left| W_{Mn} - W_{Mn}^{-3.79+10^{-9} \times T_C^3 + 4.198 \times 10^{-6} \times T_C^2 - 1.53 \times 10^{-3} \times T_C + 1.13} \right|} \right\} - 0.85$$

(Expression 2)

(In (Expression 2), $W_{Mn}$ is the content of Mn in mass %, and $T_c$ is the temperature [° C.] at which the hot-rolled steel sheet is coiled into a coil in the hot rolling step. T is a lower temperature of either $T_{max}$ or the $A_{C3}$ point).

The parameter Q1 reflects the degree of progress of the Mn segregation after the annealing step, and as the parameter Q1 is larger, the Mn segregation progresses and the impact resistance deteriorates. In view of impact resistance, the parameter Q1 is set to 2.0 or less, preferably set to 1.5 or less, and more preferably set to 1.0 or less.

After the retention in the above-described temperature range for the above-described retention time $t_{max}$, the steel sheet is cooled down to 650° C. (first cooling). An average cooling rate down to 650° C. (a first cooling stop temperature) (a first cooling rate) may be changed arbitrarily according to a property required in the steel sheet. The first cooling rate is preferably set to 0.5° C./second or more. When the first cooling rate is 0.5° C./second or more, it is possible to prevent occurrence of a large amount of pearlite.

After the first cooling, the steel sheet is cooled down to a temperature of 500° C. or less (second cooling stop temperature) from 650° C. at an average cooling rate of 2.5° C./second or more (second cooling). When the average cooling rate in a temperature range of 650° C. to 500° C. (second cooling rate) is less than 2.5° C./second, large amounts of pearlite and coarse cementite occur to impair the formability. Further, ferrite generated in this temperature range is soft, to thus reduce the strength. In order to increase the strength of the high-strength steel sheet, the second cooling rate is preferably set to 5.0° C./second or more, and more preferably set to 9.0° C./second or more. It is possible to manufacture the high-strength steel sheet according to the first embodiment without limiting the upper limit of the second cooling rate, but in order to obtain the average cooling rate of 200° C./second or more, it is necessary to employ a special cooling method. Thus, in view of cost, the second cooling rate is preferably set to 200° C./second or less.

(Bainite Transformation Step)

In the bainite transformation step after the annealing step, a process to promote a bainite transformation is performed in a temperature range of 500 to 340° C. By promoting the bainite transformation, nucleation sites existing in non-transformed austenite grains are consumed, and in the following martensite transformation step, martensites to be generated from insides of the austenite grains decrease. As a result, interfaces between the retained austenite and the temperature martensite decrease and the impact resistance improves. On the other hand, by promoting the bainite transformation excessively, carbon excessively concentrates in the non-transformed austenite. As a result, the Ms point in the non-transformed austenite lowers, to fail to obtain martensite in the following martensite transformation step. In order to promote the bainite transformation appropriately and improve the impact resistance, a parameter Q2 expressed by (Expression 3) is set to 0.10 or more and 3.00 or less in the bainite transformation step.

[Mathematical expression 2]

$$Q2 = \sum_{i=1}^{10} 6.72 \times 10^2 \times$$

$$\{(600 - 23Mn - 15Si - 35Cr + 35Al) - T_i\}^4 \times$$

$$\exp\left(-\frac{1.85 \times 10^4}{T_i + 273}\right) \times \left(\frac{t_B}{10}\right)^{0.5} \times i^{-0.667}$$

(Expression 3)

(In (Expression 3), Mn, Si, Cr, and Al are the contents of the respective elements in mass %, $t_B$ is a process time [second] in the bainite transformation step, and $T_i$ is an average temperature [° C.] in an ith range out of 10 parts into which the process time from start to completion of the bainite transformation step is equally divided.)

The parameter Q2 reflects the degree of progress of the bainite transformation, and as the parameter Q2 is larger, the bainite transformation progresses. When the parameter Q2 is in a range of 0.10 or more to 3.00 or less, the degree of progress of the bainite transformation becomes appropriate. In view of impact resistance, the parameter Q2 is preferably 0.25 or more and 2.50 or less.

In this manufacturing method, between the annealing step and the bainite transformation step, a treatment to cool the steel sheet down to Ms* to (Mf*+50)° C. and reheat the steel sheet up to 340 to 500° C. may be performed. By this treatment, it is possible to more efficiently consume the nucleation sites in the non-transformed austenite grains and further improve the impact resistance of the steel sheet. Ms* is expressed by (Expression 4) and Mf* is expressed by (Expression 5).

[Mathematical expression 3]

$$Ms* = 561 - 474 \times \frac{C}{1-V_\alpha} - 33Mn - 17Ni - 17Cr - 11.0Si - 21Mo + 30Al$$

(Expression 4)

$$Mf* = Ms* - 120 \times (1-V_\alpha)^{-0.4}$$

(Expression 5)

(In (Expression 4), C, Mn, Ni, Cr, Si, Mo, and Al are the contents of the respective elements in mass %, and the case where the above element is not contained is 0. $V_\alpha$ in (Expression 4) and (Expression 5) is the volume fraction [%] of ferrite.)

Incidentally, it is difficult to directly measure the volume fraction of ferrite during manufacture of the steel sheet. Therefore, in this manufacturing method, a small piece is cut out from the cold-rolled steel sheet prior to the annealing step, this small piece is annealed with the same temperature history as that in the annealing step, the change in ferrite volume of the small piece is measured, and a numerical value calculated by using the measurement result is used as the volume fraction of ferrite. In the case of manufacturing a steel sheet under the same manufacturing conditions (with the same temperature history), the initial first measurement result may be used for the measurement of the volume fraction of ferrite, and the volume fraction does not need to be measured every time. When the manufacturing conditions are changed greatly, the measurement is performed again. Needless to say, no problem is caused even when the microstructure of a steel sheet manufactured actually is observed to feedback a measurement result to the subsequent manufactures.

(Martensite Transformation Step)

In the martensite transformation step after the bainite transformation step, a process to cool the steel sheet (third cooling), to thereby cause a martensite transformation is performed. When an average cooling rate in a range of 340° C. to Ms point during the third cooling (third cooling rate) is less than 1.0° C./second, lower bainite containing carbide is generated, leading to deterioration in formability. Thus, the third cooling rate is set to 1.0° C./second or more. In order to obtain more excellent formability, the third cooling rate is preferably set to 2.5° C./second or more, and more preferably set to 4.0° C./second or more. The Ms point is expressed by (Expression 6).

[Mathematical expression 4]

$$Ms = 546 \times \exp\left(-1.362 \times \frac{C}{1 - V_\alpha - V_B}\right) - 30.4Mn - 17.7Ni - 12.1Cr - 11.0Si + 30Al \quad \text{(Expression 6)}$$

(In (Expression 6), C, Mn, Ni, Cr, Si, and Al are the contents of the respective elements in mass %, and the case where the above element is not contained is 0. $V_\alpha$ is the volume fraction [%] of ferrite and VB is the volume fraction [%] of bainite.)

Thereafter, cooling is performed down to an arbitrary temperature between the Ms point or less and the Mf point or more (a third cooling stop temperature) to promote the martensite transformation. The Mf point is expressed by (Expression 7).

[Mathematical expression 5]

$$Mf = 385 \times \exp\left(-2.856 \times \frac{C}{1 - V_\alpha - V_B}\right) - 30.4Mn - 17.7Ni - 12.1Cr - 11.0Si + 30Al \quad \text{(Expression 7)}$$

(In (Expression 7), C, Mn, Ni, Cr, Si, and Al are the contents of the respective elements in mass %, and the case where the above element is not contained is 0. $V_\alpha$ is the volume fraction [%] of ferrite and VB is the volume fraction [%] of bainite.)

Incidentally, it is difficult to directly measure the volume fraction of ferrite and the volume fraction of bainite during manufacture of the steel sheet. Therefore, in this manufacturing method, a small piece is cut out from the cold-rolled steel sheet prior to the annealing step, this small piece is annealed with the same temperature history as that in the annealing step, the change in ferrite volume and the change in bainite volume of the small piece are measured, and numerical values calculated by using the measurement results are used as the volume fraction of ferrite and the volume fraction of bainite respectively. In the case of manufacturing a steel sheet under the same manufacturing conditions (with the same temperature history), the initial first measurement result may be used for the measurement of the volume fractions of ferrite and bainite, and the volume fractions do not need to be measured every time. When the manufacturing conditions are changed greatly, the measurement is performed again. Needless to say, no problem is caused even when the microstructure of a steel sheet manufactured actually is observed to feedback a measurement result to the subsequent manufactures.

The third cooling stop temperature is preferably set to fall within a range of −10 to 50° C. with the Mf point set to −10° C. or less. The cooling stop temperature is set to fall within a range of −10 to 50° C., thereby making it possible to shift to the following tempering step without using a special heat-retaining device and refrigerating device. Thus, in view of cost, the third cooling stop temperature is preferably set to fall within a range of −10 to 50° C.

In this manufacturing method, no problem is caused even when second cold rolling (skin pass rolling) is performed between the martensite transformation step and the tempering step. In the second cold rolling, cold rolling is performed on the steel sheet in which a rolling ratio is set to 3.0% or less and preferably set to 2.0% or less. The second cold rolling is performed, and thereby the unstable non-transformed austenite grains with the proportion of interfaces with martensite to all the grain boundaries being large are transformed into martensite, resulting in that the impact resistance in the steel sheet after the tempering step improves.

(Tempering Step)

In the tempering step after the martensite transformation step, the steel sheet is tempered in a range of 200 to 600° C. By the tempering step, the martensite generated in the martensite transformation step turns into tempered martensite, resulting in that the formability and the impact resistance of the steel sheet improve greatly.

In relation to a tempering temperature $T_{tem}$ [° C.] and a tempering treatment time $t_{tem}$ [second] between the tempering temperature $T_{tem}$ and ($T_{tem}$−10° C.), a parameter Q3 expressed by (Expression 8) is set to 1.0 or more, a parameter Q4 expressed by (Expression 9) is set to 1.00 or less, and a parameter Q5 expressed by (Expression 10) is set to 1.00 or less.

[Mathematical expression 6]

$$Q3 = \log_{10}\left\{1.65 \times 10^8 \times Si^{-0.667} \times t_{tem} \times \exp\left(-\frac{1.03 \times 10^4}{T_{tem} + 273}\right)\right\} \quad \text{(Expression 8)}$$

(In (Expression 8), Si is the content of Si in mass %. $T_{tem}$ is the tempering temperature [° C.] and $t_{tem}$ is the tempering treatment time [second].)

The parameter Q3 indicates the degree of tempering of martensite. When the parameter Q3 is less than 1.0, the tempering of martensite does not progress sufficiently, leading to deterioration in hole expandability and stretch flangeability. Therefore, it is necessary to set the parameter Q3 to 1.0 or more. In order to obtain more excellent hole expandability and stretch flangeability, the parameter Q3 is preferably 1.5 or more and more preferably set to 2.0 or more.

[Mathematical expression 7]

$$Q4 = 1.38 \times (2.46 \times 10^{-9} \times T_{tem}^3 - 3.33 \times 10^{-6} \times T_{tem}^2 - 1.27 \times 10^{-3} \times T_{tem} + 1.94 - 5.33 \times 10^{-2} \times Mn - 2.45 \times 10^{-2} \times Ni) \times \left(1 - \frac{80}{T_{tem}}\right) \times \left(1 - \frac{8.76 \times 10^{-1}}{t_{tem}^{0.2}}\right) \quad \text{(Expression 9)}$$

(In (Expression 9), Mn and Ni are the contents of Mn and Ni in mass % and the case where the above element is not contained is 0. $T_{tem}$ is the tempering temperature [° C.] and $t_{tem}$ is the tempering treatment time [second].)

The parameter Q4 indicates the stability of retained austenite. When the parameter Q4 is greater than 1.00, the retained austenite stabilizes excessively and is no longer transformed into martensite at the time of deformation, leading to deterioration in the balance between strength and ductility. Therefore, it is necessary to set the parameter Q4 to 1.00 or less. In order to more suppress the stabilization of the retained austenite and obtain a more excellent balance between strength and ductility, the parameter Q4 is preferably set to 0.90 or less and more preferably set to 0.80 or less.

[Mathematical expression 8]

$$Q5 = 1.45 \times 10^1 \times \{T_{tem} - 2.98 \times 10^2 - 1.31 \times 10^2 \times (Si + 0.6 \times Al)^{0.455}\} \times |T_{tem} - 2.98 \times 10^2 - 1.31 \times 10^2 \times (Si + 0.6 \times Al)^{0.455}|^{1.35} \times \left\{\frac{t_{tem}}{(Mn + 1.5Cr + 1.3Mo + 0.4Ni)^{0.5}} \times \exp\left(-\frac{1.98 \times 10^4}{T_{tem} + 273}\right)\right\}^{0.5} \quad \text{(Expression 10)}$$

(In (Expression 10), Si, Al, Mn, Cr, Mo, and Ni are the contents of the respective elements in mass % and the case where the above element is not contained is 0. $T_{tem}$ is the tempering temperature [° C.] and $t_{tem}$ is the tempering treatment time [second].)

The parameter Q5 indicates generation behavior of the pearlite and/or the coarse cementite from the retained austenite. When the parameter Q5 is greater than 1.00, a large portion of the retained austenite decomposes into the pearlite and/or the coarse cementite, leading to deterioration in strength and formability of the steel sheet. Therefore, it is necessary to set the parameter Q5 to 1.00 or less. In order to more suppress the decomposition of the retained austenite and obtain more excellent strength and formability, the parameter Q5 is preferably set to 0.60 or less and more preferably set to 0.20 or less.

In the tempering step, an average heating rate up to the maximum heating temperature (tempering temperature) from 200° C. is preferably set to 1.0° C./second or more. The average heating rate is set to 1.0° C./second or more, and thereby carbide in the tempered martensite becomes fine to make it possible to increase the impact resistance. In order to improve the impact resistance, the average heating rate in the above-described temperature range is more preferably set to 4.0° C./second or more.

Further, no problem is caused even when cold rolling at a rolling ratio of 3.00% or less is performed for the purpose of shape correction after the tempering step.

By the above steps, the high-strength steel sheet according to the first embodiment can be obtained.

Next, there will be explained a method of manufacturing the high-strength galvanized steel sheet according to the second embodiment. In this manufacturing method, a galvanizing treatment is performed on the high-strength steel sheet according to the first embodiment obtained by the above-described manufacturing method or the high-strength steel sheet in the middle of being manufactured by the above-described manufacturing method to form the galvanized layer. As the galvanizing treatment, a hot-dip galvanizing treatment may be performed or an electrogalvanizing treatment may also be performed.

As the stage (timing) of performing the hot-dip galvanizing treatment on the high-strength steel sheet in the middle of manufacture, a timing before the bainite transformation step, a timing before the martensite transformation step, a timing before the tempering step, a timing after the tempering step, and so on can be cited. Further, during the tempering step, the hot-dip galvanizing treatment may be performed.

A galvanizing bath temperature in the hot-dip galvanizing treatment is preferably set to 450 to 470° C. When the galvanizing bath temperature is less than 450° C., the viscosity of the galvanizing bath increases excessively to make it difficult to control the thickness of the galvanized layer, leading to impairment of the external appearance of the steel sheet in some cases. Therefore, the galvanizing bath temperature is preferably set to 450° C. or more. On the other hand, when the galvanizing bath temperature is greater than 470° C., a large amount of fumes occur to make safe manufacture difficult in some cases. Therefore, the galvanizing bath temperature is preferably set to 470° C. or less.

A temperature of the steel sheet to be immersed in the galvanizing bath (steel sheet entering temperature) is preferably set to 420 to 500° C. When the temperature of the steel sheet to be immersed in the galvanizing bath is less than 420° C., it becomes necessary to provide a large amount of heat to the galvanizing bath in order to stabilize the galvanizing bath temperature at 450° C. or more, which is not appropriate practically. Thus, in order to stabilize the bath temperature of the galvanizing bath, the steel sheet entering temperature is preferably set to 420° C. or more and more preferably set to 440° C. or more. On the other hand, when the temperature of the steel sheet to be immersed in the galvanizing bath is greater than 500° C., it becomes necessary to introduce a facility to remove a large amount of heat from the galvanizing bath in order to stabilize the galvanizing bath temperature at 470° C. or less, which is not appropriate in view of manufacturing cost. Thus, in order to stabilize the bath temperature of the galvanizing bath, the steel sheet entering temperature is preferably set to 500° C. or less and more preferably set to 480° C. or less.

The galvanizing bath is preferably composed of zinc mainly, and has a composition in which the effective Al content being a value obtained by subtracting the whole Fe content from the whole Al content in the galvanizing bath is 0.010 to 0.300 mass %. When the effective Al content in the galvanizing bath is less than 0.010 mass %, penetration of Fe into the galvanized layer progresses excessively, leading to impairment of plating adhesion in some cases. Thus, the effective Al content in the galvanizing bath is preferably set to 0.010 mass % or more, more preferably set to 0.030 mass % or more, and further preferably set to 0.050 mass % or more. On the other hand, when the effective Al content in the galvanizing bath is greater than 0.300 mass %, an Fe—Al intermetallic compound is generated excessively at a boundary between a base iron and the galvanized layer, leading to prominent impairment of plating adhesion in some cases. Thus, the effective Al content in the galvanizing bath is preferably set to 0.300 mass % or less. In the case where the alloying treatment is performed in particular, generation of the Fe—Al intermetallic compound blocks migration of Fe and Zn atoms to suppress formation of an alloy phase, and thus the effective Al content in the galvanizing bath is preferably set to 0.180 mass % or less and further preferably set to 0.150 mass % or less.

The galvanizing bath may contain one type or more selected from the group consisting of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM. There is sometimes a preferred case that corrosion resistance or workability of the galvanized layer improves, or the like depending on the content of each element.

After the steel sheet is immersed in the galvanizing bath, in order to to make a plating deposition amount appropriate, a high pressure gas mainly composed of nitrogen is preferably blown onto the surface of the steel sheet to remove an excessive galvanizing solution on the surface layer.

As the stage (timing) at which the electrogalvanizing treatment is performed on the high-strength steel sheet in the middle of manufacture, a timing before the tempering step, a timing after the tempering step, and so on can be cited. As the electrogalvanizing treatment, a conventionally well-known method can be used. As an electrogalvanizing bath, one containing $H_2SO_4$, $ZnSO_4$, and $NaSO_4$ and having pH of 1.5 to 2.0 can be cited, for example. Conditions of a temperature of the electrogalvanizing bath, a current density, and the like can be determined appropriately according to the type of the electrogalvanizing bath, the thickness of the galvanized layer, or the like. Further, in the case where the electrogalvanizing treatment is performed on the high-strength steel sheet, the high-strength steel sheet is preferably subjected to pickling and then is immersed in the electrogalvanizing bath. As a pickling method of the high-strength steel sheet, a well-known method can be used, and there can be cited a method in which the high-strength steel sheet is immersed in a sulfuric acid and pickling is performed until hydrogen bubbles are visually recognized, for example.

In the case where the alloyed galvanized layer is formed as the galvanized layer, after the galvanizing treatment is performed, an alloying treatment is performed to form the alloyed galvanized layer. The alloying treatment may be performed at any stage (timing) as long as it is performed after the galvanizing treatment, and may be performed consecutively after the galvanizing treatment. Concretely, for example, in the case of the galvanizing treatment being performed before the bainite transformation step, as the stage (timing) at which the alloying treatment is performed, there can be cited a timing after the galvanizing treatment and before the bainite transformation step, a timing before the martensite transformation step, a timing before the tempering step, a timing simultaneously with the tempering treatment, a timing after the tempering step, and so on. In the case of the galvanizing treatment being performed before the martensite transformation step, for example, as the stage (timing) at which the alloying treatment is performed, there can be cited a timing after the galvanizing treatment and before the martensite transformation step, a timing before the tempering step, a timing simultaneously with the tempering treatment, a timing after the tempering step, and so on. In the case of the galvanizing treatment being performed before the tempering step, for example, as the stage (timing) at which the alloying treatment is performed, there can be cited a timing after the galvanizing treatment and before the tempering step, a timing simultaneously with the tempering treatment, a timing after the tempering step, and so on.

In the case of the alloying treatment being performed after the hot-dip galvanizing treatment is performed, for example, a heat treatment in which holding is performed for 2 to 100 seconds at a temperature of 470 to 600° C. is preferably performed. In the case of the alloying treatment being performed after the electrogalvanizing treatment is performed, for example, a heat treatment in which holding is performed for 2 to 100 seconds at a temperature of 400 to 600° C. is preferably performed.

No problem is caused even when cold rolling is performed on the obtained high-strength galvanized steel sheet at a reduction ratio of 3.00% or less for the purpose of shape correction.

By the above steps, the high-strength galvanized steel sheet according to the second embodiment can be obtained.

It is possible to use, as a steel sheet for tempering treatment, a steel sheet that includes the chemical composition of the above-described high-strength steel sheet and is manufactured by going through the treatments until the tempering step in the same manner as the above-described manufacturing method of the high-strength steel sheet. The steel sheet for tempering treatment may include the galvanized layer on its surface. The galvanized layer can be formed by performing a galvanizing treatment in the same manner as the above-described manufacturing method of the high-strength galvanized steel sheet before the tempering step.

A microstructure of such a steel sheet for tempering treatment is as follows, for example.

(Microstructure) This steel sheet for tempering treatment has a microstructure represented by, in a ⅛ thickness to ⅜ thickness range with ¼ thickness of a sheet thickness from a surface being a center, in volume fraction, ferrite: 85% or less, bainite: 3% or more and 95% or less, fresh martensite: 1% or more and 80% or less, retained austenite: 1% or more and 25% or less, and pearlite and cementite: 5% or less in total.

The reasons for limiting the respective volume fractions of the structures other than the fresh martensite are the same as those of the high-strength steel sheet according to the first embodiment. The reason for limiting the volume fraction of the fresh martensite is the same as that of the volume fraction of the tempered martensite in the high-strength steel sheet according to the first embodiment. This is because almost the whole of the fresh martensite turns into tempered martensite by the tempering step.

In this steel sheet for tempering treatment, the solid-solution carbon content in the retained austenite is 0.60 to 0.95 mass %. As long as the solid-solution carbon content in the retained austenite falls within this range, the high-strength steel sheet with the solid-solution carbon content in the retained austenite being 0.70 to 1.30 mass % can be obtained by going through the tempering step.

Incidentally, the present invention is not limited to the above-described embodiments. For example, as the plated layer, not the galvanized layer but a nickel plated layer may be formed. A coating film made of a composite oxide containing phosphorus oxide and/or phosphorus may be formed on the galvanized layer. Such a coating film can function as a lubricant when working the steel sheet and can protect the galvanized layer. The coating film made of the composite oxide containing phosphorus oxide and/or phosphorus can be formed by using a well-known method.

Note that the above-described embodiments merely illustrate concrete examples of implementing the present invention and the technical scope of the present invention is not to be construed in a restrictive manner by these embodiments. That is, the present invention may be implemented in various forms without departing from the technical spirit or main features thereof.

EXAMPLE

Next, there will be explained examples of the present invention. Conditions in the examples are condition examples employed for confirming the applicability and effects of the present invention, and the present invention is not limited to these examples. The present invention can employ various conditions as long as the object of the present invention is achieved without departing from the spirit of the present invention.

Slabs having chemical compositions of A to AK illustrated in Table 1 and Table 2 were cast, heated to slab heating temperatures illustrated in Table 3 and Table 4, and were subjected to hot rolling, cooling, coiling, and coil cooling, to thereby obtain hot-rolled steel sheets (hot rolling step). The slab heating temperature, the rolling completing temperature of the hot rolling, the average cooling rate in the range of 850° C. to 700° C. (average cooling rate before coiling), the coiling temperature Tc, and the average cooling rate from the coiling temperature $T_c$ to 350° C. (coil cooling rate) are illustrated in Table 3 and Table 4. Each space in Table 1 and Table 2 indicates that the content of the corresponding element is less than the detection limit, and the balance is Fe and impurities. Each underline in Table 1 and Table 2 indicates that the corresponding numerical value is outside the range of the present invention.

Thereafter, the hot-rolled steel sheets were subjected to pickling and cold rolling, to then obtain cold-rolled steel sheets (cold rolling step). In Table 3 and Table 4, the total reduction ratio of the cold rolling is illustrated. Some of the hot-rolled steel sheets were subjected to the softening annealing step at a treatment temperature illustrated in Table 3 and Table 4 and then subjected to the cold rolling. Each underline in Table 3 and Table 4 indicates that the corresponding numerical value is outside the range necessary for the manufacture of the high-strength steel sheet according to the present invention.

TABLE 1

| STEEL TYPE | C MASS % | Si MASS % | Mn MASS % | P MASS % | S MASS % | Al MASS % | N MASS % | O MASS % | PARAMETER Q0 |
|---|---|---|---|---|---|---|---|---|---|
| A | 0.209 | 1.17 | 1.83 | 0.011 | 0.0015 | 0.079 | 0.0011 | 0.0015 | 1.40 |
| B | 0.179 | 1.95 | 2.69 | 0.014 | 0.0062 | 0.045 | 0.0027 | 0.0018 | 2.25 |
| C | 0.087 | 1.59 | 2.72 | 0.013 | 0.0031 | 0.028 | 0.0053 | 0.0021 | 1.88 |
| D | 0.112 | 1.30 | 1.89 | 0.019 | 0.0044 | 0.099 | 0.0012 | 0.0014 | 1.55 |
| E | 0.270 | 1.05 | 2.84 | 0.004 | 0.0017 | 0.034 | 0.0018 | 0.0012 | 1.35 |
| F | 0.330 | 1.84 | 2.13 | 0.006 | 0.0041 | 0.098 | 0.0023 | 0.0012 | 2.11 |
| G | 0.238 | 0.27 | 1.96 | 0.014 | 0.0028 | 0.057 | 0.0037 | 0.0015 | 0.50 |
| H | 0.155 | 2.39 | 2.49 | 0.007 | 0.0014 | 0.083 | 0.0057 | 0.0024 | 2.69 |
| I | 0.133 | 2.13 | 1.72 | 0.014 | 0.0020 | 0.072 | 0.0053 | 0.0022 | 2.35 |
| J | 0.236 | 0.08 | 2.57 | 0.013 | 0.0052 | 1.093 | 0.0055 | 0.0020 | 0.99 |
| K | 0.195 | 1.53 | 1.21 | 0.009 | 0.0030 | 0.036 | 0.0041 | 0.0007 | 1.67 |
| L | 0.226 | 0.35 | 2.98 | 0.011 | 0.0036 | 1.129 | 0.0015 | 0.0023 | 1.33 |
| M | 0.171 | 0.18 | 3.22 | 0.012 | 0.0022 | 1.538 | 0.0007 | 0.0010 | 1.42 |
| N | 0.162 | 1.03 | 2.52 | 0.006 | 0.0059 | 0.064 | 0.0022 | 0.0035 | 1.32 |
| O | 0.246 | 1.88 | 1.33 | 0.011 | 0.0001 | 0.083 | 0.0021 | 0.0024 | 2.06 |
| P | 0.191 | 1.05 | 1.84 | 0.034 | 0.0063 | 0.035 | 0.0054 | 0.0011 | 1.26 |
| Q | 0.165 | 1.71 | 2.02 | 0.017 | 0.0036 | 0.077 | 0.0023 | 0.0023 | 1.96 |
| R | 0.134 | 0.91 | 2.68 | 0.005 | 0.0018 | 0.061 | 0.0024 | 0.0005 | 1.21 |
| S | 0.221 | 1.63 | 1.34 | 0.018 | 0.0003 | 0.076 | 0.0066 | 0.0007 | 1.81 |
| T | 0.280 | 0.96 | 2.53 | 0.012 | 0.0050 | 0.054 | 0.0028 | 0.0016 | 1.25 |
| U | 0.224 | 0.90 | 2.40 | 0.008 | 0.0039 | 0.034 | 0.0075 | 0.0020 | 1.16 |
| V | 0.161 | 0.61 | 0.91 | 0.016 | 0.0030 | 0.754 | 0.0021 | 0.0015 | 1.15 |
| W | 0.125 | 0.56 | 2.74 | 0.014 | 0.0041 | 0.036 | 0.0002 | 0.0014 | 0.86 |
| X | 0.164 | 1.20 | 2.11 | 0.009 | 0.0045 | 0.059 | 0.0054 | 0.0023 | 1.45 |
| Y | 0.175 | 1.57 | 0.77 | 0.010 | 0.0047 | 0.027 | 0.0057 | 0.0021 | 1.66 |
| Z | 0.176 | 1.75 | 2.91 | 0.011 | 0.0006 | 0.061 | 0.0044 | 0.0012 | 2.08 |
| AA | 0.060 | 1.48 | 2.08 | 0.080 | 0.0034 | 0.068 | 0.0010 | 0.0016 | 1.73 |
| AB | 0.455 | 1.79 | 2.75 | 0.009 | 0.0014 | 0.085 | 0.0007 | 0.0014 | 2.12 |
| AC | 0.130 | 0.10 | 1.37 | 0.090 | 0.0040 | 0.120 | 0.0032 | 0.0021 | 0.31 |
| AD | 0.142 | 3.16 | 2.04 | 0.013 | 0.0035 | 0.053 | 0.0045 | 0.0015 | 3.40 |
| AE | 0.136 | 0.98 | 0.24 | 0.014 | 0.0048 | 0.071 | 0.0056 | 0.0010 | 1.05 |
| AF | 0.177 | 0.72 | 5.39 | 0.004 | 0.0064 | 0.027 | 0.0040 | 0.0009 | 1.28 |
| AG | 0.136 | 0.54 | 1.96 | 0.208 | 0.0036 | 0.087 | 0.0046 | 0.0016 | 0.79 |
| AH | 0.147 | 1.63 | 2.29 | 0.013 | 0.0235 | 0.048 | 0.0006 | 0.0023 | 1.89 |
| AI | 0.171 | 0.34 | 2.06 | 0.015 | 0.0064 | 2.449 | 0.0008 | 0.0013 | 2.02 |
| AJ | 0.202 | 1.79 | 2.97 | 0.014 | 0.0017 | 0.033 | 0.0301 | 0.0014 | 2.11 |
| AK | 0.178 | 1.35 | 2.57 | 0.011 | 0.0051 | 0.077 | 0.0045 | 0.0173 | 1.65 |

TABLE 2

| | CHEMICAL COMPOSITION | | | | | | | |
|---|---|---|---|---|---|---|---|---|
| STEEL TYPE | Ti MASS % | Nb MASS % | V MASS % | Cr MASS % | Ni MASS % | Cu MASS % | Mo MASS % | B MASS % |
| A | | | | | | | | |
| B | | | | | | | | |
| C | | | | | | | | |
| D | | | | | | | | 0.0007 |
| E | | | | | | | | |
| F | | | | | | | | |
| G | | | | 0.27 | 0.28 | | 0.14 | |
| H | | | | | | | | |
| I | | | | | | | | 0.0047 |
| J | | | | | | | | |
| K | 0.015 | | | 0.16 | | | | 0.0036 |
| L | | | | | | 0.21 | | |
| M | | | | | | | | |
| N | | | | | | | 0.03 | |
| O | | | | 1.06 | | | | |
| P | | | | | | | 0.41 | |
| Q | 0.023 | | | | | | | |
| R | | 0.014 | | | | | | |
| S | | | | | 1.03 | 0.32 | | |
| T | | | | | | | | |
| U | | | | | | | 0.28 | |
| V | | | | 0.29 | 0.62 | 0.11 | | |
| W | | | 0.17 | | | | | |
| X | 0.052 | 0.007 | | | | | | |
| Y | | | | 0.75 | 0.12 | | | |
| Z | | 0.036 | | | | | | |
| AA | | | | | | | | |
| AB | | | | | | | | |
| AC | | | | | | | | |
| AD | | | | | | | | |
| AE | | | | | | | | |
| AF | | | | | | | | |
| AG | | | | | | | | |
| AH | | | | | | | | |
| AI | | | | | | | | |
| AJ | | | | | | | | |
| AK | | | | | | | | |

| | CHEMICAL COMPOSITION | | | | | | |
|---|---|---|---|---|---|---|---|
| STEEL TYPE | W MASS % | Ca MASS % | Ce MASS % | Mg MASS % | Zr MASS % | La MASS % | REM MASS % |
| A | | | | | | | |
| B | | | | | | | |
| C | | | | | | | |
| D | | | | | | | |
| E | | | | 0.0014 | | | |
| F | | | | | | | |
| G | | | | | | | |
| H | | | 0.0015 | | | | |
| I | | | | | | | |
| J | | | | | | | |
| K | | | | | | | |
| L | | | | | | | |
| M | | 0.0024 | | | | | |
| N | | | | | | | |
| O | | | | | | | |
| P | | | | | | | |
| Q | | | | | | | |
| R | | | | | | | |
| S | | | | | | | |
| T | 0.22 | | | | | | |
| U | | | | | | | |
| V | | | | | | | |
| W | | | | | | | |
| X | | | | | | | 0.0024 |
| Y | | | | | | | |
| Z | | | | | 0.0008 | 0.0004 | |
| AA | | | | | | | |
| AB | | | | | | | |
| AC | | | | | | | |
| AD | | | | | | | |

TABLE 2-continued

AE
AF
AG
AH
AI
AJ
AK

TABLE 3

| EXPERIMENT EXAMPLE No. | STEEL TYPE | HOT ROLLING STEP ||||| SOFTENING ANNEALING STEP TREATMENT TEMPERATURE °C. | COLD ROLLING STEP REDUCTION RATIO % | NOTE |
|---|---|---|---|---|---|---|---|---|---|
| | | SLAB HEATING TEMPERATURE °C. | ROLLING COMPLETING TEMPERATURE °C. | AVERAGE COOLING RATE BEFORE COILING °C./SECOND | COILING TEMPERATURE $T_C$ °C. | COIL COOLING RATE $10^{-3}$ °C./SECOND | | | |
| 1 | A | 1255 | 949 | 30 | 585 | 7.0 | — | 65 | EXAMPLE |
| 2 | A | 1245 | 909 | 17 | 575 | 6.1 | — | 61 | EXAMPLE |
| 3 | A | 1190 | 920 | 26 | 537 | 8.2 | 633 | 55 | EXAMPLE |
| 4 | A | 1235 | 865 | 29 | 611 | 6.3 | — | 68 | EXAMPLE |
| 5 | A | 1220 | 953 | 30 | 511 | 5.8 | — | 7 | EXAMPLE |
| 6 | A | 1260 | 930 | 24 | 619 | 7.1 | — | 32 | COMPARATIVE EXAMPLE |
| 7 | B | 1220 | 940 | 29 | 651 | 8.1 | — | 52 | EXAMPLE |
| 8 | B | 1225 | 942 | 17 | 644 | 7.1 | — | 73 | EXAMPLE |
| 9 | B | 1255 | 919 | 10 | 584 | 8.3 | — | 60 | EXAMPLE |
| 10 | B | 1220 | 953 | 18 | 516 | 6.1 | — | 3 | EXAMPLE |
| 11 | B | 1270 | 957 | 30 | 547 | 8.3 | — | 0.4 | EXAMPLE |
| 12 | B | 1220 | 920 | 33 | 520 | 8.2 | — | 34 | COMPARATIVE EXAMPLE |
| 13 | C | 1225 | 953 | 27 | 514 | 7.2 | — | 54 | EXAMPLE |
| 14 | C | 1205 | 937 | 25 | 444 | 8.0 | — | 68 | EXAMPLE |
| 15 | C | 1195 | 913 | 34 | 580 | 5.1 | — | 76 | COMPARATIVE EXAMPLE |
| 16 | D | 1225 | 934 | 21 | 648 | 6.1 | — | 53 | EXAMPLE |
| 17 | D | 1270 | 917 | 20 | 585 | 5.1 | — | 59 | EXAMPLE |
| 18 | D | 1260 | 907 | 30 | 548 | 5.4 | — | 55 | COMPARATIVE EXAMPLE |
| 19 | E | 1240 | 902 | 18 | 512 | 5.0 | — | 76 | EXAMPLE |
| 20 | E | 1235 | 875 | 29 | 536 | 8.2 | — | 66 | EXAMPLE |
| 21 | E | 1215 | 943 | 30 | 585 | 7.2 | — | 64 | COMPARATIVE EXAMPLE |
| 22 | F | 1215 | 926 | 35 | 504 | 6.7 | — | 76 | EXAMPLE |
| 23 | F | 1255 | 904 | 33 | 652 | 6.2 | — | 65 | EXAMPLE |
| 24 | F | 1230 | 918 | 17 | 644 | 6.0 | — | 63 | COMPARATIVE EXAMPLE |
| 25 | G | 1200 | 929 | 26 | 505 | 8.2 | — | 49 | EXAMPLE |
| 26 | G | 1205 | 1008 | 34 | 574 | 5.2 | — | 49 | EXAMPLE |
| 27 | G | 1245 | 934 | 29 | 516 | 8.0 | — | 48 | COMPARATIVE EXAMPLE |
| 28 | H | 1285 | 914 | 24 | 605 | 6.1 | — | 42 | EXAMPLE |
| 29 | H | 1260 | 936 | 31 | 583 | 5.9 | 600 | 65 | EXAMPLE |
| 30 | H | 1190 | 944 | 18 | 660 | 6.2 | — | 66 | EXAMPLE |
| 31 | I | 1255 | 943 | 25 | 590 | 6.4 | — | 52 | EXAMPLE |
| 32 | I | 1200 | 952 | 20 | 473 | 7.3 | — | 69 | EXAMPLE |
| 33 | I | 1175 | 916 | 21 | 617 | 7.4 | — | 59 | COMPARATIVE EXAMPLE |
| 34 | J | 1240 | 914 | 18 | 552 | 8.2 | — | 41 | EXAMPLE |
| 35 | J | 1220 | 988 | 29 | 520 | 7.1 | — | 78 | EXAMPLE |
| 36 | J | 1270 | 929 | 28 | 652 | 6.0 | — | 35 | COMPARATIVE EXAMPLE |
| 37 | K | 1195 | 899 | 20 | 643 | 5.4 | — | 35 | EXAMPLE |
| 38 | K | 1205 | 979 | 20 | 585 | 6.2 | — | 54 | EXAMPLE |
| 39 | K | 1240 | 953 | 33 | 615 | 7.1 | — | 82 | EXAMPLE |
| 40 | L | 1215 | 916 | 18 | 645 | 8.3 | — | 48 | EXAMPLE |
| 41 | L | 1205 | 926 | 24 | 507 | 5.2 | — | 58 | EXAMPLE |
| 42 | L | 1255 | 936 | 34 | 644 | 5.0 | — | 77 | COMPARATIVE EXAMPLE |
| 43 | M | 1205 | 917 | 29 | 506 | 5.2 | — | 40 | EXAMPLE |
| 44 | M | 1245 | 948 | 27 | 605 | 6.3 | — | 60 | EXAMPLE |
| 45 | M | 1265 | 906 | 34 | 574 | 8.4 | — | 48 | COMPARATIVE EXAMPLE |
| 46 | N | 1255 | 918 | 21 | 579 | 5.2 | — | 46 | EXAMPLE |

TABLE 3-continued

| EXPERIMENT EXAMPLE No. | STEEL TYPE | HOT ROLLING STEP ||||| SOFTENING ANNEALING STEP TREATMENT TEMPERATURE ° C. | COLD ROLLING STEP REDUCTION RATIO % | NOTE |
| | | SLAB HEATING TEMPERATURE ° C. | ROLLING COMPLETING TEMPERATURE ° C. | AVERAGE COOLING RATE BEFORE COILING ° C./SECOND | COILING TEMPERATURE $T_C$ ° C. | COIL COOLING RATE $10^{-3}$ ° C./SECOND | | | |
| --- | --- | --- | --- | --- | --- | --- | --- | --- | --- |
| 47 | N | 1210 | 940 | 23 | 680 | 7.1 | — | 38 | EXAMPLE |
| 48 | N | 1245 | 957 | 20 | 545 | 6.2 | — | 56 | COMPARATIVE EXAMPLE |
| 49 | O | 1260 | 922 | 24 | 610 | 6.2 | — | 56 | EXAMPLE |
| 50 | O | 1270 | 953 | 27 | 648 | 6.9 | — | 53 | EXAMPLE |
| 51 | O | 1205 | 908 | 25 | 586 | 6.0 | — | 67 | EXAMPLE |
| 52 | O | 1275 | 898 | 21 | 648 | 7.3 | — | 51 | EXAMPLE |
| 53 | O | 1185 | 924 | 21 | 510 | 8.0 | — | 53 | COMPARATIVE EXAMPLE |

TABLE 4

| EXPERIMENT EXAMPLE No. | STEEL TYPE | HOT ROLLING STEP ||||| SOFTENING ANNEALING STEP TREATMENT TEMPERATURE ° C. | COLD ROLLING STEP REDUCTION RATIO % | NOTE |
| | | SLAB HEATING TEMPERATURE ° C. | ROLLING COMPLETING TEMPERATURE ° C. | AVERAGE COOLING RATE BEFORE COILING ° C./SECOND | COILING TEMPERATURE $T_C$ ° C. | COIL COOLING RATE $10^{-3}$ ° C./SECOND | | | |
| --- | --- | --- | --- | --- | --- | --- | --- | --- | --- |
| 54 | O | 1185 | <u>822</u> | 23 | 606 | 6.3 | — | STOPPED | COMPARATIVE EXAMPLE |
| 55 | P | 1270 | 916 | 19 | 545 | 6.4 | — | 39 | EXAMPLE |
| 56 | P | 1190 | 948 | 34 | 542 | 8.3 | — | 73 | EXAMPLE |
| 57 | P | 1225 | 917 | 34 | 536 | <u>2.1</u> | — | 64 | COMPARATIVE EXAMPLE |
| 58 | Q | 1225 | 957 | 27 | 580 | 8.2 | — | 73 | EXAMPLE |
| 59 | Q | 1230 | 928 | 14 | 640 | 6.3 | — | 73 | EXAMPLE |
| 60 | Q | 1225 | 948 | 32 | 500 | 7.0 | 451 | 70 | EXAMPLE |
| 61 | Q | 1225 | 912 | 26 | 646 | 8.3 | — | 40 | EXAMPLE |
| 62 | Q | 1235 | 924 | 26 | 585 | 5.3 | — | 50 | EXAMPLE |
| 63 | Q | 1200 | 941 | 23 | 538 | 7.2 | 703 | 69 | EXAMPLE |
| 64 | R | 1245 | 952 | 20 | 607 | 5.0 | — | 56 | EXAMPLE |
| 65 | R | 1265 | 929 | 30 | 504 | 7.4 | — | 53 | EXAMPLE |
| 66 | R | 1195 | 908 | 27 | 517 | 5.0 | — | 46 | COMPARATIVE EXAMPLE |
| 67 | S | 1175 | 939 | 18 | 648 | 5.3 | — | 43 | EXAMPLE |
| 68 | S | 1230 | 934 | 19 | 651 | 5.4 | — | 54 | EXAMPLE |
| 69 | S | 1265 | 922 | 33 | 567 | 6.0 | — | 58 | COMPARATIVE EXAMPLE |
| 70 | T | 1250 | 926 | 27 | 624 | 8.0 | — | 45 | EXAMPLE |
| 71 | T | 1255 | 938 | 9 | 574 | 6.1 | — | 57 | EXAMPLE |
| 72 | T | 1275 | 923 | 25 | 537 | 5.0 | — | 68 | EXAMPLE |
| 73 | U | 1225 | 943 | 24 | 608 | 5.0 | — | 58 | EXAMPLE |
| 74 | U | 1230 | 915 | 13 | 612 | 6.0 | — | 34 | EXAMPLE |
| 75 | U | 1225 | 906 | <u>4</u> | 619 | 8.4 | — | 64 | COMPARATIVE EXAMPLE |
| 76 | V | 1220 | 930 | 26 | 513 | 6.0 | — | 53 | EXAMPLE |
| 77 | V | 1220 | 903 | 28 | 538 | 6.3 | — | 24 | EXAMPLE |
| 78 | V | 1240 | 902 | 28 | 611 | 8.0 | — | 56 | COMPARATIVE EXAMPLE |
| 79 | W | 1200 | 946 | 35 | 643 | 5.3 | — | 66 | EXAMPLE |
| 80 | W | 1275 | 949 | 24 | 656 | 5.0 | — | 47 | EXAMPLE |
| 81 | W | 1245 | 924 | 27 | 512 | 7.0 | — | 46 | EXAMPLE |
| 82 | X | 1235 | 904 | 34 | 552 | 8.4 | — | 67 | EXAMPLE |
| 83 | X | 1210 | 952 | 17 | 608 | 8.0 | — | 68 | EXAMPLE |
| 84 | X | <u>1040</u> | 938 | 27 | 615 | 8.4 | — | STOPPED | COMPARATIVE EXAMPLE |
| 85 | Y | 1240 | 907 | 25 | 609 | 5.1 | — | 78 | EXAMPLE |
| 86 | Y | 1265 | 952 | 21 | 539 | 8.1 | — | 31 | EXAMPLE |
| 87 | Y | 1175 | 946 | 32 | 574 | 8.2 | — | 33 | COMPARATIVE EXAMPLE |
| 88 | Z | 1230 | 905 | 32 | 590 | 6.4 | — | 47 | EXAMPLE |
| 89 | Z | 1265 | 948 | 21 | 647 | 5.2 | — | 80 | EXAMPLE |
| 90 | Z | 1240 | 911 | 17 | 514 | 7.3 | — | 48 | EXAMPLE |

TABLE 4-continued

| | | HOT ROLLING STEP | | | | | | | |
|---|---|---|---|---|---|---|---|---|---|
| EXPERIMENT EXAMPLE No. | STEEL TYPE | SLAB HEATING TEMPERATURE °C. | ROLLING COMPLETING TEMPERATURE °C. | AVERAGE COOLING RATE BEFORE COILING °C./ SECOND | COILING TEMPERATURE $T_C$ °C. | COIL COOLING RATE $10^{-3}$°C./ SECOND | SOFTENING ANNEALING STEP TREATMENT TEMPERATURE °C. | COLD ROLLING STEP REDUCTION RATIO % | NOTE |
| 91 | AA | 1190 | 951 | 21 | 644 | 8.3 | — | 66 | COMPARATIVE EXAMPLE |
| 92 | AB | 1175 | 937 | 30 | 541 | 6.3 | — | 49 | COMPARATIVE EXAMPLE |
| 93 | AC | 1230 | 954 | 34 | 554 | 8.3 | — | 65 | COMPARATIVE EXAMPLE |
| 94 | AD | EXPERIMENT STOPPED BECAUSE SLAB FRACTURED IN CASTING STEP | | | | | | | COMPARATIVE EXAMPLE |
| 95 | AE | 1265 | 930 | 35 | 549 | 6.0 | — | 47 | COMPARATIVE EXAMPLE |
| 96 | AF | EXPERIMENT STOPPED BECAUSE SLAB FRACTURED DURING HEATING IN HOT ROLLING STEP | | | | | | | COMPARATIVE EXAMPLE |
| 97 | AG | EXPERIMENT STOPPED BECAUSE SLAB FRACTURED DURING TRANSFER FROM CASTING STEP TO CASTING STEP | | | | | | | COMPARATIVE EXAMPLE |
| 98 | AH | 1260 | 907 | 23 | 640 | 7.4 | — | 47 | COMPARATIVE EXAMPLE |
| 99 | AI | EXPERIMENT STOPPED BECAUSE SLAB FRACTURED IN CASTING STEP | | | | | | | COMPARATIVE EXAMPLE |
| 100 | AJ | 1255 | 913 | 25 | 536 | 8.1 | — | 47 | COMPARATIVE EXAMPLE |
| 101 | AK | 1175 | 912 | 26 | 515 | 7.2 | — | 47 | COMPARATIVE EXAMPLE |
| 102 | A | 1240 | 924 | 28 | 585 | 9.2 | — | 50 | EXAMPLE |
| 103 | A | 1210 | 911 | 25 | 564 | 35.0 | — | 50 | COMPARATIVE EXAMPLE |
| 104 | B | 1220 | 921 | 20 | 571 | 8.7 | — | 50 | EXAMPLE |
| 105 | B | 1225 | 915 | 21 | 582 | 16.2 | — | 50 | COMPARATIVE EXAMPLE |
| 106 | E | 1210 | 911 | 20 | 719 | 6.5 | — | 50 | COMPARATIVE EXAMPLE |

Then, annealing of the cold-rolled steel sheets was performed (annealing step). Of the annealing, the average heating rate in the range of $A_{C1}$ to $(A_{C1}+25)°$ C., the maximum heating temperature $T_{max}$, and the retention time in the range of the maximum heating temperature $T_{max}$ to $(T_{max}-10)$ are illustrated in Table 5 and Table 6. The average cooling rate of the first cooling down to 650° C. after retention for the above-described retention time (first cooling rate) and the average cooling rate in the range of 650° C. to 500° C. of the second cooling (second cooling rate) are also illustrated in Table 5 and Table 6. In Table 5 and Table 6, the $A_{C1}$ point, the $A_{C3}$ point, $T_{max}$–the $A_{C1}$ point, and the parameter Q1 are also illustrated additionally. Each underline in Table 5 and Table 6 indicates that the corresponding numerical value is outside the range necessary for the manufacture of the high-strength steel sheet according to the present invention.

TABLE 5

| | | ANNEALING STEP | | | | | | | | |
|---|---|---|---|---|---|---|---|---|---|---|
| EXPERIMENT EXAMPLE No. | AVERAGE HEATING RATE °C./ SECOND | MAXIMUM HEATING TEMPERATURE $T_{max}$ °C. | RETENTION TIME $t_{max}$ SECOND | Ac1 °C. | Ac3 °C. | $T_{max}-$ Ac1 °C. | PARAMETER Q1 | FIRST COOLING RATE °C./ SECOND | SECOND COOLING RATE °C./ SECOND | NOTE |
| 1 | 1.8 | 791 | 160 | 721 | 823 | 70 | 1.10 | 3.4 | 15.8 | EXAMPLE |
| 2 | 6.6 | 765 | 284 | 721 | 823 | 44 | 1.65 | 11.9 | 37.2 | EXAMPLE |
| 3 | 1.5 | 813 | 103 | 721 | 823 | 92 | 0.76 | 2.9 | 18.9 | EXAMPLE |
| 4 | 6.8 | 813 | 74 | 721 | 823 | 92 | 0.57 | 3.4 | 47.0 | EXAMPLE |
| 5 | 5.2 | 790 | 101 | 721 | 823 | 69 | 1.08 | 7.1 | 8.8 | EXAMPLE |
| 6 | 3.9 | 793 | 168 | 721 | 823 | 72 | 1.03 | 3.4 | 27.0 | COMPARATIVE EXAMPLE |
| 7 | 6.1 | 789 | 132 | 718 | 853 | 71 | 0.75 | 1.8 | 2.7 | EXAMPLE |
| 8 | 0.6 | 818 | 38 | 718 | 853 | 100 | 0.06 | 1.9 | 46.5 | EXAMPLE |
| 9 | 7.0 | 788 | 164 | 718 | 853 | 70 | 0.93 | 1.9 | 28.8 | EXAMPLE |
| 10 | 4.9 | 815 | 18 | 718 | 853 | 97 | 0.08 | 0.8 | 28.8 | EXAMPLE |
| 11 | 4.0 | 814 | 131 | 718 | 853 | 96 | 0.59 | 1.3 | 24.9 | EXAMPLE |

TABLE 5-continued

| | ANNEALING STEP | | | | | | | | | |
|---|---|---|---|---|---|---|---|---|---|---|
| EXPERIMENT EXAMPLE No. | AVERAGE HEATING RATE °C./SECOND | MAXIMUM HEATING TEMPERATURE $T_{max}$ °C. | RETENTION TIME $t_{max}$ SECOND | Ac1 °C. | Ac3 °C. | $T_{max}$ − Ac1 °C. | PARAMETER Q1 | FIRST COOLING RATE °C./SECOND | SECOND COOLING RATE °C./SECOND | NOTE |
| 12 | 3.7 | 803 | 72 | 718 | 853 | 85 | 0.60 | 1.6 | 46.8 | COMPARATIVE EXAMPLE |
| 13 | 5.4 | 772 | 47 | 709 | 847 | 63 | 0.90 | 2.8 | 24.9 | EXAMPLE |
| 14 | 4.8 | 800 | 105 | 709 | 847 | 91 | 0.77 | 2.5 | 4.8 | EXAMPLE |
| 15 | 6.4 | 785 | 100 | 709 | 847 | 76 | 0.84 | 3.3 | 24.3 | COMPARATIVE EXAMPLE |
| 16 | 2.8 | 791 | 10 | 722 | 847 | 69 | 0.25 | 1.6 | 7.5 | EXAMPLE |
| 17 | 4.9 | 802 | 75 | 722 | 847 | 80 | 0.74 | 2.1 | 36.5 | EXAMPLE |
| 18 | 3.8 | 811 | 16 | 722 | 847 | 89 | 0.27 | 1.5 | 33.5 | COMPARATIVE EXAMPLE |
| 19 | 1.8 | 786 | 168 | 694 | 787 | 92 | 1.00 | 0.6 | 46.6 | EXAMPLE |
| 20 | 3.5 | 757 | 108 | 694 | 787 | 63 | 1.31 | 1.6 | 24.3 | EXAMPLE |
| 21 | 1.8 | 745 | 1020 | 694 | 787 | 51 | 2.04 | 3.0 | 38.3 | COMPARATIVE EXAMPLE |
| 22 | 6.5 | 800 | 43 | 730 | 808 | 70 | 0.63 | 2.1 | 36.4 | EXAMPLE |
| 23 | 5.8 | 815 | 8 | 730 | 808 | 85 | −0.22 | 2.2 | 6.5 | EXAMPLE |
| 24 | 5.0 | 803 | 108 | 730 | 808 | 73 | 0.64 | 1.8 | 24.5 | COMPARATIVE EXAMPLE |
| 25 | 3.5 | 758 | 75 | 694 | 783 | 64 | 1.43 | 0.9 | 24.3 | EXAMPLE |
| 26 | 7.0 | 793 | 103 | 694 | 783 | 99 | 0.91 | 2.1 | 45.9 | EXAMPLE |
| 27 | 4.0 | 794 | 41 | 694 | 783 | 100 | 0.73 | 3.2 | 6.9 | COMPARATIVE EXAMPLE |
| 28 | 3.2 | 793 | 128 | 733 | 874 | 60 | 0.81 | 3.4 | 25.4 | EXAMPLE |
| 29 | 2.5 | 803 | 136 | 733 | 874 | 70 | 0.74 | 2.7 | 34.4 | EXAMPLE |
| 30 | 5.8 | 819 | 72 | 733 | 874 | 86 | 0.25 | 1.6 | 16.7 | EXAMPLE |
| 31 | 0.8 | 811 | 76 | 742 | 898 | 69 | 0.70 | 1.5 | 17.9 | EXAMPLE |
| 32 | 5.3 | 836 | 133 | 742 | 898 | 94 | 0.69 | 1.8 | 16.6 | EXAMPLE |
| 33 | 4.8 | 820 | 107 | 742 | 898 | 78 | 0.65 | 1.4 | 6.5 | COMPARATIVE EXAMPLE |
| 34 | 5.8 | 818 | 104 | 725 | 875 | 93 | 0.50 | 2.9 | 6.0 | EXAMPLE |
| 35 | 1.0 | 796 | 102 | 725 | 875 | 71 | 0.81 | 1.5 | 17.2 | EXAMPLE |
| 36 | 4.5 | 788 | 99 | 725 | 875 | 63 | 0.72 | 3.5 | 1.5 | COMPARATIVE EXAMPLE |
| 37 | 5.7 | 837 | 102 | 740 | 855 | 97 | 0.73 | 3.1 | 6.3 | EXAMPLE |
| 38 | 2.2 | 828 | 131 | 740 | 855 | 88 | 1.00 | 2.2 | 47.4 | EXAMPLE |
| 39 | 4.4 | 808 | 162 | 740 | 855 | 68 | 1.25 | 3.3 | 48.7 | EXAMPLE |
| 40 | 6.3 | 808 | 39 | 723 | 880 | 85 | 0.15 | 3.1 | 7.3 | EXAMPLE |
| 41 | 7.0 | 789 | 136 | 723 | 880 | 66 | 0.91 | 6.3 | 45.3 | EXAMPLE |
| 42 | 0.2 | 809 | 107 | 723 | 880 | 86 | 0.41 | 2.7 | 25.3 | COMPARATIVE EXAMPLE |
| 43 | 1.5 | 872 | 41 | 735 | 938 | 137 | −0.33 | 2.5 | 17.4 | EXAMPLE |
| 44 | 4.8 | 981 | 32 | 735 | 938 | 246 | −1.60 | 2.2 | 33.1 | EXAMPLE |
| 45 | 4.7 | 795 | 44 | 735 | 938 | 60 | 0.43 | 2.1 | 43.9 | COMPARATIVE EXAMPLE |
| 46 | 3.8 | 779 | 138 | 700 | 816 | 79 | 1.04 | 1.3 | 35.5 | EXAMPLE |
| 47 | 1.7 | 786 | 45 | 700 | 816 | 86 | 0.48 | 2.4 | 7.6 | EXAMPLE |
| 48 | 1.2 | 762 | 164 | 700 | 816 | 62 | 1.39 | 2.3 | 45.0 | COMPARATIVE EXAMPLE |
| 49 | 4.8 | 823 | 134 | 755 | 846 | 68 | 0.90 | 3.1 | 45.2 | EXAMPLE |
| 50 | 6.3 | 916 | 71 | 755 | 846 | 161 | −0.32 | 3.3 | 17.4 | EXAMPLE |
| 51 | 5.2 | 805 | 107 | 755 | 846 | 50 | 1.10 | 2.0 | 14.0 | EXAMPLE |
| 52 | 4.0 | 825 | 129 | 755 | 846 | 70 | 0.80 | 1.9 | 38.4 | EXAMPLE |
| 53 | 6.6 | 831 | 164 | 755 | 846 | 76 | 0.99 | 2.2 | 37.1 | COMPARATIVE EXAMPLE |

TABLE 6

| EXPERIMENT EXAMPLE No. | AVERAGE HEATING RATE °C./SECOND | MAXIMUM HEATING TEMPERATURE $T_{max}$ °C. | ANNEALING STEP RETENTION TIME $t_{max}$ SECOND | Ac1 °C. | Ac3 °C. | $T_{max}$ − Ac1 °C. | PARAMETER Q1 | FIRST COOLING RATE °C./SECOND | SECOND COOLING RATE °C./SECOND | NOTE |
|---|---|---|---|---|---|---|---|---|---|---|
| 54 | EXPERIMENT STOPPED BECAUSE OF SHAPE FAILURE OF STEEL SHEET AFTER HOT ROLLING | | | | | | | | | COMPARATIVE EXAMPLE |
| 55 | 3.0 | 800 | 132 | 719 | 829 | 81 | 0.98 | 1.2 | 14.3 | EXAMPLE |
| 56 | 4.7 | 881 | 1200 | 719 | 829 | 162 | 0.64 | 2.5 | 12.9 | EXAMPLE |
| 57 | 5.8 | 801 | 78 | 719 | 829 | 82 | 0.84 | 3.0 | 34.8 | COMPARATIVE EXAMPLE |
| 58 | 0.9 | 788 | 132 | 728 | 859 | 60 | 1.04 | 3.4 | 8.0 | EXAMPLE |
| 59 | 1.9 | 807 | 69 | 728 | 859 | 79 | 0.53 | 1.6 | 28.6 | EXAMPLE |
| 60 | 4.3 | 819 | 168 | 728 | 859 | 91 | 0.80 | 2.1 | 35.8 | EXAMPLE |
| 61 | 2.4 | 804 | 137 | 728 | 859 | 76 | 0.74 | 1.8 | 4.7 | EXAMPLE |
| 62 | 2.7 | 805 | 11 | 728 | 859 | 77 | 0.15 | 1.9 | 5.8 | EXAMPLE |
| 63 | 6.1 | 813 | 68 | 728 | 859 | 85 | 0.60 | 1.5 | 17.5 | EXAMPLE |
| 64 | 5.2 | 773 | 70 | 695 | 830 | 78 | 0.88 | 1.9 | 6.9 | EXAMPLE |
| 65 | 2.0 | 755 | 362 | 695 | 830 | 60 | 1.72 | 3.3 | 47.1 | EXAMPLE |
| 66 | 1.0 | 794 | 41 | 695 | 830 | 99 | 0.56 | 2.7 | 36.2 | COMPARATIVE EXAMPLE |
| 67 | 1.0 | 782 | 107 | 708 | 833 | 74 | 1.28 | 2.5 | 33.5 | EXAMPLE |
| 68 | 40.5 | 798 | 165 | 708 | 833 | 90 | 1.18 | 1.5 | 18.5 | EXAMPLE |
| 69 | 1.9 | 775 | 900 | 708 | 833 | 67 | <u>2.08</u> | 3.5 | 28.5 | EXAMPLE |
| 70 | 1.8 | 772 | 134 | 698 | 795 | 74 | 1.06 | 3.2 | 12.7 | EXAMPLE |
| 71 | 2.1 | 784 | 38 | 698 | 795 | 86 | 0.63 | 2.2 | 29.0 | EXAMPLE |
| 72 | 6.8 | 775 | 166 | 698 | 795 | 77 | 1.20 | 2.1 | 46.2 | EXAMPLE |
| 73 | 2.8 | 778 | 42 | 700 | 810 | 78 | 0.72 | 3.3 | 27.3 | EXAMPLE |
| 74 | 4.3 | 796 | 41 | 700 | 810 | 96 | 0.46 | 12.6 | 33.1 | EXAMPLE |
| 75 | 3.4 | 778 | 24 | 700 | 810 | 78 | 0.56 | 2.7 | 36.5 | COMPARATIVE EXAMPLE |
| 76 | 1.9 | 834 | 133 | 740 | 900 | 94 | 1.30 | 2.4 | 5.9 | EXAMPLE |
| 77 | 5.8 | 830 | 163 | 740 | 900 | 90 | 1.37 | 1.9 | 5.3 | EXAMPLE |
| 78 | 3.5 | 806 | 167 | 740 | 900 | 66 | 1.55 | <u>0.2</u> | 15.4 | COMPARATIVE EXAMPLE |
| 79 | 5.9 | 759 | 98 | 685 | 818 | 74 | 1.11 | 2.5 | 15.9 | EXAMPLE |
| 80 | 2.3 | 745 | 73 | 685 | 818 | 60 | 1.25 | 3.4 | 35.6 | EXAMPLE |
| 81 | 3.6 | 762 | 14 | 685 | 818 | 77 | 0.73 | 2.2 | 45.9 | EXAMPLE |
| 82 | 3.8 | 782 | 107 | 713 | 826 | 69 | 1.07 | 1.4 | 25.1 | EXAMPLE |
| 83 | 3.4 | 797 | 107 | 713 | 826 | 84 | 0.79 | 21.9 | 35.7 | EXAMPLE |
| 84 | EXPERIMENT STOPPED BECAUSE STEEL SHEET FRACTURED IN COLD ROLLING STEP | | | | | | | | | COMPARATIVE EXAMPLE |
| 85 | 3.1 | 821 | 98 | 750 | 847 | 71 | 0.99 | 2.3 | 28.7 | EXAMPLE |
| 86 | 5.6 | 834 | 108 | 750 | 847 | 84 | 0.97 | 2.9 | 8.1 | EXAMPLE |
| 87 | 5.2 | <u>777</u> | 108 | 750 | 847 | <u>27</u> | 1.66 | 3.1 | 45.9 | COMPARATIVE EXAMPLE |
| 88 | 3.6 | 773 | 138 | 710 | 839 | 63 | 1.05 | 2.4 | 34.9 | EXAMPLE |
| 89 | 5.0 | 799 | 159 | 710 | 839 | 89 | 0.63 | 1.3 | 17.8 | EXAMPLE |
| 90 | 6.8 | 803 | 69 | 710 | 839 | 93 | 0.54 | 3.1 | 17.4 | EXAMPLE |
| 91 | 1.4 | 809 | 158 | 720 | 863 | 89 | 0.70 | 2.4 | 17.4 | COMPARATIVE EXAMPLE |
| 92 | 5.6 | 780 | 102 | 715 | 770 | 65 | 0.94 | 2.0 | 8.9 | COMPARATIVE EXAMPLE |
| 93 | 2.5 | 774 | 74 | 708 | 821 | 66 | 1.43 | 2.1 | 23.1 | COMPARATIVE EXAMPLE |
| 94 | EXPERIMENT STOPPED BECAUSE SLAB FRACTURED IN CASTING STEP | | | | | | | | | COMPARATIVE EXAMPLE |
| 95 | 1.3 | 822 | 158 | 745 | 875 | 77 | 1.04 | 3.0 | 46.6 | COMPARATIVE EXAMPLE |
| 96 | EXPERIMENT STOPPED BECAUSE SLAB FRACTURED DURING HEATING IN HOT ROLLING STEP | | | | | | | | | COMPARATIVE EXAMPLE |
| 97 | EXPERIMENT STOPPED BECAUSE SLAB FRACTURED DURING TRANSFER FROM CASTING STEP TO HOT ROLLING STEP | | | | | | | | | COMPARATIVE EXAMPLE |
| 98 | 3.8 | 784 | 100 | 720 | 835 | 64 | 0.85 | 2.1 | 17.2 | COMPARATIVE EXAMPLE |
| 99 | EXPERIMENT STOPPED BECAUSE SLAB FRACTURED IN CASTING STEP | | | | | | | | | COMPARATIVE EXAMPLE |
| 100 | 2.2 | 785 | 160 | 708 | 828 | 77 | 0.97 | 1.9 | 46.5 | COMPARATIVE EXAMPLE |
| 101 | 1.9 | 788 | 100 | 710 | 828 | 78 | 0.90 | 3.1 | 26.0 | COMPARATIVE EXAMPLE |
| 102 | 2.4 | 794 | 154 | 721 | 823 | 73 | 1.10 | 3.7 | 13.6 | EXAMPLE |
| 103 | 1.6 | 789 | 156 | 721 | 823 | 68 | 1.08 | 3.1 | 14.0 | COMPARATIVE EXAMPLE |
| 104 | 6.8 | 785 | 139 | 718 | 853 | 67 | 0.76 | 1.7 | 3.0 | EXAMPLE |

TABLE 6-continued

| | | ANNEALING STEP | | | | | | | | |
|---|---|---|---|---|---|---|---|---|---|---|
| EXPERIMENT EXAMPLE No. | AVERAGE HEATING RATE °C./ SECOND | MAXIMUM HEATING TEMPERATURE $T_{max}$ °C. | RETENTION TIME $t_{max}$ SECOND | Ac1 °C. | Ac3 °C. | $T_{max}$ − Ac1 °C. | PARAMETER Q1 | FIRST COOLING RATE °C./ SECOND | SECOND COOLING RATE °C./ SECOND | NOTE |
| 105 | 5.9 | 790 | 134 | 718 | 853 | 72 | 0.76 | 1.7 | 2.8 | COMPARATIVE EXAMPLE |
| 106 | 2.1 | 792 | 151 | 694 | 787 | 98 | 1.02 | 1.2 | 42.2 | COMPARATIVE EXAMPLE |

The second cooling was stopped at the second cooling stop temperature and the bainite transformation process was performed (bainite transformation step). The second cooling stop temperature, an average process temperature $T_B$ and a process time $t_B$ of the bainite transformation process, and the parameter Q2 are illustrated in Table 7 and Table 8. The average process temperature $T_B$ is calculated by using the following expression.

$$T_B = \Sigma(T_i)/10 = (T_1 + T_2 + T_3 + \ldots + T_{10})/10$$

(In the expression, $T_i$ indicates the average temperature [° C.] in the ith range out of 10 parts into which the process time of the bainite transformation step is equally divided.)

As for the experiment example in which the second cooling stop temperature is in a range of Ms* to Mf*+50 [° C.] illustrated in Table 7 and Table 8, after the cooling was stopped at the second cooling stop temperature, reheating was performed up to a temperature of 340 to 500° C. and then the bainite transformation process was performed. Each underline in Table 7 and Table 8 indicates that the corresponding numerical value is outside the range necessary for the manufacture of the high-strength steel sheet according to the present invention.

TABLE 7

| | BAINITE TRANSFORMATION STEP | | | | | | |
|---|---|---|---|---|---|---|---|
| EXPERIMENT EXAMPLE No. | SECOND COOLING STOP TEMPERATURE °C. | Ms* °C. | Mf* + 50 °C. | AVERAGE PROCESS TEMPERATURE $T_B$ °C. | PROCESS TIME $t_B$ SECOND | PARAMETER Q2 | NOTE |
| 1 | 434 | 313 | 162 | 435 | 10 | 1.12 | EXAMPLE |
| 2 | 462 | 199 | 14 | 471 | 25 | 1.20 | EXAMPLE |
| 3 | 473 | 375 | 247 | 479 | 32 | 0.96 | EXAMPLE |
| 4 | 465 | 344 | 204 | 453 | 24 | 1.53 | EXAMPLE |
| 5 | 444 | 328 | 181 | 438 | 10 | 0.91 | EXAMPLE |
| 6 | 466 | 319 | 170 | 469 | 28 | 1.36 | COMPARATIVE EXAMPLE |
| 7 | 439 | 259 | 93 | 435 | 65 | 0.64 | EXAMPLE |
| 8 | 426 | 340 | 207 | 433 | 29 | 0.47 | EXAMPLE |
| 9 | 442 | 259 | 93 | 447 | 51 | 0.42 | EXAMPLE |
| 10 | 478 | 306 | 157 | 468 | 235 | 0.40 | EXAMPLE |
| 11 | 434 | 342 | 209 | 469 | 34 | 0.12 | EXAMPLE |
| 12 | 486 | 315 | 170 | 484 | 15 | 0.03 | COMPARATIVE EXAMPLE |
| 13 | 476 | 359 | 191 | 465 | 26 | 0.24 | EXAMPLE |
| 14 | 490 | 383 | 234 | 475 | 33 | 0.14 | EXAMPLE |
| 15 | 445 | 351 | 178 | 438 | 41 | 0.62 | COMPARATIVE EXAMPLE |
| 16 | 473 | 383 | 226 | 473 | 11 | 0.67 | EXAMPLE |
| 17 | 440 | 406 | 263 | 448 | 25 | 1.22 | EXAMPLE |
| 18 | 425 | 411 | 273 | 433 | 28 | 1.40 | COMPARATIVE EXAMPLE |
| 19 | 434 | 286 | 151 | 434 | 25 | 0.64 | EXAMPLE |
| 20 | 426 | 257 | 113 | 445 | 30 | 0.64 | EXAMPLE |
| 21 | 399 | 201 | 42 | 436 | 34 | 0.63 | COMPARATIVE EXAMPLE |
| 22 | 470 | 280 | 150 | 475 | 19 | 0.30 | EXAMPLE |
| 23 | 444 | 307 | 184 | 445 | 34 | 0.97 | EXAMPLE |
| 24 | 491 | 289 | 161 | 483 | 20 | 0.19 | COMPARATIVE EXAMPLE |
| 25 | 462 | 301 | 156 | 462 | 20 | 1.45 | EXAMPLE |
| 26 | 491 | 366 | 245 | 487 | 8 | 0.42 | EXAMPLE |
| 27 | 437 | 370 | 250 | 443 | 16 | 1.26 | COMPARATIVE EXAMPLE |
| 28 | 412 | 262 | 85 | 438 | 15 | 0.25 | EXAMPLE |
| 29 | 450 | 271 | 98 | 450 | 43 | 0.33 | EXAMPLE |
| 30 | 467 | 316 | 162 | 469 | 34 | 0.12 | EXAMPLE |
| 31 | 499 | 298 | 113 | 490 | 17 | 0.20 | EXAMPLE |

TABLE 7-continued

| | BAINITE TRANSFORMATION STEP | | | | | | |
|---|---|---|---|---|---|---|---|
| EXPERIMENT EXAMPLE No. | SECOND COOLING STOP TEMPERATURE °C. | Ms* °C. | Mf* + 50 °C. | AVERAGE PROCESS TEMPERATURE $T_B$ °C. | PROCESS TIME $t_B$ SECOND | PARAMETER Q2 | NOTE |
| 32 | 438 | 362 | 206 | 450 | 23 | 0.90 | EXAMPLE |
| 33 | 440 | 357 | 199 | 438 | 8 | 0.58 | COMPARATIVE EXAMPLE |
| 34 | 390 | 308 | 157 | 386 | 26 | 2.18 | EXAMPLE |
| 35 | 460 | 197 | 17 | 467 | 3 | 2.07 | EXAMPLE |
| 36 | 463 | 159 | −31 | 465 | 5 | 2.73 | COMPARATIVE EXAMPLE |
| 37 | 455 | 379 | 245 | 441 | 38 | 2.30 | EXAMPLE |
| 38 | 473 | 349 | 201 | 473 | 33 | 1.55 | EXAMPLE |
| 39 | 478 | 335 | 182 | 485 | 26 | 0.97 | EXAMPLE |
| 40 | 472 | 301 | 150 | 468 | 12 | 2.26 | EXAMPLE |
| 41 | 479 | 147 | −45 | 467 | 15 | 2.75 | EXAMPLE |
| 42 | 501 | 291 | 136 | 487 | 13 | 2.04 | COMPARATIVE EXAMPLE |
| 43 | 385 | 340 | 183 | 407 | 8 | 1.85 | EXAMPLE |
| 44 | 458 | 407 | 280 | 487 | 6 | 2.12 | EXAMPLE |
| 45 | 455 | 209 | 10 | 447 | 45 | 6.34 | COMPARATIVE EXAMPLE |
| 46 | 308 | 345 | 201 | 465 | 14 | 0.45 | EXAMPLE |
| 47 | 465 | 349 | 206 | 479 | 22 | 0.30 | EXAMPLE |
| 48 | 495 | 303 | 141 | 486 | 127 | 0.51 | COMPARATIVE EXAMPLE |
| 49 | 436 | 283 | 135 | 443 | 38 | 0.36 | EXAMPLE |
| 50 | 458 | 364 | 244 | 456 | 131 | 0.42 | EXAMPLE |
| 51 | 457 | 233 | 70 | 468 | 29 | 0.11 | EXAMPLE |
| 52 | 222 | 287 | 139 | 405 | 55 | 0.56 | EXAMPLE |
| 53 | 441 | 287 | 139 | 448 | 45 | 0.29 | COMPARATIVE EXAMPLE |

TABLE 8

| | BAINITE TRANSFORMATION STEP | | | | | | |
|---|---|---|---|---|---|---|---|
| EXPERIMENT EXAMPLE No. | SECOND COOLING STOP TEMPERATURE °C. | Ms* °C. | Mf* + 50 °C. | AVERAGE PROCESS TEMPERATURE $T_B$ °C. | PROCESS TIME $t_B$ SECOND | PARAMETER Q2 | NOTE |
| 54 | EXPERIMENT STOPPED BECAUSE OF SHAPE FAILURE OF STEEL SHEET AFTER HOT ROLLING | | | | | | COMPARATIVE EXAMPLE |
| 55 | 448 | 348 | 208 | 439 | 29 | 1.54 | EXAMPLE |
| 56 | 449 | 391 | 271 | 456 | 12 | 0.98 | EXAMPLE |
| 57 | 449 | 362 | 228 | 452 | 44 | 1.85 | COMPARATIVE EXAMPLE |
| 58 | 459 | 304 | 139 | 470 | 44 | 0.66 | EXAMPLE |
| 59 | 453 | 321 | 163 | 475 | 26 | 0.43 | EXAMPLE |
| 60 | 472 | 336 | 183 | 481 | 9 | 0.22 | EXAMPLE |
| 61 | 269 | 324 | 167 | 450 | 5 | 0.34 | EXAMPLE |
| 62 | 473 | 304 | 139 | 474 | 15 | 0.34 | EXAMPLE |
| 63 | 484 | 330 | 176 | 482 | 30 | 0.42 | EXAMPLE |
| 64 | 427 | 335 | 175 | 443 | 5 | 0.37 | EXAMPLE |
| 65 | 453 | 297 | 121 | 456 | 30 | 0.64 | EXAMPLE |
| 66 | 441 | 367 | 224 | 444 | 14 | 0.53 | COMPARATIVE EXAMPLE |
| 67 | 447 | 320 | 176 | 446 | 31 | 1.88 | EXAMPLE |
| 68 | 434 | 312 | 166 | 469 | 18 | 1.25 | EXAMPLE |
| 69 | 400 | 297 | 145 | 421 | 34 | 2.10 | COMPARATIVE EXAMPLE |
| 70 | 387 | 296 | 163 | 373 | 226 | 1.70 | EXAMPLE |
| 71 | 479 | 270 | 130 | 480 | 146 | 0.89 | EXAMPLE |
| 72 | 431 | 284 | 147 | 429 | 27 | 1.04 | EXAMPLE |
| 73 | 459 | 301 | 158 | 468 | 130 | 1.51 | EXAMPLE |
| 74 | 476 | 324 | 188 | 479 | 35 | 0.56 | EXAMPLE |
| 75 | 424 | 293 | 147 | 432 | 16 | 0.81 | COMPARATIVE EXAMPLE |
| 76 | 405 | 387 | 233 | 391 | 16 | 2.54 | EXAMPLE |
| 77 | 450 | 390 | 237 | 449 | 3 | 2.41 | EXAMPLE |
| 78 | 425 | 313 | 131 | 426 | 4 | 2.08 | COMPARATIVE EXAMPLE |
| 79 | 452 | 324 | 155 | 437 | 10 | 0.63 | EXAMPLE |

TABLE 8-continued

| | BAINITE TRANSFORMATION STEP | | | | | | |
|---|---|---|---|---|---|---|---|
| EXPERIMENT EXAMPLE No. | SECOND COOLING STOP TEMPERATURE ° C. | Ms* ° C. | Mf* + 50 ° C. | AVERAGE PROCESS TEMPERATURE $T_B$ ° C. | PROCESS TIME $t_B$ SECOND | PARAMETER Q2 | NOTE |
| 80 | 443 | 324 | 155 | 443 | 85 | 1.61 | EXAMPLE |
| 81 | 384 | 339 | 177 | 387 | 139 | 1.91 | EXAMPLE |
| 82 | 499 | 336 | 182 | 486 | 47 | 0.53 | EXAMPLE |
| 83 | 428 | 355 | 209 | 458 | 11 | 0.72 | EXAMPLE |
| 84 | EXPERIMENT STOPPED BECAUSE STEEL SHEET FRACTURED IN COLD ROLLING STEP | | | | | | COMPARATIVE EXAMPLE |
| 85 | 426 | 388 | 250 | 448 | 24 | 1.08 | EXAMPLE |
| 86 | 445 | 386 | 247 | 430 | 9 | 0.74 | EXAMPLE |
| 87 | 454 | 159 | −54 | 479 | 28 | 0.46 | COMPARATIVE EXAMPLE |
| 88 | 402 | 222 | 43 | 425 | 14 | 0.26 | EXAMPLE |
| 89 | 464 | 328 | 190 | 469 | 35 | 0.12 | EXAMPLE |
| 90 | 461 | 323 | 182 | 465 | 53 | 0.19 | EXAMPLE |
| 91 | 447 | 423 | 268 | 460 | 37 | 0.87 | COMPARATIVE EXAMPLE |
| 92 | 411 | 211 | 85 | 432 | 31 | 0.58 | COMPARATIVE EXAMPLE |
| 93 | 483 | 395 | 237 | 484 | 13 | 2.67 | COMPARATIVE EXAMPLE |
| 94 | EXPERIMENT STOPPED BECAUSE SLAB FRACTURED IN CASTING STEP | | | | | | COMPARATIVE EXAMPLE |
| 95 | 465 | 360 | 178 | 482 | 5 | 2.47 | COMPARATIVE EXAMPLE |
| 96 | EXPERIMENT STOPPED BECAUSE SLAB FRACTURED DURING HEATING IN HOT ROLLING STEP | | | | | | COMPARATIVE EXAMPLE |
| 97 | EXPERIMENT STOPPED BECAUSE SLAB FRACTURED DURING TRANSFER FROM CASTING STEP TO HOT ROLLING STEP | | | | | | COMPARATIVE EXAMPLE |
| 98 | 420 | 327 | 167 | 456 | 36 | 0.76 | COMPARATIVE EXAMPLE |
| 99 | EXPERIMENT STOPPED BECAUSE SLAB FRACTURED IN CASTING STEP | | | | | | COMPARATIVE EXAMPLE |
| 100 | 454 | 270 | 118 | 439 | 123 | 0.58 | COMPARATIVE EXAMPLE |
| 101 | 456 | 304 | 150 | 456 | 45 | 0.81 | COMPARATIVE EXAMPLE |
| 102 | 434 | 303 | 159 | 430 | 10 | 1.04 | EXAMPLE |
| 103 | 439 | 298 | 152 | 428 | 10 | 1.09 | COMPARATIVE EXAMPLE |
| 104 | 434 | 251 | 80 | 420 | 60 | 0.58 | EXAMPLE |
| 105 | 440 | 255 | 83 | 420 | 61 | 0.54 | COMPARATIVE EXAMPLE |
| 106 | 444 | 286 | 151 | 424 | 28 | 0.67 | COMPARATIVE EXAMPLE |

After the bainite transformation process, the martensite transformation process was performed (martensite transformation step). In the martensite transformation step, the average cooling rate in the range of 340° C. to Ms point of the third cooling (third cooling rate) and the stop temperature (third cooling stop temperature) are illustrated in Table 9 and Table 10. Some of the cold-rolled steel sheets were subjected to the second cold rolling at a rolling ratio illustrated in Table 9 and Table 10 after the martensite transformation step (second cold rolling step). In Table 9 and Table 10, the Ms point and the Mf point are also illustrated additionally. Each underline in Table 9 and Table 10 indicates that the corresponding numerical value is outside the range necessary for the manufacture of the high-strength steel sheet according to the present invention.

TABLE 9

| | MARTENSITE TRANSFORMATION STEP | | | | | |
|---|---|---|---|---|---|---|
| EXPERIMENT EXAMPLE No. | THIRD COOLING RATE ° C./SECOND | THIRD COOLING STOP TEMPERATURE ° C. | Ms ° C. | Mf ° C. | SECOND COLD ROLLING STEP ROLLING RATIO % | NOTE |
| 1 | 4.5 | 16 | 117 | −28 | — | EXAMPLE |
| 2 | 3.1 | 47 | 124 | −24 | 0.03 | EXAMPLE |
| 3 | 7.4 | 20 | 138 | −17 | 0.06 | EXAMPLE |
| 4 | 1.8 | 28 | 164 | −3 | 0.05 | EXAMPLE |
| 5 | 6.7 | 33 | 65 | −47 | — | EXAMPLE |

TABLE 9-continued

| | MARTENSITE TRANSFORMATION STEP | | | | | |
|---|---|---|---|---|---|---|
| EXPERIMENT EXAMPLE No. | THIRD COOLING RATE °C./SECOND | THIRD COOLING STOP TEMPERATURE °C. | Ms °C. | Mf °C. | SECOND COLD ROLLING STEP ROLLING RATIO % | NOTE |
| 6 | 6.7 | <u>−66</u> | 109 | −31 | — | COMPARATIVE EXAMPLE |
| 7 | 7.4 | 26 | 170 | −13 | — | EXAMPLE |
| 8 | 17.6 | 32 | 170 | −13 | — | EXAMPLE |
| 9 | 4.9 | 42 | 112 | −48 | 0.05 | EXAMPLE |
| 10 | 6.4 | 25 | 140 | −32 | 0.17 | EXAMPLE |
| 11 | 6.4 | 24 | 208 | 15 | — | EXAMPLE |
| 12 | 4.7 | 44 | 267 | 66 | — | COMPARATIVE EXAMPLE |
| 13 | 4.8 | −2 | 161 | −18 | — | EXAMPLE |
| 14 | 6.4 | 15 | 193 | 4 | — | EXAMPLE |
| 15 | 6.9 | 3 | 148 | −26 | — | COMPARATIVE EXAMPLE |
| 16 | 7.4 | 9 | 68 | −48 | — | EXAMPLE |
| 17 | 5.3 | 17 | 50 | −53 | 0.06 | EXAMPLE |
| 18 | 4.5 | −3 | 84 | −42 | — | COMPARATIVE EXAMPLE |
| 19 | 6.3 | 6 | 76 | −63 | 0.20 | EXAMPLE |
| 20 | 7.5 | 17 | 63 | −68 | — | EXAMPLE |
| 21 | 4.7 | 4 | 88 | −57 | — | COMPARATIVE EXAMPLE |
| 22 | 7.2 | 9 | 155 | −15 | — | EXAMPLE |
| 23 | 7.1 | 23 | 100 | −44 | — | EXAMPLE |
| 24 | 6.9 | <u>141</u> | 128 | −31 | — | COMPARATIVE EXAMPLE |
| 25 | 4.9 | 2 | 102 | −35 | — | EXAMPLE |
| 26 | 11.7 | 17 | 109 | −32 | — | EXAMPLE |
| 27 | <u>0.3</u> | 20 | 129 | −23 | — | COMPARATIVE EXAMPLE |
| 28 | 6.7 | 17 | 110 | −48 | — | EXAMPLE |
| 29 | 7.8 | 16 | 91 | −58 | — | EXAMPLE |
| 30 | 4.4 | 42 | 209 | 16 | 1.35 | EXAMPLE |
| 31 | 4.9 | 12 | 166 | −5 | — | EXAMPLE |
| 32 | 5.9 | 22 | 32 | −62 | — | EXAMPLE |
| 33 | 7.0 | 22 | 147 | −16 | — | COMPARATIVE EXAMPLE |
| 34 | 6.0 | 37 | 80 | −28 | — | EXAMPLE |
| 35 | 11.8 | 37 | 105 | −20 | — | EXAMPLE |
| 36 | 5.9 | 23 | 80 | −28 | — | COMPARATIVE EXAMPLE |
| 37 | 7.9 | 1 | 134 | −13 | — | EXAMPLE |
| 38 | 6.0 | 22 | 109 | −24 | — | EXAMPLE |
| 39 | 7.9 | 25 | 109 | −24 | — | EXAMPLE |
| 40 | 6.3 | 24 | 142 | −13 | — | EXAMPLE |
| 41 | 7.6 | 28 | 83 | −38 | — | EXAMPLE |
| 42 | 7.3 | 31 | 128 | −19 | — | COMPARATIVE EXAMPLE |
| 43 | 6.4 | 24 | 96 | −28 | — | EXAMPLE |
| 44 | 8.1 | 11 | 107 | −25 | — | EXAMPLE |
| 45 | 8.3 | 5 | — | — | — | COMPARATIVE EXAMPLE |
| 46 | 8.2 | 7 | 176 | −4 | — | EXAMPLE |
| 47 | 4.2 | 14 | 148 | −21 | — | EXAMPLE |
| 48 | 7.8 | 14 | 95 | −48 | — | COMPARATIVE EXAMPLE |
| 49 | 8.1 | 87 | 132 | −23 | — | EXAMPLE |
| 50 | 5.7 | 17 | 114 | −32 | — | EXAMPLE |
| 51 | 6.4 | 118 | 174 | 0 | — | EXAMPLE |
| 52 | 5.9 | 21 | 71 | −48 | — | EXAMPLE |
| 53 | 5.3 | 3 | 132 | −23 | <u>12.0</u> | COMPARATIVE EXAMPLE |

TABLE 10

| EXPERIMENT EXAMPLE No. | MARTENSITE TRANSFORMATION STEP | | | | SECOND COLD ROLLING STEP ROLLING RATIO % | NOTE |
|---|---|---|---|---|---|---|
| | THIRD COOLING RATE °C./SECOND | THIRD COOLING STOP TEMPERATURE °C. | Ms °C. | Mf °C. | | |
| 54 | EXPERIMENT STOPPED BECAUSE OF SHAPE FAILURE OF STEEL SHEET AFTER HOT ROLLING | | | | | COMPARATIVE EXAMPLE |
| 55 | 6.1 | 23 | 106 | −32 | — | EXAMPLE |
| 56 | 6.0 | 33 | 149 | −12 | — | EXAMPLE |
| 57 | 5.1 | 35 | 118 | −27 | — | COMPARATIVE EXAMPLE |
| 58 | 5.6 | −35 | 56 | −58 | — | EXAMPLE |
| 59 | 4.7 | −14 | 100 | −42 | — | EXAMPLE |
| 60 | 7.9 | 17 | 174 | −2 | — | EXAMPLE |
| 61 | 5.4 | 35 | 144 | −20 | — | EXAMPLE |
| 62 | 6.9 | 59 | 160 | −11 | — | EXAMPLE |
| 63 | 7.8 | 25 | 128 | −29 | — | EXAMPLE |
| 64 | 6.1 | −2 | 157 | −17 | — | EXAMPLE |
| 65 | 8.1 | 33 | 119 | −39 | — | EXAMPLE |
| 66 | 7.9 | 17 | 139 | −28 | — | COMPARATIVE EXAMPLE |
| 67 | 6.9 | 27 | 89 | −44 | — | EXAMPLE |
| 68 | 4.6 | 4 | 145 | −18 | — | EXAMPLE |
| 69 | 7.4 | 26 | 139 | −21 | — | COMPARATIVE EXAMPLE |
| 70 | 7.0 | 9 | 173 | −6 | — | EXAMPLE |
| 71 | 8.3 | 25 | 103 | −44 | — | EXAMPLE |
| 72 | 7.5 | −3 | 130 | −31 | — | EXAMPLE |
| 73 | 7.5 | 10 | 71 | −55 | — | EXAMPLE |
| 74 | 6.1 | −1 | 147 | −20 | — | EXAMPLE |
| 75 | 7.2 | 9 | 109 | −40 | — | COMPARATIVE EXAMPLE |
| 76 | 8.0 | 31 | 100 | −8 | — | EXAMPLE |
| 77 | 4.3 | 21 | 135 | 3 | — | EXAMPLE |
| 78 | 8.0 | 29 | 124 | −1 | — | COMPARATIVE EXAMPLE |
| 79 | 7.4 | 19 | 154 | −18 | 0.55 | EXAMPLE |
| 80 | 2.7 | 6 | 124 | −36 | — | EXAMPLE |
| 81 | 6.9 | 4 | 112 | −42 | — | EXAMPLE |
| 82 | 7.7 | 10 | 156 | −12 | — | EXAMPLE |
| 83 | 5.1 | 4 | 113 | −34 | — | EXAMPLE |
| 84 | EXPERIMENT STOPPED BECAUSE STEEL SHEET FRACTURED IN COLD ROLLING STEP | | | | | COMPARATIVE EXAMPLE |
| 85 | 4.8 | 37 | 124 | −16 | — | EXAMPLE |
| 86 | 1.6 | 76 | 175 | 9 | — | EXAMPLE |
| 87 | 8.1 | 28 | 115 | −20 | — | COMPARATIVE EXAMPLE |
| 88 | 7.7 | 28 | 78 | −67 | — | EXAMPLE |
| 89 | 6.9 | 125 | 218 | 23 | — | EXAMPLE |
| 90 | 6.4 | 4 | 158 | −22 | — | EXAMPLE |
| 91 | 7.6 | 30 | −7 | −72 | — | COMPARATIVE EXAMPLE |
| 92 | 5.7 | 3 | 83 | −62 | — | COMPARATIVE EXAMPLE |
| 93 | 4.7 | 34 | 165 | 9 | — | COMPARATIVE EXAMPLE |
| 94 | EXPERIMENT STOPPED BECAUSE SLAB FRACTURED IN CASTING STEP | | | | | COMPARATIVE EXAMPLE |
| 95 | 5.1 | 49 | 168 | 23 | — | COMPARATIVE EXAMPLE |
| 96 | EXPERIMENT STOPPED BECAUSE SLAB FRACTURED DURING HEATING IN HOT ROLLING STEP | | | | | COMPARATIVE EXAMPLE |
| 97 | EXPERIMENT STOPPED BECAUSE SLAB FRACTURED DURING TRANSFER FROM CASTING STEP TO HOT ROLLING STEP | | | | | COMPARATIVE EXAMPLE |
| 98 | 4.4 | 43 | 200 | 13 | — | COMPARATIVE EXAMPLE |
| 99 | EXPERIMENT STOPPED BECAUSE SLAB FRACTURED IN CASTING STEP | | | | | COMPARATIVE EXAMPLE |
| 100 | 7.1 | 29 | 116 | −49 | — | COMPARATIVE EXAMPLE |
| 101 | 8.0 | 32 | 182 | −1 | — | COMPARATIVE EXAMPLE |
| 102 | 4.8 | 32 | 108 | −41 | — | EXAMPLE |

TABLE 10-continued

| | MARTENSITE TRANSFORMATION STEP | | | | | |
|---|---|---|---|---|---|---|
| EXPERIMENT EXAMPLE No. | THIRD COOLING RATE °C./SECOND | THIRD COOLING STOP TEMPERATURE °C. | Ms °C. | Mf °C. | SECOND COLD ROLLING STEP ROLLING RATIO % | NOTE |
| 103 | 5.0 | 28 | 112 | −35 | — | COMPARATIVE EXAMPLE |
| 104 | 7.4 | 25 | 150 | −31 | — | EXAMPLE |
| 105 | 8.0 | 27 | 150 | −31 | — | COMPARATIVE EXAMPLE |
| 106 | 6.1 | 9 | 75 | −62 | — | COMPARATIVE EXAMPLE |

In this manner, various steel sheets for tempering treatment were fabricated. Then, each volume fraction of respective structures of "ferrite (α)," "bainite (B)," "tempered martensite (tM)," "retained austenite (retained γ)," "fresh martensite (fM)," and "total of pearlite and cementite (P+C)" of the steel sheets for tempering treatment in Experiment examples No. 1 to No. 101 was examined by the method similar to the method of measuring the volume fractions of the respective structures of the above-described high-strength steel sheet. Further, each solid-solution carbon content in the retained austenite of the steel sheets for tempering treatment in Experiment examples No. 1 to No. 101 was examined by the above-described method. These results are illustrated in Table 11 and Table 12. Each underline in Table 11 and Table 12 indicates that the corresponding numerical value is outside the range necessary for the manufacture of the high-strength steel sheet according to the present invention.

TABLE 11

| EXPERIMENT EXAMPLE No. | VOLUME FRACTION | | | | | | RETAINED γ SOLID-SOLUTION CARBON CONTENT MASS % | NOTE |
|---|---|---|---|---|---|---|---|---|
| | α % | B % | tM % | RETAINED γ % | fM % | P + C % | | |
| 1 | 44 | 25 | 0 | 12 | 18 | 1 | 0.62 | EXAMPLE |
| 2 | 66 | 5 | 0 | 18 | 11 | 0 | 0.86 | EXAMPLE |
| 3 | 14 | 50 | 0 | 10 | 26 | 0 | 0.61 | EXAMPLE |
| 4 | 32 | 32 | 0 | 12 | 24 | 0 | 0.91 | EXAMPLE |
| 5 | 39 | 38 | 0 | 8 | 15 | 0 | 0.76 | EXAMPLE |
| 6 | 42 | 33 | 0 | <u>0</u> | 25 | 0 | — | COMPARATIVE EXAMPLE |
| 7 | 56 | 16 | 0 | 7 | 21 | 0 | 0.69 | EXAMPLE |
| 8 | 24 | 43 | 0 | 13 | 20 | 0 | 0.74 | EXAMPLE |
| 9 | 56 | 18 | 0 | 8 | 18 | 0 | 0.81 | EXAMPLE |
| 10 | 42 | 27 | 0 | 13 | 18 | 0 | 0.73 | EXAMPLE |
| 11 | 23 | 38 | 0 | 3 | 36 | 0 | 0.88 | EXAMPLE |
| 12 | 38 | <u>0</u> | 3 | <u>0</u> | 59 | 0 | — | COMPARATIVE EXAMPLE |
| 13 | 57 | 27 | 0 | 5 | 9 | 2 | 0.66 | EXAMPLE |
| 14 | 42 | 47 | 0 | 2 | 9 | 0 | 0.81 | EXAMPLE |
| 15 | 60 | 28 | 0 | 3 | 9 | 0 | 0.89 | COMPARATIVE EXAMPLE |
| 16 | 49 | 38 | 0 | 8 | 5 | 0 | 0.93 | EXAMPLE |
| 17 | 35 | 50 | 0 | 4 | 11 | 0 | 0.79 | EXAMPLE |
| 18 | 30 | 58 | 1 | 4 | 7 | 0 | 0.91 | COMPARATIVE EXAMPLE |
| 19 | 25 | 52 | 0 | 8 | 13 | 2 | 0.76 | EXAMPLE |
| 20 | 36 | 33 | 0 | 12 | 19 | 0 | 0.82 | EXAMPLE |
| 21 | 50 | 19 | 0 | 12 | 19 | 0 | 0.72 | COMPARATIVE EXAMPLE |
| 22 | 19 | 37 | 0 | 21 | 23 | 0 | 0.88 | EXAMPLE |
| 23 | 6 | 53 | 0 | 22 | 19 | 0 | 0.80 | EXAMPLE |
| 24 | 15 | 55 | 0 | 30 | <u>0</u> | 0 | 0.70 | COMPARATIVE EXAMPLE |
| 25 | 38 | 37 | 0 | 9 | 14 | 2 | 0.81 | EXAMPLE |
| 26 | 3 | 64 | 0 | 6 | 27 | 0 | 0.72 | EXAMPLE |
| 27 | 0 | 75 | 0 | 10 | 7 | <u>8</u> | 0.63 | COMPARATIVE EXAMPLE |
| 28 | 62 | 15 | 0 | 11 | 12 | 0 | 0.74 | EXAMPLE |
| 29 | 60 | 18 | 0 | 10 | 12 | 0 | 0.75 | EXAMPLE |
| 30 | 47 | 15 | 0 | 7 | 30 | 1 | 0.76 | EXAMPLE |
| 31 | 66 | 12 | 0 | 4 | 18 | 0 | 0.67 | EXAMPLE |
| 32 | 48 | 33 | 0 | 4 | 15 | 0 | 0.78 | EXAMPLE |
| 33 | 50 | 30 | 0 | 7 | 12 | 1 | 0.81 | COMPARATIVE EXAMPLE |
| 34 | 44 | 24 | 0 | 5 | 27 | 0 | 0.69 | EXAMPLE |
| 35 | 64 | 9 | 0 | 10 | 17 | 0 | 0.85 | EXAMPLE |

TABLE 11-continued

| EXPERIMENT EXAMPLE No. | VOLUME FRACTION | | | | | | RETAINED γ SOLID-SOLUTION CARBON CONTENT MASS % | NOTE |
|---|---|---|---|---|---|---|---|---|
| | α % | B % | tM % | RETAINED γ % | fM % | P + C % | | |
| 36 | 68 | 8 | 0 | 10 | 6 | 8 | 0.79 | COMPARATIVE EXAMPLE |
| 37 | 25 | 50 | 0 | 8 | 17 | 0 | 0.93 | EXAMPLE |
| 38 | 40 | 35 | 0 | 13 | 12 | 0 | 0.84 | EXAMPLE |
| 39 | 45 | 30 | 0 | 12 | 13 | 0 | 0.70 | EXAMPLE |
| 40 | 44 | 25 | 0 | 8 | 23 | 0 | 0.76 | EXAMPLE |
| 41 | 69 | 8 | 0 | 8 | 15 | 0 | 0.75 | EXAMPLE |
| 42 | 47 | 21 | 0 | 7 | 25 | 0 | 0.63 | COMPARATIVE EXAMPLE |
| 43 | 49 | 25 | 0 | 19 | 7 | 0 | 0.78 | EXAMPLE |
| 44 | 12 | 60 | 0 | 7 | 21 | 0 | 0.91 | EXAMPLE |
| 45 | 72 | 28 | 0 | 0 | 0 | 0 | — | COMPARATIVE EXAMPLE |
| 46 | 37 | 32 | 18 | 6 | 7 | 0 | 0.92 | EXAMPLE |
| 47 | 35 | 33 | 0 | 6 | 26 | 0 | 0.69 | EXAMPLE |
| 48 | 53 | 24 | 1 | 11 | 11 | 0 | 0.84 | COMPARATIVE EXAMPLE |
| 49 | 41 | 27 | 0 | 13 | 19 | 0 | 0.85 | EXAMPLE |
| 50 | 0 | 60 | 0 | 13 | 27 | 0 | 0.76 | EXAMPLE |
| 51 | 53 | 5 | 0 | 13 | 27 | 2 | 0.76 | EXAMPLE |
| 52 | 40 | 30 | 14 | 9 | 7 | 0 | 0.76 | EXAMPLE |
| 53 | 40 | 26 | 0 | 0 | 34 | 0 | — | COMPARATIVE EXAMPLE |

TABLE 12

| EXPERIMENT EXAMPLE No. | VOLUME FRACTION | | | | | | RETAINED γ SOLID-SOLUTION CARBON CONTENT MASS % | NOTE |
|---|---|---|---|---|---|---|---|---|
| | α % | B % | tM % | RETAINED γ % | fM % | P + C % | | |
| 54 | TEST STOPPED | | | | | | | COMPARATIVE EXAMPLE |
| 55 | 32 | 40 | 0 | 7 | 21 | 0 | 0.76 | EXAMPLE |
| 56 | 0 | 72 | 0 | 6 | 22 | 0 | 0.89 | EXAMPLE |
| 57 | 24 | 45 | 0 | 8 | 23 | 0 | 0.83 | COMPARATIVE EXAMPLE |
| 58 | 55 | 27 | 0 | 7 | 10 | 1 | 0.75 | EXAMPLE |
| 59 | 50 | 27 | 0 | 4 | 19 | 0 | 0.74 | EXAMPLE |
| 60 | 45 | 24 | 0 | 8 | 23 | 0 | 0.72 | EXAMPLE |
| 61 | 49 | 26 | 0 | 7 | 18 | 0 | 0.78 | EXAMPLE |
| 62 | 55 | 15 | 0 | 12 | 18 | 0 | 0.73 | EXAMPLE |
| 63 | 47 | 30 | 0 | 9 | 14 | 0 | 0.81 | EXAMPLE |
| 64 | 51 | 27 | 0 | 3 | 19 | 0 | 0.93 | EXAMPLE |
| 65 | 62 | 25 | 0 | 6 | 7 | 0 | 0.89 | EXAMPLE |
| 66 | 35 | 44 | 0 | 16 | 4 | 1 | 0.79 | COMPARATIVE EXAMPLE |
| 67 | 36 | 39 | 0 | 10 | 15 | 0 | 0.70 | EXAMPLE |
| 68 | 39 | 30 | 0 | 11 | 19 | 1 | 0.93 | EXAMPLE |
| 69 | 44 | 24 | 0 | 13 | 19 | 0 | 0.78 | COMPARATIVE EXAMPLE |
| 70 | 23 | 32 | 0 | 16 | 27 | 2 | 0.82 | EXAMPLE |
| 71 | 33 | 26 | 0 | 11 | 30 | 0 | 0.79 | EXAMPLE |
| 72 | 28 | 31 | 0 | 14 | 27 | 0 | 0.68 | EXAMPLE |
| 73 | 36 | 38 | 0 | 10 | 15 | 1 | 0.83 | EXAMPLE |
| 74 | 26 | 46 | 0 | 8 | 19 | 1 | 0.90 | EXAMPLE |
| 75 | 39 | 31 | 0 | 11 | 19 | 0 | 0.89 | COMPARATIVE EXAMPLE |
| 76 | 47 | 38 | 0 | 5 | 9 | 1 | 0.77 | EXAMPLE |
| 77 | 46 | 34 | 0 | 2 | 13 | 5 | 0.68 | EXAMPLE |
| 78 | 65 | 18 | 0 | 3 | 8 | 6 | 0.82 | COMPARATIVE EXAMPLE |
| 79 | 58 | 19 | 0 | 7 | 16 | 0 | 0.70 | EXAMPLE |
| 80 | 58 | 22 | 0 | 3 | 15 | 2 | 0.85 | EXAMPLE |
| 81 | 53 | 30 | 0 | 1 | 16 | 0 | 0.89 | EXAMPLE |
| 82 | 46 | 20 | 0 | 7 | 26 | 1 | 0.89 | EXAMPLE |
| 83 | 38 | 43 | 0 | 11 | 8 | 0 | 0.74 | EXAMPLE |
| 84 | TEST STOPPED | | | | | | | COMPARATIVE EXAMPLE |
| 85 | 29 | 52 | 0 | 3 | 15 | 0 | 0.69 | EXAMPLE |

TABLE 12-continued

| EXPERIMENT EXAMPLE No. | VOLUME FRACTION | | | | | | RETAINED γ SOLID-SOLUTION CARBON CONTENT MASS % | NOTE |
|---|---|---|---|---|---|---|---|---|
| | α % | B % | tM % | RETAINED γ % | fM % | P + C % | | |
| 86 | 30 | 50 | 0 | 7 | 13 | 0 | 0.79 | EXAMPLE |
| 87 | 76 | 4 | 0 | 3 | 11 | 6 | 0.82 | COMPARATIVE EXAMPLE |
| 88 | 63 | 17 | 0 | 10 | 9 | 1 | 0.91 | EXAMPLE |
| 89 | 30 | 33 | 0 | 6 | 31 | 0 | 0.79 | EXAMPLE |
| 90 | 33 | 30 | 0 | 10 | 27 | 0 | 0.93 | EXAMPLE |
| 91 | 48 | 48 | 0 | 0 | 3 | 1 | — | COMPARATIVE EXAMPLE |
| 92 | 11 | 32 | 0 | 27 | 30 | 0 | 0.89 | COMPARATIVE EXAMPLE |
| 93 | 50 | 30 | 0 | 9 | 11 | 0 | 0.72 | COMPARATIVE EXAMPLE |
| 94 | TEST STOPPED | | | | | | | COMPARATIVE EXAMPLE |
| 95 | 65 | 18 | 0 | 0 | 0 | 17 | — | COMPARATIVE EXAMPLE |
| 96 | TEST STOPPED | | | | | | | COMPARATIVE EXAMPLE |
| 97 | TEST STOPPED | | | | | | | COMPARATIVE EXAMPLE |
| 98 | 51 | 18 | 0 | 9 | 21 | 1 | 0.74 | COMPARATIVE EXAMPLE |
| 99 | TEST STOPPED | | | | | | | COMPARATIVE EXAMPLE |
| 100 | 45 | 24 | 0 | 11 | 18 | 2 | 0.86 | COMPARATIVE EXAMPLE |
| 101 | 47 | 18 | 0 | 9 | 24 | 2 | 0.75 | COMPARATIVE EXAMPLE |
| 102 | 48 | 27 | 0 | 6 | 19 | 0 | 0.71 | EXAMPLE |
| 103 | 42 | 22 | 0 | 5 | 30 | 0 | 0.76 | COMPARATIVE EXAMPLE |
| 104 | 58 | 18 | 0 | 4 | 20 | 0 | 0.81 | EXAMPLE |
| 105 | 53 | 16 | 0 | 6 | 24 | 0 | 0.74 | COMPARATIVE EXAMPLE |
| 106 | 25 | 52 | 0 | 9 | 14 | 0 | 0.77 | COMPARATIVE EXAMPLE |

After the martensite transformation step, the tempering treatment was performed (tempering step). In the tempering step, the tempering temperature $T_{tem}$, the treatment time $t_{tem}$, and the average heating rate from 200° C. to $T_{tem}$ are illustrated in Table 13 and Table 14. In Table 13 and Table 14, the parameters Q3 to Q5 are also illustrated additionally. Each underline in Table 13 and Table 14 indicates that the corresponding numerical value is outside the range necessary for the manufacture of the high-strength steel sheet according to the present invention.

TABLE 13

| | TEMPERING STEP | | | | | | |
|---|---|---|---|---|---|---|---|
| EXPERIMENT EXAMPLE No. | AVERAGE HEATING RATE ° C./SECOND | TEMPERING TEMPERATURE $T_{tem}$ ° C. | TREATMENT TIME $t_{tem}$ SECOND | PARAMETER Q3 | PARAMETER Q4 | PARAMETER Q5 | NOTE |
| 1 | 115.0 | 353 | 6 | 1.8 | 0.45 | −0.19 | EXAMPLE |
| 2 | 107.7 | 298 | 9 | 1.3 | 0.54 | −0.15 | EXAMPLE |
| 3 | 7.3 | 399 | 1 | 1.5 | 0.13 | −0.05 | EXAMPLE |
| 4 | 85.3 | 237 | 111 | 1.5 | 0.84 | −0.14 | EXAMPLE |
| 5 | 7.7 | 390 | 226 | 3.8 | 0.76 | −0.91 | EXAMPLE |
| 6 | 11.8 | 337 | 97 | 2.8 | 0.77 | −0.73 | COMPARATIVE EXAMPLE |
| 7 | 107.3 | 361 | 66 | 2.8 | 0.68 | −1.54 | EXAMPLE |
| 8 | 1.5 | 291 | 51 | 1.8 | 0.73 | −0.52 | EXAMPLE |
| 9 | 82.3 | 348 | 30 | 2.3 | 0.62 | −0.93 | EXAMPLE |
| 10 | 107.2 | 289 | 67 | 1.9 | 0.75 | −0.57 | EXAMPLE |
| 11 | 8.5 | 247 | 72 | 1.3 | 0.77 | −0.22 | EXAMPLE |
| 12 | 19.4 | 407 | 26 | 2.9 | 0.54 | −1.05 | COMPARATIVE EXAMPLE |
| 13 | 33.9 | 513 | 11 | 3.4 | 0.32 | 0.67 | EXAMPLE |
| 14 | 45.9 | 356 | 25 | 2.4 | 0.60 | −0.62 | EXAMPLE |
| 15 | 94.4 | 176 | 1450 | 1.3 | 0.89 | −0.07 | COMPARATIVE EXAMPLE |
| 16 | 15.5 | 250 | 84 | 1.5 | 0.81 | −0.19 | EXAMPLE |

TABLE 13-continued

| | TEMPERING STEP | | | | | | |
|---|---|---|---|---|---|---|---|
| EXPERIMENT EXAMPLE No. | AVERAGE HEATING RATE °C./SECOND | TEMPERING TEMPERATURE $T_{tem}$ °C. | TREATMENT TIME $t_{tem}$ SECOND | PARAMETER Q3 | PARAMETER Q4 | PARAMETER Q5 | NOTE |
| 17 | 4.3 | 345 | 8 | 1.8 | 0.49 | −0.26 | EXAMPLE |
| 18 | 94.9 | 254 | 11 | 0.7 | 0.58 | −0.08 | COMPARATIVE EXAMPLE |
| 19 | 6.9 | 386 | 2128 | 4.7 | 0.84 | −1.75 | EXAMPLE |
| 20 | 5.1 | 410 | 253 | 4.1 | 0.69 | −0.25 | EXAMPLE |
| 21 | 4.8 | 347 | 7 | 1.8 | 0.45 | −0.14 | COMPARATIVE EXAMPLE |
| 22 | 7.9 | 438 | 8 | 2.7 | 0.40 | −0.35 | EXAMPLE |
| 23 | 11.2 | 314 | 129 | 2.5 | 0.81 | −1.25 | EXAMPLE |
| 24 | 13.0 | 299 | 166 | 2.4 | 0.84 | −1.10 | COMPARATIVE EXAMPLE |
| 25 | 17.6 | 357 | 30 | 3.0 | 0.63 | 0.00 | EXAMPLE |
| 26 | 82.5 | 257 | 8 | 1.1 | 0.53 | −0.02 | EXAMPLE |
| 27 | 6.9 | 353 | 5 | 2.2 | 0.42 | 0.00 | COMPARATIVE EXAMPLE |
| 28 | 52.2 | 536 | 7 | 3.3 | 0.26 | 0.10 | EXAMPLE |
| 29 | 14.2 | 237 | 256 | 1.6 | 0.88 | −0.40 | EXAMPLE |
| 30 | 27.8 | 258 | 65 | 1.4 | 0.77 | −0.36 | EXAMPLE |
| 31 | 213.1 | 353 | 128 | 3.0 | 0.78 | −2.67 | EXAMPLE |
| 32 | 8.9 | 355 | 39 | 2.5 | 0.67 | −1.50 | EXAMPLE |
| 33 | 4.6 | 550 | 14 | 3.7 | 0.31 | 1.99 | COMPARATIVE EXAMPLE |
| 34 | 36.8 | 240 | 97 | 2.2 | 0.80 | −0.09 | EXAMPLE |
| 35 | 110.7 | 262 | 256 | 3.0 | 0.88 | −0.22 | EXAMPLE |
| 36 | 59.0 | 239 | 16 | 1.4 | 0.61 | −0.03 | COMPARATIVE EXAMPLE |
| 37 | 13.4 | 503 | 4 | 2.9 | 0.28 | 0.26 | EXAMPLE |
| 38 | 54.6 | 308 | 14 | 1.5 | 0.61 | −0.31 | EXAMPLE |
| 39 | 42.9 | 339 | 83 | 2.7 | 0.78 | −1.10 | EXAMPLE |
| 40 | 8.1 | 412 | 27 | 3.4 | 0.53 | −0.05 | EXAMPLE |
| 41 | 73.4 | 308 | 35 | 2.4 | 0.67 | −0.23 | EXAMPLE |
| 42 | 9.2 | 305 | 39 | 2.4 | 0.68 | −0.24 | COMPARATIVE EXAMPLE |
| 43 | 31.5 | 364 | 8 | 2.6 | 0.45 | −0.15 | EXAMPLE |
| 44 | 19.3 | 357 | 10 | 2.6 | 0.48 | −0.17 | EXAMPLE |
| 45 | 84.6 | 395 | 4 | 2.6 | 0.33 | −0.07 | COMPARATIVE EXAMPLE |
| 46 | 15.7 | 411 | 7 | 2.5 | 0.40 | −0.04 | EXAMPLE |
| 47 | 8.1 | 249 | 90 | 1.6 | 0.80 | −0.14 | EXAMPLE |
| 48 | 8.6 | 238 | 18000 | 3.7 | 1.08 | −1.52 | COMPARATIVE EXAMPLE |
| 49 | 17.6 | 309 | 35 | 1.9 | 0.72 | −0.57 | EXAMPLE |
| 50 | 2.1 | 338 | 39 | 2.3 | 0.70 | −0.90 | EXAMPLE |
| 51 | 9.6 | 408 | 22 | 2.8 | 0.56 | −0.87 | EXAMPLE |
| 52 | 51.0 | 264 | 53 | 1.4 | 0.78 | −0.28 | EXAMPLE |
| 53 | 16.2 | 394 | 49 | 3.0 | 0.66 | −1.37 | COMPARATIVE EXAMPLE |

TABLE 14

| | TEMPERING STEP | | | | | | |
|---|---|---|---|---|---|---|---|
| EXPERIMENT EXAMPLE No. | AVERAGE HEATING RATE °C./ECOND | TEMPERING TEMPERATURE $T_{tem}$ °C. | TREATMENT TIME $t_{tem}$ SECOND | PARAMETER Q3 | PARAMETER Q4 | PARAMETER Q5 | NOTE |
| 54 | EXPERIMENT STOPPED BECAUSE OF SHAPE FAILURE OF STEEL SHEET AFTER HOT ROLLING | | | | | | COMPARATIVE EXAMPLE |
| 55 | 29.5 | 356 | 3600 | 4.7 | 0.96 | −3.33 | EXAMPLE |
| 56 | 9.1 | 295 | 7 | 1.2 | 0.51 | −0.10 | EXAMPLE |
| 57 | 8.7 | 407 | 84 | 3.6 | 0.67 | −0.18 | COMPARATIVE EXAMPLE |
| 58 | 6.8 | 336 | 11 | 1.8 | 0.54 | −0.44 | EXAMPLE |
| 59 | 8.1 | 245 | 169 | 1.7 | 0.87 | −0.31 | EXAMPLE |
| 60 | 8.8 | 363 | 11 | 2.1 | 0.52 | −0.54 | EXAMPLE |
| 61 | 6.3 | 405 | 1 | 1.5 | 0.13 | −0.16 | EXAMPLE |
| 62 | 7.9 | 339 | 46 | 2.4 | 0.70 | −0.93 | EXAMPLE |
| 63 | 8.4 | 260 | 53 | 1.4 | 0.76 | −0.25 | EXAMPLE |
| 64 | 63.9 | 361 | 12 | 2.3 | 0.51 | −0.14 | EXAMPLE |

TABLE 14-continued

| | | | TEMPERING STEP | | | | |
|---|---|---|---|---|---|---|---|
| EXPERIMENT EXAMPLE No. | AVERAGE HEATING RATE °C./ECOND | TEMPERING TEMPERATURE $T_{tem}$ °C. | TREATMENT TIME $t_{tem}$ SECOND | PARAMETER Q3 | PARAMETER Q4 | PARAMETER Q5 | NOTE |
| 65 | 7.3 | 408 | 21 | 3.0 | 0.52 | −0.04 | EXAMPLE |
| 66 | 76.8 | 488 | 23 | 3.7 | 0.41 | 1.70 | COMPARATIVE EXAMPLE |
| 67 | 14.3 | 253 | 35 | 1.1 | 0.73 | −0.17 | EXAMPLE |
| 68 | 26.0 | 291 | 15 | 1.3 | 0.61 | −0.26 | EXAMPLE |
| 69 | 10.7 | 312 | 8 | 1.3 | 0.52 | −0.27 | COMPARATIVE EXAMPLE |
| 70 | 11.7 | 361 | 10 | 2.2 | 0.49 | −0.14 | EXAMPLE |
| 71 | 6.7 | 339 | 5 | 1.6 | 0.42 | −0.11 | EXAMPLE |
| 72 | 5.5 | 240 | 63 | 1.3 | 0.76 | −0.09 | EXAMPLE |
| 73 | 6.6 | 288 | 24 | 1.7 | 0.66 | −0.13 | EXAMPLE |
| 74 | 9.3 | 343 | 220 | 3.3 | 0.81 | −0.60 | EXAMPLE |
| 75 | 95.4 | 304 | 37 | 2.1 | 0.69 | −0.20 | COMPARATIVE EXAMPLE |
| 76 | 96.2 | 293 | 8 | 1.4 | 0.54 | −0.11 | EXAMPLE |
| 77 | 9.3 | 307 | 30 | 2.1 | 0.71 | −0.26 | EXAMPLE |
| 78 | 9.0 | 264 | 14 | 1.2 | 0.63 | −0.09 | COMPARATIVE EXAMPLE |
| 79 | 5.5 | 349 | 9 | 2.2 | 0.49 | −0.04 | EXAMPLE |
| 80 | 18.8 | 363 | 12 | 2.4 | 0.51 | −0.03 | EXAMPLE |
| 81 | 14.6 | 309 | 10 | 1.7 | 0.53 | −0.06 | EXAMPLE |
| 82 | 18.8 | 396 | 36 | 3.0 | 0.60 | −0.33 | EXAMPLE |
| 83 | 334.6 | 304 | 22 | 1.8 | 0.65 | −0.25 | EXAMPLE |
| 84 | EXPERIMENT STOPPED BECAUSE STEEL SHEET FRACTURED IN COLD ROLLING STEP | | | | | | COMPARATIVE EXAMPLE |
| 85 | 5.7 | 354 | 7 | 1.8 | 0.49 | −0.34 | EXAMPLE |
| 86 | 43.6 | 287 | 23 | 1.5 | 0.70 | −0.27 | EXAMPLE |
| 87 | 15.8 | 340 | 13 | 1.9 | 0.59 | −0.42 | COMPARATIVE EXAMPLE |
| 88 | 13.9 | 399 | 126 | 3.5 | 0.67 | −1.76 | EXAMPLE |
| 89 | 6.8 | 311 | 127 | 2.5 | 0.78 | −1.00 | EXAMPLE |
| 90 | 6.4 | 349 | 146 | 3.0 | 0.75 | −1.70 | EXAMPLE |
| 91 | 7.8 | 350 | 65 | 2.7 | 0.71 | −0.93 | COMPARATIVE EXAMPLE |
| 92 | 35.6 | 350 | 65 | 2.7 | 0.69 | −1.22 | COMPARATIVE EXAMPLE |
| 93 | 9.2 | 350 | 65 | 3.5 | 0.74 | 0.00 | COMPARATIVE EXAMPLE |
| 94 | EXPERIMENT STOPPED BECAUSE SLAB FRACTURED IN CASTING STEP | | | | | | COMPARATIVE EXAMPLE |
| 95 | 7.3 | 350 | 65 | 2.9 | 0.78 | −0.73 | COMPARATIVE EXAMPLE |
| 96 | EXPERIMENT STOPPED BECAUSE SLAB FRACTURED DURING HEATING IN HOT ROLLING STEP | | | | | | COMPARATIVE EXAMPLE |
| 97 | EXPERIMENT STOPPED BECAUSE SLAB FRACTURED DURING TRANSFER FROM CASTING STEP TO HOT ROLLING STEP | | | | | | COMPARATIVE EXAMPLE |
| 98 | 9.6 | 350 | 65 | 2.7 | 0.71 | −1.06 | COMPARATIVE EXAMPLE |
| 99 | EXPERIMENT STOPPED BECAUSE SLAB FRACTURED IN CASTING STEP | | | | | | COMPARATIVE EXAMPLE |
| 100 | 10.3 | 350 | 65 | 2.7 | 0.68 | −1.17 | COMPARATIVE EXAMPLE |
| 101 | 12.0 | 350 | 65 | 2.8 | 0.70 | −0.75 | COMPARATIVE EXAMPLE |
| 102 | 95.1 | 354 | 6 | 2.0 | 0.45 | −0.20 | EXAMPLE |
| 103 | 94.5 | 345 | 6 | 2.0 | 0.46 | −0.21 | COMPARATIVE EXAMPLE |
| 104 | 105.3 | 360 | 67 | 2.9 | 0.68 | −1.45 | EXAMPLE |
| 105 | 105.6 | 359 | 60 | 2.6 | 0.57 | −1.57 | COMPARATIVE EXAMPLE |
| 106 | 7.6 | 388 | 2127 | 4.7 | 0.83 | −1.73 | COMPARATIVE EXAMPLE |

In Experiment examples No. 13, No. 22, No. 25, No. 28, No. 34, No. 37, No. 41, No. 43, No. 49, No. 50, No. 60, No. 61, No. 67, No. 70, No. 73, No. 77, No. 81, and No. 83, the hot-dip galvanizing treatment was performed on the steel sheet at the stage (galvanizing treatment timing) illustrated in Table 15. The steel sheet entering temperature of the hot-dip galvanizing treatment, the galvanizing bath temperature, and the effective Al content in the galvanizing bath are illustrated in Table 15. In Experiment examples No. 13, No. 22, No. 28, No. 34, No. 41, No. 50, No. 60, No. 61, No. 70, No. 73, and No. 83, the alloying treatment was performed at the stage (alloying treatment timing) illustrated in Table 15. The temperature and the holding time of the alloying treatment are illustrated in Table 15. In the space of "SURFACE" in Table 15, "GI" means that the hot-dip galvanized layer was formed on the surface and "GA" means that the alloyed galvanized layer was formed on the surface.

TABLE 15

| EXPERIMENT EXAMPLE No. | STEEL TYPE | SURFACE | GALVANIZING TREATMENT TIMING | ALLOYING TREATMENT TIMING | GALVANIZING TREATMENT | | | ALLOYING TREATMENT | | NOTE |
|---|---|---|---|---|---|---|---|---|---|---|
| | | | | | STEEL SHEET ENTERING TEMPERATURE °C | GALVANIZING BATH TEMPERATURE °C | EFFECTIVE Al CONTENT OF GALVANIZING BATH MASS % | TEMPERATURE °C | TIME SECOND | |
| 13 | C | GA | TEMPERING TREATMENT | TEMPERING TREATMENT | 464 | 456 | 0.101 | 513 | 11 | EXAMPLE |
| 22 | F | GA | BEFORE BAINITE TRANSFORMATION PROCESS | BEFORE BAINITE TRANSFORMATION PROCESS | 446 | 467 | 0.128 | 553 | 21 | EXAMPLE |
| 25 | G | GI | BEFORE BAINITE TRANSFORMATION PROCESS | | 445 | 467 | 0.094 | — | — | EXAMPLE |
| 28 | H | GA | BEFORE MARTENSITE TRANSFORMATION PROCESS | TEMPERING TREATMENT | 459 | 455 | 0.145 | 536 | 7 | EXAMPLE |
| 34 | J | GA | BEFORE MARTENSITE TRANSFORMATION PROCESS | BEFORE MARTENSITE TRANSFORMATION PROCESS | 479 | 454 | 0.079 | 482 | 57 | EXAMPLE |
| 37 | K | GI | TEMPERING TREATMENT | | 441 | 464 | 0.264 | — | — | EXAMPLE |
| 41 | L | GA | BEFORE MARTENSITE TRANSFORMATION PROCESS | BEFORE MARTENSITE TRANSFORMATION PROCESS | 464 | 462 | 0.082 | 496 | 24 | EXAMPLE |
| 43 | M | GI | BEFORE BAINITE TRANSFORMATION PROCESS | | 458 | 459 | 0.206 | — | — | EXAMPLE |
| 49 | O | GI | BEFORE BAINITE TRANSFORMATION PROCESS | | 456 | 462 | 0.233 | — | — | EXAMPLE |
| 50 | O | GA | BEFORE BAINITE TRANSFORMATION PROCESS | BEFORE BAINITE TRANSFORMATION PROCESS | 458 | 453 | 0.167 | 582 | 13 | EXAMPLE |
| 60 | Q | GA | BEFORE BAINITE TRANSFORMATION PROCESS | BEFORE BAINITE TRANSFORMATION PROCESS | 440 | 467 | 0.092 | 527 | 46 | EXAMPLE |
| 61 | Q | GA | BEFORE BAINITE TRANSFORMATION PROCESS | BEFORE MARTENSITE TRANSFORMATION PROCESS | 469 | 456 | 0.083 | 492 | 36 | EXAMPLE |

TABLE 15-continued

| EXPERIMENT EXAMPLE No. | STEEL TYPE | SURFACE | GALVANIZING TREATMENT TIMING | ALLOYING TREATMENT TIMING | GALVANIZING TREATMENT | | | ALLOYING TREATMENT | | NOTE |
|---|---|---|---|---|---|---|---|---|---|---|
| | | | | | STEEL SHEET ENTERING TEMPERATURE °C. | GALVANIZING BATH TEMPERATURE °C. | EFFECTIVE Al CONTENT OF GALVANIZING BATH MASS % | TEMPERATURE °C. | TIME SECOND | |
| 67 | S | GI | BEFORE BAINITE TRANSFORMATION PROCESS | | 463 | 467 | 0.114 | — | — | EXAMPLE |
| 70 | T | GA | BEFORE BAINITE TRANSFORMATION PROCESS | BEFORE MARTENSITE TRANSFORMATION PROCESS | 454 | 460 | 0.107 | 512 | 16 | EXAMPLE |
| 73 | U | GA | BEFORE MARTENSITE TRANSFORMATION PROCESS | BEFORE MARTENSITE TRANSFORMATION PROCESS | 476 | 463 | 0.092 | 503 | 18 | EXAMPLE |
| 77 | V | GI | BEFORE MARTENSITE TRANSFORMATION PROCESS | | 446 | 462 | 0.216 | — | — | EXAMPLE |
| 81 | W | GI | BEFORE MARTENSITE TRANSFORMATION PROCESS | | 452 | 459 | 0.256 | — | — | EXAMPLE |
| 83 | X | GA | BEFORE BAINITE TRANSFORMATION PROCESS | BEFORE BAINITE TRANSFORMATION PROCESS | 472 | 467 | 0.137 | 592 | 11 | EXAMPLE |

In Experiment example No. 2, the following electrogalvanizing treatment was performed on the steel sheet at the stage (galvanizing treatment timing) after the tempering treatment. In Experiment example No. 65, on the steel sheet, the following electrogalvanizing treatment was performed at the stage (galvanizing treatment timing) after the tempering treatment, and further the alloying treatment was performed at the stage (alloying treatment timing) after the tempering treatment.

The electrogalvanizing treatment in Experiment example No. 2 and Experiment example No. 65 was performed by a method in which the steel sheet is subjected to pickling and then immersed in an electrogalvanizing bath to be energized. The pickling was performed until hydrogen bubbles were visually recognized after the steel sheet was immersed in a 10%-sulfuric acid at ordinary temperature. The electrogalvanizing treatment was performed in an electrogalvanizing bath containing 1.5 g/L of $H_2SO_4$, 194 g/L of $ZnSO_4$, and 45 g/L of $NaSO_4$ and having pH of 1.5 to 2.0 with a solution temperature of 50° C., and a current density was set to 25 A/$(dm)^2$.

In Experiment examples No. 3 to No. 35 and No. 60 to No. 80, after the tempering treatment, cold rolling at the maximum reduction ratio of 1.00% was performed.

In Experiment examples No. 22 and No. 83, after the tempering treatment, a degreasing agent was applied and washing was performed by a water spray. Thereafter, the steel sheet was immersed in a surface active agent and then in a chemical conversion treatment solution PB-SX-35 manufactured by Nihon Parkerizing Co., Ltd. in this order and washed again by a water spray, and by a method of drying by a hot air oven, the coating film made of the composite oxide containing phosphorus oxide and phosphorus was formed on the surface.

As for the experiment examples in which a test was not stopped out of the high-strength steel sheets and the high-strength galvanized steel sheets in Experiment examples No. 1 to No. 101 that were obtained in this manner, each volume fraction of respective structures of "ferrite ($\alpha$)," "bainite (B)," "tempered martensite (tM)," "retained austenite (retained $\gamma$)," "fresh martensite (fM)," and "total of pearlite and cementite (P+C)" was examined by the above-described method. These results are illustrated in Table 16 and Table 17. Each underline in Table 16 and Table 17 indicates that the corresponding numerical value is outside the range of the present invention.

TABLE 16

| EXPERIMENT EXAMPLE No. | STEEL TYPE | VOLUME FRACTION | | | | | | NOTE |
|---|---|---|---|---|---|---|---|---|
| | | α % | B % | tM % | RETAINED γ % | fM % | P + C % | |
| 1 | A | 44 | 30 | 19 | 7 | 0 | 0 | EXAMPLE |
| 2 | A | 66 | 7 | 12 | 14 | 1 | 0 | EXAMPLE |
| 3 | A | 14 | 57 | 22 | 6 | 1 | 0 | EXAMPLE |
| 4 | A | 32 | 35 | 22 | 9 | 1 | 1 | EXAMPLE |
| 5 | A | 39 | 41 | 8 | 12 | 0 | 0 | EXAMPLE |
| 6 | A | 42 | 33 | 25 | 0 | 0 | 0 | COMPARATIVE EXAMPLE |
| 7 | B | 56 | 18 | 21 | 5 | 0 | 0 | EXAMPLE |
| 8 | B | 24 | 48 | 18 | 9 | 1 | 0 | EXAMPLE |
| 9 | B | 56 | 20 | 10 | 14 | 0 | 0 | EXAMPLE |
| 10 | B | 42 | 32 | 15 | 10 | 0 | 1 | EXAMPLE |
| 11 | B | 23 | 40 | 32 | 3 | 2 | 0 | EXAMPLE |
| 12 | B | 38 | 62 | 0 | 0 | 0 | 0 | COMPARATIVE EXAMPLE |
| 13 | C | 57 | 29 | 8 | 4 | 0 | 2 | EXAMPLE |
| 14 | C | 42 | 47 | 9 | 2 | 0 | 0 | EXAMPLE |
| 15 | C | 60 | 28 | 3 | 3 | 6 | 0 | COMPARATIVE EXAMPLE |
| 16 | D | 49 | 40 | 5 | 6 | 0 | 0 | EXAMPLE |
| 17 | D | 35 | 55 | 6 | 4 | 0 | 0 | EXAMPLE |
| 18 | D | 30 | 58 | 1 | 4 | 7 | 0 | COMPARATIVE EXAMPLE |
| 19 | E | 25 | 52 | 11 | 11 | 0 | 1 | EXAMPLE |
| 20 | E | 36 | 37 | 19 | 8 | 0 | 0 | EXAMPLE |
| 21 | E | 50 | 19 | 17 | 14 | 0 | 0 | COMPARATIVE EXAMPLE |
| 22 | F | 19 | 39 | 23 | 19 | 0 | 0 | EXAMPLE |
| 23 | F | 6 | 53 | 18 | 22 | 1 | 0 | EXAMPLE |
| 24 | F | 15 | 53 | 0 | 16 | 16 | 0 | COMPARATIVE EXAMPLE |
| 25 | G | 38 | 37 | 13 | 10 | 0 | 2 | EXAMPLE |
| 26 | G | 3 | 69 | 14 | 11 | 3 | 0 | EXAMPLE |
| 27 | G | 0 | 83 | 0 | 9 | 6 | 2 | COMPARATIVE EXAMPLE |
| 28 | H | 62 | 16 | 9 | 13 | 0 | 0 | EXAMPLE |
| 29 | H | 60 | 20 | 8 | 12 | 0 | 0 | EXAMPLE |
| 30 | H | 47 | 16 | 30 | 6 | 0 | 1 | EXAMPLE |
| 31 | I | 66 | 13 | 14 | 7 | 0 | 0 | EXAMPLE |
| 32 | I | 48 | 41 | 7 | 4 | 0 | 0 | EXAMPLE |
| 33 | I | 50 | 30 | 9 | 0 | 3 | 8 | COMPARATIVE EXAMPLE |
| 34 | J | 44 | 34 | 13 | 7 | 1 | 1 | EXAMPLE |
| 35 | J | 64 | 13 | 8 | 15 | 0 | 0 | EXAMPLE |
| 36 | J | 68 | 10 | 5 | 7 | 0 | 10 | COMPARATIVE EXAMPLE |
| 37 | K | 25 | 53 | 13 | 8 | 1 | 0 | EXAMPLE |
| 38 | K | 40 | 38 | 13 | 9 | 0 | 0 | EXAMPLE |
| 39 | K | 45 | 33 | 14 | 7 | 1 | 0 | EXAMPLE |
| 40 | L | 44 | 25 | 18 | 13 | 0 | 0 | EXAMPLE |
| 41 | L | 69 | 8 | 13 | 8 | 0 | 2 | EXAMPLE |
| 42 | L | 47 | 24 | 18 | 11 | 0 | 0 | COMPARATIVE EXAMPLE |
| 43 | M | 49 | 33 | 7 | 11 | 0 | 0 | EXAMPLE |
| 44 | M | 12 | 69 | 10 | 9 | 0 | 0 | EXAMPLE |
| 45 | M | 72 | 28 | 0 | 0 | 0 | 0 | COMPARATIVE EXAMPLE |
| 46 | N | 37 | 33 | 21 | 7 | 2 | 0 | EXAMPLE |
| 47 | N | 35 | 43 | 16 | 6 | 0 | 0 | EXAMPLE |
| 48 | N | 53 | 27 | 9 | 8 | 3 | 0 | COMPARATIVE EXAMPLE |
| 49 | O | 41 | 29 | 19 | 11 | 0 | 0 | EXAMPLE |
| 50 | O | 0 | 69 | 21 | 10 | 0 | 0 | EXAMPLE |
| 51 | O | 53 | 5 | 25 | 14 | 1 | 2 | EXAMPLE |
| 52 | O | 40 | 35 | 13 | 12 | 0 | 0 | EXAMPLE |
| 53 | O | 40 | 26 | 34 | 0 | 0 | 0 | COMPARATIVE EXAMPLE |

TABLE 17

| EXPERIMENT EXAMPLE No. | STEEL TYPE | VOLUME FRACTION | | | | | | NOTE |
|---|---|---|---|---|---|---|---|---|
| | | α % | B % | tM % | RETAINED γ % | fM % | P + C % | |
| 54 | O | \multicolumn{6}{c}{TEST STOPPED} | | | | | | | COMPARATIVE EXAMPLE |
| 55 | P | 32 | 45 | 15 | 8 | 0 | 0 | EXAMPLE |
| 56 | P | 0 | 72 | 22 | 6 | 0 | 0 | EXAMPLE |
| 57 | P | 24 | 52 | 16 | 8 | 0 | 0 | COMPARATIVE EXAMPLE |
| 58 | Q | 55 | 29 | 9 | 6 | 0 | 1 | EXAMPLE |
| 59 | Q | 50 | 30 | 15 | 5 | 0 | 0 | EXAMPLE |
| 60 | Q | 45 | 26 | 18 | 8 | 2 | 1 | EXAMPLE |
| 61 | Q | 49 | 26 | 18 | 7 | 0 | 0 | EXAMPLE |
| 62 | Q | 55 | 18 | 18 | 9 | 0 | 0 | EXAMPLE |
| 63 | Q | 47 | 30 | 13 | 9 | 1 | 0 | EXAMPLE |
| 64 | R | 51 | 30 | 15 | 4 | 0 | 0 | EXAMPLE |
| 65 | R | 62 | 25 | 7 | 6 | 0 | 0 | EXAMPLE |
| 66 | R | 35 | 44 | 4 | 2 | 0 | 15 | COMPARATIVE EXAMPLE |
| 67 | S | 36 | 39 | 15 | 10 | 0 | 0 | EXAMPLE |
| 68 | S | 39 | 30 | 19 | 11 | 0 | 1 | EXAMPLE |
| 69 | S | 44 | 27 | 19 | 9 | 1 | 0 | COMPARATIVE EXAMPLE |
| 70 | T | 23 | 32 | 27 | 16 | 0 | 2 | EXAMPLE |
| 71 | T | 33 | 31 | 17 | 19 | 0 | 0 | EXAMPLE |
| 72 | T | 28 | 31 | 25 | 16 | 0 | 0 | EXAMPLE |
| 73 | U | 36 | 40 | 12 | 11 | 0 | 1 | EXAMPLE |
| 74 | U | 26 | 46 | 18 | 9 | 0 | 1 | EXAMPLE |
| 75 | U | 39 | 36 | 14 | 11 | 0 | 0 | COMPARATIVE EXAMPLE |
| 76 | V | 47 | 38 | 7 | 7 | 0 | 1 | EXAMPLE |
| 77 | V | 46 | 36 | 12 | 6 | 0 | 0 | EXAMPLE |
| 78 | V | 65 | 18 | 8 | 3 | 0 | 6 | COMPARATIVE EXAMPLE |
| 79 | W | 58 | 21 | 15 | 4 | 1 | 1 | EXAMPLE |
| 80 | W | 58 | 27 | 10 | 3 | 2 | 0 | EXAMPLE |
| 81 | W | 53 | 32 | 10 | 3 | 0 | 2 | EXAMPLE |
| 82 | X | 46 | 28 | 18 | 8 | 0 | 0 | EXAMPLE |
| 83 | X | 38 | 43 | 8 | 11 | 0 | 0 | EXAMPLE |
| 84 | X | \multicolumn{6}{c}{TEST STOPPED} | | | | | | | COMPARATIVE EXAMPLE |
| 85 | Y | 29 | 52 | 13 | 6 | 0 | 0 | EXAMPLE |
| 86 | Y | 30 | 50 | 12 | 8 | 0 | 0 | EXAMPLE |
| 87 | Y | 76 | 4 | 11 | 3 | 0 | 6 | COMPARATIVE EXAMPLE |
| 88 | Z | 63 | 17 | 9 | 10 | 0 | 1 | EXAMPLE |
| 89 | Z | 30 | 32 | 28 | 9 | 1 | 0 | EXAMPLE |
| 90 | Z | 33 | 34 | 19 | 13 | 0 | 1 | EXAMPLE |
| 91 | AA | 48 | 48 | 3 | 0 | 0 | 1 | COMPARATIVE EXAMPLE |
| 92 | AB | 11 | 32 | 25 | 30 | 2 | 0 | COMPARATIVE EXAMPLE |
| 93 | AC | 50 | 32 | 11 | 0 | 3 | 4 | COMPARATIVE EXAMPLE |
| 94 | AD | \multicolumn{6}{c}{TEST STOPPED} | | | | | | | COMPARATIVE EXAMPLE |
| 95 | AE | 65 | 18 | 0 | 0 | 0 | 17 | COMPARATIVE EXAMPLE |
| 96 | AF | \multicolumn{6}{c}{TEST STOPPED} | | | | | | | COMPARATIVE EXAMPLE |
| 97 | AG | \multicolumn{6}{c}{TEST STOPPED} | | | | | | | COMPARATIVE EXAMPLE |
| 98 | AH | 51 | 18 | 21 | 7 | 0 | 3 | COMPARATIVE EXAMPLE |
| 99 | AI | \multicolumn{6}{c}{TEST STOPPED} | | | | | | | COMPARATIVE EXAMPLE |
| 100 | AJ | 45 | 24 | 18 | 11 | 0 | 2 | COMPARATIVE EXAMPLE |
| 101 | AK | 47 | 18 | 24 | 9 | 0 | 2 | COMPARATIVE EXAMPLE |
| 102 | A | 48 | 27 | 17 | 8 | 0 | 0 | EXAMPLE |
| 103 | A | 42 | 22 | 27 | 8 | 1 | 0 | COMPARATIVE EXAMPLE |
| 104 | B | 58 | 18 | 20 | 4 | 0 | 0 | EXAMPLE |
| 105 | B | 53 | 16 | 25 | 5 | 1 | 0 | COMPARATIVE EXAMPLE |

TABLE 17-continued

| EXPERIMENT EXAMPLE No. | STEEL TYPE | VOLUME FRACTION | | | | | | NOTE |
|---|---|---|---|---|---|---|---|---|
| | | α % | B % | tM % | RETAINED γ % | fM % | P + C % | |
| 106 | E | 25 | 52 | 8 | 13 | 2 | 0 | COMPARATIVE EXAMPLE |

Further, as for the experiment examples in which a test was not stopped out of the high-strength steel sheets and the high-strength galvanized steel sheets in Experiment examples No. 1 to No. 101, each solid-solution carbon content in the retained austenite was examined by the above-described method. Further, as for the experiment examples in which a test was not stopped, each proportion of interfaces with the tempered martensite or the fresh martensite to all the grain boundaries of retained austenite grains having an aspect ratio of 2.50 or less and a circle-equivalent diameter of 0.80 μm or more (proportion of interfaces) was examined by the above-described method. As for the experiment examples in which a test was not stopped, each density of the retained austenite grains having an aspect ratio of 2.50 or less and a circle-equivalent diameter of 0.80 μm or more was examined. These results are illustrated in Table 18 and Table 19. Each underline in Table 18 and Table 19 indicates that the corresponding numerical value is outside the range of the present invention.

TABLE 18

| EXPERIMENT EXAMPLE No. | RETAINED AUSTENITE | | | GALVANIZED LAYER | | HIGH-STRENGTH STEEL SHEET SURFACE | NOTE |
|---|---|---|---|---|---|---|---|
| | SOLID-SOLUTION CARBON CONTENT MASS % | PROPORTION OF INTERFACE % | DENSITY ×10$^{10}$ PIECE/m$^2$ | Fe CONTENT MASS % | Al CONTENT MASS % | | |
| 1 | 1.02 | 55 | 2.3 | — | — | CR | EXAMPLE |
| 2 | 1.11 | 66 | 3.7 | — | — | CR | EXAMPLE |
| 3 | 0.89 | 49 | 4.1 | — | — | CR | EXAMPLE |
| 4 | 1.07 | 44 | 2.4 | — | — | CR | EXAMPLE |
| 5 | 1.20 | 44 | 2.9 | — | — | CR | EXAMPLE |
| 6 | — | — | — | — | — | CR | COMPARATIVE EXAMPLE |
| 7 | 0.96 | 49 | 3.4 | — | — | CR | EXAMPLE |
| 8 | 1.01 | 31 | 4.0 | — | — | CR | EXAMPLE |
| 9 | 1.15 | 45 | 2.3 | — | — | CR | EXAMPLE |
| 10 | 1.00 | 29 | 4.2 | — | — | CR | EXAMPLE |
| 11 | 0.85 | 51 | 2.6 | — | — | CR | EXAMPLE |
| 12 | — | — | — | — | — | CR | COMPARATIVE EXAMPLE |
| 13 | 0.80 | 43 | 3.0 | 11.5 | 0.1 | GA | EXAMPLE |
| 14 | 0.76 | 38 | 2.2 | — | — | CR | EXAMPLE |
| 15 | 1.02 | 37 | 3.0 | — | — | CR | COMPARATIVE EXAMPLE |
| 16 | 1.15 | 25 | 2.6 | — | — | CR | EXAMPLE |
| 17 | 1.12 | 33 | 2.5 | — | — | CR | EXAMPLE |
| 18 | 0.94 | 28 | 2.0 | — | — | CR | COMPARATIVE EXAMPLE |
| 19 | 1.14 | 44 | 4.6 | — | — | CR | EXAMPLE |
| 20 | 1.20 | 57 | 3.4 | — | — | CR | EXAMPLE |
| 21 | 1.10 | <u>81</u> | 4.6 | — | — | CR | COMPARATIVE EXAMPLE |
| 22 | 0.95 | 49 | 3.2 | 9.1 | 0.2 | GA | EXAMPLE |
| 23 | 1.08 | 31 | 3.5 | — | — | CR | EXAMPLE |
| 24 | 1.20 | 39 | 4.2 | — | — | CR | COMPARATIVE EXAMPLE |
| 25 | 1.04 | 58 | 3.1 | 1.3 | 0.2 | GI | EXAMPLE |
| 26 | 0.88 | 49 | 3.4 | — | — | CR | EXAMPLE |
| 27 | 0.87 | 34 | 2.7 | — | — | CR | COMPARATIVE EXAMPLE |
| 28 | 0.97 | 40 | 2.2 | 10.0 | 0.3 | GA | EXAMPLE |
| 29 | 1.20 | 34 | 3.2 | — | — | CR | EXAMPLE |
| 30 | 0.89 | 42 | 3.7 | — | — | CR | EXAMPLE |
| 31 | 1.03 | 41 | 2.6 | — | — | CR | EXAMPLE |
| 32 | 1.25 | 32 | 2.2 | — | — | CR | EXAMPLE |
| 33 | — | — | — | — | — | CR | COMPARATIVE EXAMPLE |
| 34 | 1.18 | 37 | 3.5 | 8.5 | 0.1 | GA | EXAMPLE |
| 35 | 1.21 | 39 | 3.6 | — | — | CR | EXAMPLE |
| 36 | 1.17 | 34 | 3.8 | — | — | CR | COMPARATIVE EXAMPLE |
| 37 | 0.93 | 42 | 2.3 | 0.6 | 0.3 | GI | EXAMPLE |
| 38 | 1.14 | 49 | 2.2 | — | — | CR | EXAMPLE |
| 39 | 1.25 | 57 | 1.6 | — | — | CR | EXAMPLE |
| 40 | 0.95 | 37 | 3.7 | — | — | CR | EXAMPLE |

TABLE 18-continued

| EXPERIMENT EXAMPLE No. | RETAINED AUSTENITE ||| GALVANIZED LAYER || HIGH-STRENGTH STEEL SHEET SURFACE | NOTE |
| --- | --- | --- | --- | --- | --- | --- | --- |
| | SOLID-SOLUTION CARBON CONTENT MASS % | PROPORTION OF INTERFACE % | DENSITY ×10$^{10}$ PIECE/m$^2$ | Fe CONTENT MASS % | Al CONTENT MASS % | | |
| 41 | 1.19 | 47 | 4.3 | 10.1 | 0.1 | GA | EXAMPLE |
| 42 | 1.10 | 83 | 5.7 | — | — | CR | COMPARATIVE EXAMPLE |
| 43 | 1.16 | 15 | 1.4 | 2.4 | 0.2 | GI | EXAMPLE |
| 44 | 1.03 | 32 | 2.4 | — | — | CR | EXAMPLE |
| 45 | — | — | — | — | — | CR | COMPARATIVE EXAMPLE |
| 46 | 0.86 | 53 | 4.2 | — | — | CR | EXAMPLE |
| 47 | 0.96 | 39 | 3.3 | — | — | CR | EXAMPLE |
| 48 | 1.34 | 57 | 3.9 | — | — | CR | COMPARATIVE EXAMPLE |
| 49 | 1.21 | 52 | 2.8 | 1.4 | 0.2 | GI | EXAMPLE |
| 50 | 1.12 | 32 | 2.3 | 12.1 | 0.1 | GA | EXAMPLE |
| 51 | 1.00 | 61 | 2.9 | — | — | CR | EXAMPLE |
| 52 | 1.15 | 40 | 2.9 | — | — | CR | EXAMPLE |
| 53 | — | — | — | — | — | CR | COMPARATIVE EXAMPLE |

TABLE 19

| EXPERIMENT EXAMPLE No. | RETAINED AUSTENITE ||| GALVANIZED LAYER || HIGH-STRENGTH STEEL SHEET SURFACE | NOTE |
| --- | --- | --- | --- | --- | --- | --- | --- |
| | SOLID-SOLUTION CARBON CONTENT MASS % | PROPORTION OF INTERFACE % | DENSITY ×10$^{10}$ PIECE/m$^2$ | Fe CONTENT MASS % | Al CONTENT MASS % | | |
| 54 | TEST STOPPED |||||  X | COMPARATIVE EXAMPLE |
| 55 | 1.26 | 46 | 3.0 | — | — | CR | EXAMPLE |
| 56 | 0.88 | 44 | 1.9 | — | — | CR | EXAMPLE |
| 57 | 1.04 | 78 | 3.1 | — | — | CR | COMPARATIVE EXAMPLE |
| 58 | 1.20 | 46 | 2.5 | — | — | CR | EXAMPLE |
| 59 | 1.19 | 37 | 2.9 | — | — | CR | EXAMPLE |
| 60 | 0.89 | 46 | 4.2 | 9.5 | 0.1 | GA | EXAMPLE |
| 61 | 0.81 | 41 | 2.9 | 7.4 | 0.1 | GA | EXAMPLE |
| 62 | 1.01 | 34 | 3.0 | — | — | CR | EXAMPLE |
| 63 | 1.09 | 36 | 6.3 | — | — | CR | EXAMPLE |
| 64 | 0.74 | 44 | 3.7 | — | — | CR | EXAMPLE |
| 65 | 0.94 | 68 | 3.3 | — | — | CR | EXAMPLE |
| 66 | 0.79 | 32 | 2.4 | — | — | CR | COMPARATIVE EXAMPLE |
| 67 | 1.25 | 56 | 3.4 | 2.7 | 0.1 | GI | EXAMPLE |
| 68 | 0.98 | 57 | 4.2 | — | — | CR | EXAMPLE |
| 69 | 1.02 | 83 | 3.3 | — | — | CR | COMPARATIVE EXAMPLE |
| 70 | 0.78 | 58 | 4.1 | 7.7 | 0.1 | GA | EXAMPLE |
| 71 | 1.04 | 45 | 3.8 | — | — | CR | EXAMPLE |
| 72 | 1.11 | 59 | 4.6 | — | — | CR | EXAMPLE |
| 73 | 1.11 | 39 | 4.0 | 8.1 | 0.1 | GA | EXAMPLE |
| 74 | 1.06 | 37 | 4.3 | — | — | CR | EXAMPLE |
| 75 | 1.03 | 84 | 3.7 | — | — | CR | COMPARATIVE EXAMPLE |
| 76 | 1.21 | 55 | 2.0 | — | — | CR | EXAMPLE |
| 77 | 1.07 | 59 | 2.1 | 0.7 | 0.2 | GI | EXAMPLE |
| 78 | 1.17 | 62 | 1.4 | — | — | CR | COMPARATIVE EXAMPLE |
| 79 | 0.71 | 51 | 2.9 | — | — | CR | EXAMPLE |
| 80 | 0.87 | 55 | 3.8 | — | — | CR | EXAMPLE |
| 81 | 0.85 | 38 | 2.6 | 0.2 | 0.3 | GI | EXAMPLE |
| 82 | 0.94 | 51 | 2.4 | — | — | CR | EXAMPLE |
| 83 | 1.03 | 38 | 3.3 | 12.7 | 0.1 | GA | EXAMPLE |
| 84 | TEST STOPPED |||||  X | COMPARATIVE EXAMPLE |
| 85 | 1.08 | 48 | 1.7 | — | — | CR | EXAMPLE |
| 86 | 0.93 | 44 | 1.7 | — | — | CR | EXAMPLE |
| 87 | 0.86 | 64 | 1.3 | — | — | CR | COMPARATIVE EXAMPLE |
| 88 | 1.16 | 47 | 4.1 | — | — | CR | EXAMPLE |
| 89 | 0.89 | 47 | 4.6 | — | — | CR | EXAMPLE |
| 90 | 0.96 | 41 | 3.8 | — | — | CR | EXAMPLE |

TABLE 19-continued

| EXPERIMENT EXAMPLE No. | RETAINED AUSTENITE | | | GALVANIZED LAYER | | HIGH-STRENGTH STEEL SHEET SURFACE | NOTE |
|---|---|---|---|---|---|---|---|
| | SOLID-SOLUTION CARBON CONTENT MASS % | PROPORTION OF INTERFACE % | DENSITY ×10$^{10}$ PIECE/m$^2$ | Fe CONTENT MASS % | Al CONTENT MASS % | | |
| 91 | — | — | — | — | — | CR | COMPARATIVE EXAMPLE |
| 92 | 1.22 | 61 | <u>6.7</u> | — | — | CR | COMPARATIVE EXAMPLE |
| 93 | — | — | — | — | — | CR | COMPARATIVE EXAMPLE |
| 94 | | TEST STOPPED | | | | X | COMPARATIVE EXAMPLE |
| 95 | — | — | — | — | — | CR | COMPARATIVE EXAMPLE |
| 96 | | TEST STOPPED | | | | X | COMPARATIVE EXAMPLE |
| 97 | | TEST STOPPED | | | | X | COMPARATIVE EXAMPLE |
| 98 | 0.35 | 49 | 3.5 | — | — | CR | COMPARATIVE EXAMPLE |
| 99 | | TEST STOPPED | | | | X | COMPARATIVE EXAMPLE |
| 100 | 1.11 | 52 | 4.5 | — | — | CR | COMPARATIVE EXAMPLE |
| 101 | 0.94 | 56 | 3.7 | — | — | CR | COMPARATIVE EXAMPLE |
| 102 | 1.00 | 72 | 2.2 | — | — | CR | EXAMPLE |
| 103 | 0.99 | <u>89</u> | 2.0 | — | — | CR | COMPARATIVE EXAMPLE |
| 104 | 0.97 | 57 | 2.9 | — | — | CR | EXAMPLE |
| 105 | 0.98 | <u>79</u> | 2.8 | — | — | CR | COMPARATIVE EXAMPLE |
| 106 | 1.03 | <u>84</u> | 3.9 | — | — | CR | COMPARATIVE EXAMPLE |

As for the high-strength galvanized steel sheets each having had the hot-dip galvanized layer formed thereon out of Experiment examples No. 1 to No. 101, each Fe content and each Al content in the galvanized layer were examined by the above-described method. These results are illustrated in Table 18 and Table 19. Further, as for galvanized steel sheets for tempering treatment each having had the hot-dip galvanized layer formed thereon before the tempering step, each Fe content and each Al content in the galvanized layer were examined in the same manner as the high-strength galvanized steel sheet. These results are illustrated in Table 20 and Table 21. In Table 18 to Table 21, "GI" means that the hot-dip galvanized layer was formed on the surface, "GA" means that the alloyed galvanized layer was formed on the surface, "EG" means that the electrogalvanized layer was formed on the surface, and "CR" means that no galvanized layer was formed on the surface.

TABLE 20

| EXPERIMENT EXAMPLE No. | STEEL SHEET SURFACE FOR TEMPERING TREATMENT | GALVANIZED LAYER | | NOTE |
|---|---|---|---|---|
| | | Fe CONTENT MASS % | Al CONTENT MASS % | |
| 1 | CR | — | — | EXAMPLE |
| 2 | CR | — | — | EXAMPLE |
| 3 | CR | — | — | EXAMPLE |
| 4 | CR | — | — | EXAMPLE |
| 5 | CR | — | — | EXAMPLE |
| 6 | CR | — | — | COMPARATIVE EXAMPLE |
| 7 | CR | — | — | EXAMPLE |
| 8 | CR | — | — | EXAMPLE |
| 9 | CR | — | — | EXAMPLE |
| 10 | CR | — | — | EXAMPLE |
| 11 | CR | — | — | EXAMPLE |
| 12 | CR | — | — | COMPARATIVE EXAMPLE |
| 13 | CR | — | — | EXAMPLE |
| 14 | CR | — | — | EXAMPLE |
| 15 | CR | — | — | COMPARATIVE EXAMPLE |
| 16 | CR | — | — | EXAMPLE |
| 17 | CR | — | — | EXAMPLE |
| 18 | CR | — | — | COMPARATIVE EXAMPLE |
| 19 | CR | — | — | EXAMPLE |
| 20 | CR | — | — | EXAMPLE |
| 21 | CR | — | — | COMPARATIVE EXAMPLE |
| 22 | GA | 7.9 | 0.2 | EXAMPLE |
| 23 | CR | — | — | EXAMPLE |
| 24 | CR | — | — | COMPARATIVE EXAMPLE |
| 25 | GI | 1.2 | 0.2 | EXAMPLE |
| 26 | CR | — | — | EXAMPLE |
| 27 | CR | — | — | COMPARATIVE EXAMPLE |
| 28 | GI | 0.2 | 0.3 | EXAMPLE |
| 29 | CR | — | — | EXAMPLE |
| 30 | CR | — | — | EXAMPLE |
| 31 | CR | — | — | EXAMPLE |

TABLE 20-continued

| EXPERIMENT EXAMPLE No. | STEEL SHEET SURFACE FOR TEMPERING TREATMENT | GALVANIZED LAYER Fe CONTENT MASS % | GALVANIZED LAYER Al CONTENT MASS % | NOTE |
|---|---|---|---|---|
| 32 | CR | — | — | EXAMPLE |
| 33 | CR | — | — | COMPARATIVE EXAMPLE |
| 34 | GA | 8.4 | 0.1 | EXAMPLE |
| 35 | CR | — | — | EXAMPLE |
| 36 | CR | — | — | COMPARATIVE EXAMPLE |
| 37 | CR | — | — | EXAMPLE |
| 38 | CR | — | — | EXAMPLE |
| 39 | CR | — | — | EXAMPLE |
| 40 | CR | — | — | EXAMPLE |
| 41 | GA | 9.9 | 0.1 | EXAMPLE |
| 42 | CR | — | — | COMPARATIVE EXAMPLE |
| 43 | GI | 2.2 | 0.2 | EXAMPLE |
| 44 | CR | — | — | EXAMPLE |
| 45 | CR | — | — | COMPARATIVE EXAMPLE |
| 46 | CR | — | — | EXAMPLE |
| 47 | CR | — | — | EXAMPLE |
| 48 | CR | — | — | COMPARATIVE EXAMPLE |
| 49 | GI | 1.4 | 0.2 | EXAMPLE |
| 50 | GA | 12.1 | 0.1 | EXAMPLE |
| 51 | CR | — | — | EXAMPLE |
| 52 | CR | — | — | EXAMPLE |
| 53 | CR | — | — | COMPARATIVE EXAMPLE |

TABLE 21

| EXPERIMENT EXAMPLE No. | STEEL SHEET SURFACE FOR TEMPERING TREATMENT | GALVANIZED LAYER Fe CONTENT MASS % | GALVANIZED LAYER Al CONTENT MASS % | NOTE |
|---|---|---|---|---|
| 54 | TEST STOPPED | | | COMPARATIVE EXAMPLE |
| 55 | CR | — | — | EXAMPLE |
| 56 | CR | — | — | EXAMPLE |
| 57 | CR | — | — | COMPARATIVE EXAMPLE |
| 58 | CR | — | — | EXAMPLE |
| 59 | CR | — | — | EXAMPLE |
| 60 | GA | 9.3 | 0.1 | EXAMPLE |
| 61 | GA | 7.1 | 0.1 | EXAMPLE |
| 62 | CR | — | — | EXAMPLE |
| 63 | CR | — | — | EXAMPLE |
| 64 | CR | — | — | EXAMPLE |
| 65 | CR | — | — | EXAMPLE |
| 66 | CR | — | — | COMPARATIVE EXAMPLE |
| 67 | GI | 2.7 | 0.1 | EXAMPLE |
| 68 | CR | — | — | EXAMPLE |
| 69 | CR | — | — | COMPARATIVE EXAMPLE |
| 70 | GA | 7.6 | 0.1 | EXAMPLE |
| 71 | CR | — | — | EXAMPLE |
| 72 | CR | — | — | EXAMPLE |
| 73 | GA | 8.1 | 0.1 | EXAMPLE |
| 74 | CR | — | — | EXAMPLE |
| 75 | CR | — | — | COMPARATIVE EXAMPLE |
| 76 | CR | — | — | EXAMPLE |
| 77 | GI | 0.6 | 0.2 | EXAMPLE |
| 78 | CR | — | — | COMPARATIVE EXAMPLE |
| 79 | CR | — | — | EXAMPLE |
| 80 | CR | — | — | EXAMPLE |
| 81 | GI | 0.2 | 0.3 | EXAMPLE |
| 82 | CR | — | — | EXAMPLE |
| 83 | GA | 12.5 | 0.1 | EXAMPLE |
| 84 | TEST STOPPED | | | COMPARATIVE EXAMPLE |
| 85 | CR | — | — | EXAMPLE |
| 86 | CR | — | — | EXAMPLE |
| 87 | CR | — | — | COMPARATIVE EXAMPLE |
| 88 | CR | — | — | EXAMPLE |
| 89 | CR | — | — | EXAMPLE |
| 90 | CR | — | — | EXAMPLE |
| 91 | CR | — | — | COMPARATIVE EXAMPLE |
| 92 | CR | — | — | COMPARATIVE EXAMPLE |
| 93 | CR | — | — | COMPARATIVE EXAMPLE |
| 94 | TEST STOPPED | | | COMPARATIVE EXAMPLE |
| 95 | CR | — | — | COMPARATIVE EXAMPLE |
| 96 | TEST STOPPED | | | COMPARATIVE EXAMPLE |
| 97 | TEST STOPPED | | | COMPARATIVE EXAMPLE |
| 98 | CR | — | — | COMPARATIVE EXAMPLE |
| 99 | TEST STOPPED | | | COMPARATIVE EXAMPLE |
| 100 | CR | — | — | COMPARATIVE EXAMPLE |
| 101 | CR | — | — | COMPARATIVE EXAMPLE |
| 102 | CR | — | — | EXAMPLE |
| 103 | CR | — | — | COMPARATIVE EXAMPLE |
| 104 | CR | — | — | EXAMPLE |
| 105 | CR | — | — | COMPARATIVE EXAMPLE |
| 106 | CR | — | — | COMPARATIVE EXAMPLE |

There were examined a yield strength YS, a maximum tensile strength TS, hole expandability $\lambda$, ductility E1, and a Charpy impact property of the high-strength steel sheets and the high-strength galvanized steel sheets in Experiment examples No. 1 to No. 101 by the following methods. These results are illustrated in Table 22 to Table 25. Each underline in Table 22 to Table 25 indicates that the corresponding numerical value is outside the range of desired properties.

In a tensile test, a No. 5 test piece described in JIS Z 2201 was fabricated from the steel sheet, and by the method described in JIS Z2241, its yield strength YS, its maximum tensile strength TS, and its total elongation EL were found. A hole expansion test was performed by the method described in JIS Z 2256. The ductility (total elongation) E1 and the hole expandability $\lambda$ change with the maximum tensile strength TS, but it is set that in the case of (Expression 11) and (Expression 12) below being satisfied, the strength, the ductility, and the hole expandability are good.

$$TS \times E1 \geq 1.5 \times 10^4 \quad \text{(Expression 11)}$$

$$(YS \times TS)^{0.75} \times E1 \times \lambda^{0.5} \geq 2.0 \times 10^6 \quad \text{(Expression 12)}$$

As for the Charpy impact property, three sheets each having the same size as that of an impact test piece defined in JIS Z 2242 were taken in a direction perpendicular to the rolling direction (C direction) and they were layered to be fastened by bolts, and then by the method defined in JIS Z 2242, its Charpy absorbed energy at 20° C. ($vE_{20}$) and its Charpy absorbed energy at −20° C. ($vE_{-20}$) were measured. It is set that the impact resistance is good when (Expression 13) below is satisfied and $vE_{20}$ and $vE_{-20}$ both are 20 J/cm² or more.

$$(vE_{-20})/(vE_{20}) \geq 0.65 \quad \text{(Expression 13)}$$

Incidentally, as the value on the left side of (Expression 13) is closer to 1.0, the impact resistance is better, and the value of (Expression 13) is preferred to be 0.75 or more.

TABLE 22

| EXPERIMENT EXAMPLE No. | STEEL TYPE | TENSILE TEST YS MPa | TENSILE TEST TS MPa | TENSILE TEST EI % | HOLE EXPANSION TEST λ % | NOTE |
|---|---|---|---|---|---|---|
| 1 | A | 685 | 967 | 24 | 53 | EXAMPLE |
| 2 | A | 450 | 872 | 29 | 47 | EXAMPLE |
| 3 | A | 702 | 1138 | 15 | 66 | EXAMPLE |
| 4 | A | 756 | 1115 | 20 | 48 | EXAMPLE |
| 5 | A | 493 | 751 | 23 | 52 | EXAMPLE |
| 6 | A | 852 | 1134 | 11 | 52 | COMPARATIVE EXAMPLE |
| 7 | B | 903 | 1312 | 19 | 63 | EXAMPLE |
| 8 | B | 687 | 1049 | 20 | 53 | EXAMPLE |
| 9 | B | 589 | 963 | 27 | 41 | EXAMPLE |
| 10 | B | 675 | 995 | 24 | 44 | EXAMPLE |
| 11 | B | 882 | 1428 | 13 | 39 | EXAMPLE |
| 12 | B | 666 | 830 | 14 | 56 | COMPARATIVE EXAMPLE |
| 13 | C | 531 | 788 | 22 | 39 | EXAMPLE |
| 14 | C | 622 | 781 | 19 | 67 | EXAMPLE |
| 15 | C | 528 | 896 | 17 | 15 | COMPARATIVE EXAMPLE |
| 16 | D | 473 | 677 | 25 | 45 | EXAMPLE |
| 17 | D | 505 | 727 | 21 | 59 | EXAMPLE |
| 18 | D | 560 | 754 | 13 | 10 | COMPARATIVE EXAMPLE |
| 19 | E | 530 | 822 | 20 | 41 | EXAMPLE |
| 20 | E | 685 | 996 | 18 | 51 | EXAMPLE |
| 21 | E | 582 | 904 | 29 | 36 | COMPARATIVE EXAMPLE |
| 22 | F | 1027 | 1511 | 19 | 43 | EXAMPLE |
| 23 | F | 900 | 1491 | 17 | 58 | EXAMPLE |
| 24 | F | 712 | 1425 | 14 | 1 | COMPARATIVE EXAMPLE |
| 25 | G | 418 | 618 | 27 | 46 | EXAMPLE |
| 26 | G | 714 | 958 | 18 | 64 | EXAMPLE |
| 27 | G | 611 | 681 | 15 | 18 | COMPARATIVE EXAMPLE |
| 28 | H | 716 | 1034 | 24 | 45 | EXAMPLE |
| 29 | H | 662 | 1158 | 18 | 51 | EXAMPLE |
| 30 | H | 870 | 1020 | 17 | 58 | EXAMPLE |
| 31 | I | 664 | 1031 | 17 | 41 | EXAMPLE |
| 32 | I | 655 | 891 | 21 | 42 | EXAMPLE |
| 33 | I | 679 | 886 | 14 | 8 | COMPARATIVE EXAMPLE |
| 34 | J | 529 | 807 | 23 | 38 | EXAMPLE |
| 35 | J | 368 | 637 | 39 | 58 | EXAMPLE |
| 36 | J | 342 | 568 | 27 | 14 | COMPARATIVE EXAMPLE |
| 37 | K | 657 | 982 | 18 | 47 | EXAMPLE |
| 38 | K | 536 | 926 | 23 | 51 | EXAMPLE |
| 39 | K | 629 | 820 | 26 | 43 | EXAMPLE |
| 40 | L | 521 | 865 | 27 | 58 | EXAMPLE |
| 41 | L | 488 | 899 | 25 | 47 | EXAMPLE |
| 42 | L | 639 | 812 | 29 | 67 | COMPARATIVE EXAMPLE |
| 43 | M | 509 | 791 | 25 | 57 | EXAMPLE |
| 44 | M | 590 | 733 | 21 | 63 | EXAMPLE |
| 45 | M | 434 | 716 | 16 | 47 | COMPARATIVE EXAMPLE |
| 46 | N | 697 | 1007 | 21 | 46 | EXAMPLE |
| 47 | N | 573 | 968 | 19 | 51 | EXAMPLE |
| 48 | N | 475 | 768 | 15 | 46 | COMPARATIVE EXAMPLE |
| 49 | O | 761 | 1047 | 27 | 62 | EXAMPLE |
| 50 | O | 1157 | 1494 | 14 | 63 | EXAMPLE |
| 51 | O | 685 | 1332 | 23 | 41 | EXAMPLE |
| 52 | O | 785 | 944 | 22 | 32 | EXAMPLE |
| 53 | O | 793 | 1542 | 8 | 59 | COMPARATIVE EXAMPLE |

TABLE 23

| EXPERIMENT EXAMPLE No. | STEEL TYPE | TENSILE TEST YS MPa | TENSILE TEST TS MPa | TENSILE TEST EI % | HOLE EXPANSION TEST λ % | NOTE |
|---|---|---|---|---|---|---|
| 54 | O | TEST STOPPED | | | | COMPARATIVE EXAMPLE |
| 55 | P | 586 | 835 | 23 | 41 | EXAMPLE |
| 56 | P | 820 | 1075 | 16 | 67 | EXAMPLE |
| 57 | P | 676 | 899 | 23 | 45 | COMPARATIVE EXAMPLE |
| 58 | Q | 586 | 932 | 19 | 52 | EXAMPLE |
| 59 | Q | 610 | 1055 | 19 | 65 | EXAMPLE |
| 60 | Q | 683 | 1080 | 20 | 45 | EXAMPLE |
| 61 | Q | 755 | 1261 | 16 | 59 | EXAMPLE |
| 62 | Q | 729 | 1197 | 20 | 44 | EXAMPLE |
| 63 | Q | 671 | 1074 | 21 | 45 | EXAMPLE |
| 64 | R | 541 | 850 | 19 | 59 | EXAMPLE |
| 65 | R | 454 | 729 | 25 | 48 | EXAMPLE |
| 66 | R | 351 | 569 | 12 | 21 | COMPARATIVE EXAMPLE |
| 67 | S | 602 | 931 | 23 | 48 | EXAMPLE |
| 68 | S | 683 | 1108 | 20 | 51 | EXAMPLE |
| 69 | S | 739 | 1133 | 18 | 42 | COMPARATIVE EXAMPLE |
| 70 | T | 698 | 1182 | 25 | 55 | EXAMPLE |
| 71 | T | 596 | 1109 | 28 | 46 | EXAMPLE |
| 72 | T | 772 | 1032 | 31 | 56 | EXAMPLE |
| 73 | U | 655 | 1021 | 19 | 48 | EXAMPLE |
| 74 | U | 626 | 965 | 23 | 57 | EXAMPLE |
| 75 | U | 593 | 859 | 27 | 61 | COMPARATIVE EXAMPLE |
| 76 | V | 402 | 597 | 32 | 47 | EXAMPLE |
| 77 | V | 502 | 752 | 29 | 48 | EXAMPLE |
| 78 | V | 335 | 565 | 20 | 14 | COMPARATIVE EXAMPLE |
| 79 | W | 463 | 829 | 19 | 39 | EXAMPLE |
| 80 | W | 479 | 781 | 20 | 46 | EXAMPLE |
| 81 | W | 449 | 710 | 25 | 44 | EXAMPLE |
| 82 | X | 674 | 1020 | 23 | 57 | EXAMPLE |
| 83 | X | 537 | 812 | 22 | 47 | EXAMPLE |
| 84 | X | TEST STOPPED | | | | COMPARATIVE EXAMPLE |
| 85 | Y | 647 | 825 | 25 | 61 | EXAMPLE |
| 86 | Y | 556 | 742 | 29 | 65 | EXAMPLE |
| 87 | Y | 448 | 690 | 21 | 13 | COMPARATIVE EXAMPLE |
| 88 | Z | 512 | 1031 | 28 | 49 | EXAMPLE |
| 89 | Z | 829 | 1303 | 19 | 38 | EXAMPLE |

TABLE 23-continued

| EXPERIMENT EXAMPLE No. | STEEL TYPE | TENSILE TEST YS MPa | TENSILE TEST TS MPa | TENSILE TEST EI % | HOLE EXPANSION TEST λ % | NOTE |
|---|---|---|---|---|---|---|
| 90 | Z | 618 | 922 | 24 | 51 | EXAMPLE |
| 91 | AA | 469 | 667 | 17 | 62 | COMPARATIVE EXAMPLE |
| 92 | AB | 815 | 1148 | 6 | 2 | COMPARATIVE EXAMPLE |
| 93 | AC | 396 | 533 | 19 | 16 | COMPARATIVE EXAMPLE |
| 94 | AD | TEST STOPPED | | | | COMPARATIVE EXAMPLE |
| 95 | AE | 368 | 460 | 11 | 29 | COMPARATIVE EXAMPLE |
| 96 | AF | TEST STOPPED | | | | COMPARATIVE EXAMPLE |
| 97 | AG | TEST STOPPED | | | | COMPARATIVE EXAMPLE |
| 98 | AH | 730 | 1170 | 6 | 6 | COMPARATIVE EXAMPLE |
| 99 | AI | TEST STOPPED | | | | COMPARATIVE EXAMPLE |
| 100 | AJ | 673 | 952 | 8 | 11 | COMPARATIVE EXAMPLE |
| 101 | AK | 658 | 1071 | 5 | 12 | COMPARATIVE EXAMPLE |
| 102 | A | 691 | 982 | 23 | 51 | EXAMPLE |
| 103 | A | 675 | 1007 | 23 | 37 | COMPARATIVE EXAMPLE |
| 104 | B | 900 | 1328 | 18 | 58 | EXAMPLE |
| 105 | B | 879 | 1351 | 18 | 43 | COMPARATIVE EXAMPLE |
| 106 | E | 552 | 846 | 21 | 29 | COMPARATIVE EXAMPLE |

TABLE 24

| EXPERIMENT EXAMPLE No. | TS × EI | $(YS \times TS)^{0.75} \times EI \times \lambda^{0.5}$ | IMPACT TEST vE20 J/cm² | IMPACT TEST vE-20 J/cm² | IMPACT TEST (vE-20)/(vE20) | NOTE |
|---|---|---|---|---|---|---|
| 1 | $2.3 \times 10^4$ | $4.1 \times 10^6$ | 76 | 74 | 0.98 | EXAMPLE |
| 2 | $2.5 \times 10^4$ | $3.1 \times 10^6$ | 57 | 44 | 0.77 | EXAMPLE |
| 3 | $1.7 \times 10^4$ | $3.3 \times 10^6$ | 44 | 38 | 0.86 | EXAMPLE |
| 4 | $2.2 \times 10^4$ | $3.9 \times 10^6$ | 64 | 61 | 0.95 | EXAMPLE |
| 5 | $1.7 \times 10^4$ | $2.5 \times 10^6$ | 48 | 47 | 0.97 | EXAMPLE |
| 6 | $\underline{1.2 \times 10^4}$ | $2.4 \times 10^6$ | 49 | 48 | 0.98 | COMPARATIVE EXAMPLE |
| 7 | $2.5 \times 10^4$ | $5.4 \times 10^6$ | 82 | 75 | 0.92 | EXAMPLE |
| 8 | $2.1 \times 10^4$ | $3.6 \times 10^6$ | 49 | 49 | 1.01 | EXAMPLE |
| 9 | $2.6 \times 10^4$ | $3.6 \times 10^6$ | 72 | 71 | 0.98 | EXAMPLE |
| 10 | $2.4 \times 10^4$ | $3.7 \times 10^6$ | 66 | 61 | 0.92 | EXAMPLE |
| 11 | $1.9 \times 10^4$ | $3.1 \times 10^6$ | 66 | 62 | 0.94 | EXAMPLE |
| 12 | $\underline{1.2 \times 10^4}$ | $2.1 \times 10^6$ | 43 | 44 | 1.02 | COMPARATIVE EXAMPLE |
| 13 | $1.7 \times 10^4$ | $2.3 \times 10^6$ | 57 | 55 | 0.96 | EXAMPLE |
| 14 | $1.5 \times 10^4$ | $2.7 \times 10^6$ | 54 | 56 | 1.04 | EXAMPLE |
| 15 | $1.5 \times 10^4$ | $\underline{1.2 \times 10^6}$ | 53 | 51 | 0.97 | COMPARATIVE EXAMPLE |
| 16 | $1.7 \times 10^4$ | $2.3 \times 10^6$ | 56 | 53 | 0.94 | EXAMPLE |
| 17 | $1.5 \times 10^4$ | $2.4 \times 10^6$ | 52 | 50 | 0.97 | EXAMPLE |
| 18 | $\underline{9.8 \times 10^3}$ | $\underline{6.8 \times 10^5}$ | 36 | 36 | 1.01 | COMPARATIVE EXAMPLE |
| 19 | $1.6 \times 10^4$ | $2.2 \times 10^6$ | 41 | 38 | 0.93 | EXAMPLE |
| 20 | $1.8 \times 10^4$ | $3.1 \times 10^6$ | 48 | 43 | 0.90 | EXAMPLE |
| 21 | $2.6 \times 10^4$ | $3.4 \times 10^6$ | 59 | 22 | $\underline{0.38}$ | COMPARATIVE EXAMPLE |
| 22 | $2.9 \times 10^4$ | $5.5 \times 10^6$ | 66 | 58 | 0.88 | EXAMPLE |
| 23 | $2.5 \times 10^4$ | $5.1 \times 10^6$ | 51 | 47 | 0.93 | EXAMPLE |
| 24 | $2.0 \times 10^4$ | $\underline{4.5 \times 10^5}$ | 40 | $\underline{19}$ | $\underline{0.48}$ | COMPARATIVE EXAMPLE |
| 25 | $1.7 \times 10^4$ | $2.1 \times 10^6$ | 44 | 37 | 0.85 | EXAMPLE |
| 26 | $1.7 \times 10^4$ | $3.4 \times 10^6$ | 41 | 38 | 0.93 | EXAMPLE |
| 27 | $\underline{1.0 \times 10^4}$ | $1.0 \times 10^6$ | 30 | 31 | 1.03 | COMPARATIVE EXAMPLE |
| 28 | $2.5 \times 10^4$ | $4.1 \times 10^6$ | 69 | 70 | 1.01 | EXAMPLE |
| 29 | $2.1 \times 10^4$ | $3.3 \times 10^6$ | 52 | 54 | 1.03 | EXAMPLE |
| 30 | $1.7 \times 10^4$ | $3.7 \times 10^6$ | 49 | 45 | 0.91 | EXAMPLE |
| 31 | $1.8 \times 10^4$ | $2.6 \times 10^6$ | 46 | 42 | 0.92 | EXAMPLE |
| 32 | $1.9 \times 10^4$ | $2.9 \times 10^6$ | 76 | 76 | 1.00 | EXAMPLE |
| 33 | $\underline{1.2 \times 10^4}$ | $\underline{8.6 \times 10^5}$ | 45 | 25 | $\underline{0.56}$ | COMPARATIVE EXAMPLE |
| 34 | $1.9 \times 10^4$ | $2.4 \times 10^6$ | 50 | 46 | 0.91 | EXAMPLE |
| 35 | $2.5 \times 10^4$ | $3.2 \times 10^6$ | 58 | 57 | 0.99 | EXAMPLE |
| 36 | $1.5 \times 10^4$ | $\underline{9.3 \times 10^5}$ | 42 | 38 | 0.91 | COMPARATIVE EXAMPLE |

TABLE 24-continued

| EXPERIMENT EXAMPLE No. | TS × EI | $(YS \times TS)^{0.75} \times EI \times \lambda^{0.5}$ | IMPACT TEST vE20 J/cm² | vE-20 J/cm² | (vE-20)/ (vE20) | NOTE |
|---|---|---|---|---|---|---|
| 37 | $1.8 \times 10^4$ | $2.8 \times 10^6$ | 47 | 46 | 0.97 | EXAMPLE |
| 38 | $2.1 \times 10^4$ | $3.1 \times 10^6$ | 60 | 57 | 0.95 | EXAMPLE |
| 39 | $2.1 \times 10^4$ | $3.3 \times 10^6$ | 79 | 77 | 0.97 | EXAMPLE |
| 40 | $2.3 \times 10^4$ | $3.6 \times 10^6$ | 51 | 50 | 0.99 | EXAMPLE |
| 41 | $2.2 \times 10^4$ | $2.9 \times 10^6$ | 57 | 52 | 0.91 | EXAMPLE |
| 42 | $2.4 \times 10^4$ | $4.6 \times 10^6$ | 58 | <u>12</u> | 0.21 | COMPARATIVE EXAMPLE |
| 43 | $2.0 \times 10^4$ | $3.0 \times 10^6$ | 56 | 57 | 1.01 | EXAMPLE |
| 44 | $1.5 \times 10^4$ | $2.8 \times 10^6$ | 48 | 48 | 1.01 | EXAMPLE |
| 45 | <u>$1.1 \times 10^4$</u> | <u>$1.4 \times 10^6$</u> | 26 | 24 | 0.92 | COMPARATIVE EXAMPLE |
| 46 | $2.1 \times 10^4$ | $3.5 \times 10^6$ | 52 | 44 | 0.85 | EXAMPLE |
| 47 | $1.8 \times 10^4$ | $2.8 \times 10^6$ | 54 | 51 | 0.94 | EXAMPLE |
| 48 | <u>$1.2 \times 10^4$</u> | <u>$1.5 \times 10^6$</u> | 34 | 28 | 0.83 | COMPARATIVE EXAMPLE |
| 49 | $2.8 \times 10^4$ | $5.7 \times 10^6$ | 88 | 80 | 0.91 | EXAMPLE |
| 50 | $2.1 \times 10^4$ | $5.3 \times 10^6$ | 68 | 68 | 1.00 | EXAMPLE |
| 51 | $3.1 \times 10^4$ | $4.3 \times 10^6$ | 70 | 63 | 0.90 | EXAMPLE |
| 52 | $2.1 \times 10^4$ | $3.1 \times 10^6$ | 56 | 52 | 0.92 | EXAMPLE |
| 53 | <u>$1.2 \times 10^4$</u> | $2.3 \times 10^6$ | 24 | 24 | 0.98 | COMPARATIVE EXAMPLE |

TABLE 25

| EXPERIMENT EXAMPLE No. | TS × EI | $(YS \times TS)^{0.75} \times EI \times \lambda^{0.5}$ | IMPACT TEST vE20 J/cm² | vE-20 J/cm² | (vE-20)/ (vE20) | NOTE |
|---|---|---|---|---|---|---|
| 54 | | TEST STOPPED | | | | COMPARATIVE EXAMPLE |
| 55 | $1.9 \times 10^4$ | $2.7 \times 10^6$ | 55 | 53 | 0.96 | EXAMPLE |
| 56 | $1.7 \times 10^4$ | $3.8 \times 10^6$ | 53 | 52 | 0.98 | EXAMPLE |
| 57 | $2.1 \times 10^4$ | $3.4 \times 10^6$ | 66 | 42 | <u>0.63</u> | COMPARATIVE EXAMPLE |
| 58 | $1.8 \times 10^4$ | $2.8 \times 10^6$ | 50 | 50 | 0.99 | EXAMPLE |
| 59 | $2.0 \times 10^4$ | $3.5 \times 10^6$ | 62 | 60 | 0.97 | EXAMPLE |
| 60 | $2.2 \times 10^4$ | $3.4 \times 10^6$ | 57 | 54 | 0.94 | EXAMPLE |
| 61 | $2.0 \times 10^4$ | $3.7 \times 10^6$ | 57 | 56 | 0.98 | EXAMPLE |
| 62 | $2.4 \times 10^4$ | $3.8 \times 10^6$ | 58 | 59 | 1.02 | EXAMPLE |
| 63 | $2.3 \times 10^4$ | $3.5 \times 10^6$ | 52 | 36 | 0.69 | EXAMPLE |
| 64 | $1.6 \times 10^4$ | $2.6 \times 10^6$ | 41 | 39 | 0.95 | EXAMPLE |
| 65 | $1.8 \times 10^4$ | $2.4 \times 10^6$ | 54 | 44 | 0.82 | EXAMPLE |
| 66 | <u>$6.8 \times 10^3$</u> | <u>$5.2 \times 10^5$</u> | 24 | 23 | 0.96 | COMPARATIVE EXAMPLE |
| 67 | $2.1 \times 10^4$ | $3.3 \times 10^6$ | 57 | 52 | 0.92 | EXAMPLE |
| 68 | $2.2 \times 10^4$ | $3.7 \times 10^6$ | 47 | 39 | 0.84 | EXAMPLE |
| 69 | $2.0 \times 10^4$ | $3.2 \times 10^6$ | 58 | 31 | <u>0.53</u> | COMPARATIVE EXAMPLE |
| 70 | $3.0 \times 10^4$ | $5.1 \times 10^6$ | 62 | 50 | 0.80 | EXAMPLE |
| 71 | $3.1 \times 10^4$ | $4.4 \times 10^6$ | 64 | 58 | 0.91 | EXAMPLE |
| 72 | $3.2 \times 10^4$ | $6.2 \times 10^6$ | 71 | 56 | 0.79 | EXAMPLE |
| 73 | $1.9 \times 10^4$ | $3.1 \times 10^6$ | 48 | 47 | 0.98 | EXAMPLE |
| 74 | $2.2 \times 10^4$ | $3.8 \times 10^6$ | 60 | 58 | 0.96 | EXAMPLE |
| 75 | $2.3 \times 10^4$ | $4.0 \times 10^6$ | 60 | 31 | <u>0.51</u> | COMPARATIVE EXAMPLE |
| 76 | $1.9 \times 10^4$ | $2.4 \times 10^6$ | 56 | 53 | 0.94 | EXAMPLE |
| 77 | $2.2 \times 10^4$ | $3.1 \times 10^6$ | 71 | 65 | 0.91 | EXAMPLE |
| 78 | <u>$1.1 \times 10^4$</u> | $6.8 \times 10^5$ | 41 | 38 | 0.93 | COMPARATIVE EXAMPLE |
| 79 | $1.6 \times 10^4$ | $1.8 \times 10^6$ | 44 | 41 | 0.93 | EXAMPLE |
| 80 | $1.6 \times 10^4$ | $2.1 \times 10^6$ | 49 | 40 | 0.82 | EXAMPLE |
| 81 | $1.8 \times 10^4$ | $2.2 \times 10^6$ | 60 | 58 | 0.97 | EXAMPLE |
| 82 | $2.3 \times 10^4$ | $4.1 \times 10^6$ | 62 | 58 | 0.93 | EXAMPLE |
| 83 | $1.8 \times 10^4$ | $2.6 \times 10^6$ | 47 | 45 | 0.96 | EXAMPLE |
| 84 | | TEST STOPPED | | | | COMPARATIVE EXAMPLE |
| 85 | $2.1 \times 10^4$ | $3.9 \times 10^6$ | 80 | 76 | 0.95 | EXAMPLE |
| 86 | $2.2 \times 10^4$ | $3.8 \times 10^6$ | 66 | 65 | 0.99 | EXAMPLE |
| 87 | <u>$1.4 \times 10^4$</u> | $9.9 \times 10^5$ | 54 | 52 | 0.96 | COMPARATIVE EXAMPLE |
| 88 | $2.9 \times 10^4$ | $3.8 \times 10^6$ | 64 | 58 | 0.91 | EXAMPLE |

TABLE 25-continued

| EXPERIMENT EXAMPLE No. | TS × EI | $(YS \times TS)^{0.75} \times EI \times \lambda^{0.5}$ | IMPACT TEST vE20 J/cm² | vE-20 J/cm² | (vE-20)/ (vE20) | NOTE |
|---|---|---|---|---|---|---|
| 89 | $2.5 \times 10^4$ | $3.9 \times 10^6$ | 55 | 48 | 0.87 | EXAMPLE |
| 90 | $2.2 \times 10^4$ | $3.6 \times 10^6$ | 53 | 51 | 0.97 | EXAMPLE |
| 91 | $\underline{1.1 \times 10^4}$ | $\underline{1.8 \times 10^6}$ | 38 | 36 | 0.95 | COMPARATIVE EXAMPLE |
| 92 | $\underline{6.9 \times 10^3}$ | $\underline{2.6 \times 10^5}$ | $\underline{12}$ | $\underline{10}$ | 0.85 | COMPARATIVE EXAMPLE |
| 93 | $\underline{1.0 \times 10^4}$ | $\underline{7.5 \times 10^5}$ | 35 | 28 | 0.81 | COMPARATIVE EXAMPLE |
| 94 | | TEST STOPPED | | | | COMPARATIVE EXAMPLE |
| 95 | $\underline{5.1 \times 10^3}$ | $\underline{4.9 \times 10^5}$ | 29 | 23 | 0.78 | COMPARATIVE EXAMPLE |
| 96 | | TEST STOPPED | | | | COMPARATIVE EXAMPLE |
| 97 | | TEST STOPPED | | | | COMPARATIVE EXAMPLE |
| 98 | $\underline{7.0 \times 10^3}$ | $\underline{4.1 \times 10^5}$ | $\underline{17}$ | $\underline{13}$ | 0.79 | COMPARATIVE EXAMPLE |
| 99 | | TEST STOPPED | | | | COMPARATIVE EXAMPLE |
| 100 | $\underline{7.6 \times 10^3}$ | $\underline{6.0 \times 10^5}$ | $\underline{19}$ | $\underline{19}$ | 1.00 | COMPARATIVE EXAMPLE |
| 101 | $\underline{5.4 \times 10^3}$ | $\underline{4.2 \times 10^5}$ | $\underline{13}$ | $\underline{11}$ | 0.86 | COMPARATIVE EXAMPLE |
| 102 | $2.2 \times 10^4$ | $3.9 \times 10^6$ | 74 | 53 | 0.71 | EXAMPLE |
| 103 | $2.3 \times 10^4$ | $3.3 \times 10^6$ | 66 | 38 | $\underline{0.57}$ | COMPARATIVE EXAMPLE |
| 104 | $2.4 \times 10^4$ | $4.9 \times 10^6$ | 77 | 65 | 0.84 | EXAMPLE |
| 105 | $2.4 \times 10^4$ | $4.2 \times 10^6$ | 62 | 34 | $\underline{0.54}$ | COMPARATIVE EXAMPLE |
| 106 | $1.8 \times 10^4$ | $2.0 \times 10^6$ | 43 | 25 | $\underline{0.58}$ | COMPARATIVE EXAMPLE |

Experiment example No. 91 is an example in which the content of C was small to fail to obtain the retained austenite, thus leading to deterioration in formability.

In Experiment example No. 92, C is contained excessively, and thus the fraction of the retained austenite becomes excessive, leading to deterioration in impact property.

Experiment example No. 93 is an example in which the contents of Si, Mn, and Al were small and the parameter Q0 was too small, to thus fail to obtain the retained austenite, leading to deterioration in properties.

Experiment example No. 94 is an example in which Si is contained excessively, and the test was stopped because the property of the slab deteriorated and the slab fractured in the casting step.

Experiment example No. 95 is an example in which the content of Mn was small, the hardenability became short, and the pearlite was generated, to thus fail to obtain the retained austenite, leading to deterioration in properties.

Experiment example No. 96 is an example in which Mn is contained excessively, and the test was stopped because the property of the slab deteriorated and the slab fractured during heating in the hot rolling step.

Experiment example No. 97 is an example in which P is contained excessively, and the test was stopped because the property of the slab deteriorated and the slab fractured during transfer from the casting step to the hot rolling step.

Experiment example No. 98 is an example in which S is contained excessively, and a large amount of coarse sulfide is generated in the steel, thus leading to great deterioration in formability and impact resistance of the steel sheet.

Experiment example No. 99 is an example in which Al is contained excessively, and the test was stopped because the property of the slab deteriorated and the slab fractured in the casting step.

Experiment example No. 100 is an example in which N is contained excessively, and a large amount of coarse nitrides are generated in the steel, thus leading to great deterioration in formability and impact resistance of the steel sheet.

Experiment example No. 101 is an example in which O is contained excessively, and a large amount of coarse oxide is generated in the steel, leading to great deterioration in formability and impact resistance of the steel sheet.

In Experiment example No. 84, the test was stopped because the slab heating temperature in the hot rolling step was low, the formability of the hot-rolled steel sheet was impaired greatly, and the steel sheet fractured in the cold rolling step.

In Experiment example No. 54, the test was stopped because the rolling completing temperature in the hot rolling step was low and the shape of the hot-rolled steel sheet was impaired greatly.

Experiment example No. 75 is an example in which the average cooling rate in the range of 850° C. to 700° C. in the hot rolling step is slow, the uneven arrangement of hard structures increases, and the proportion of interfaces of the retained austenite with the tempered martensite increases, leading to deterioration in impact property.

Experiment example No. 57 is an example in which the coil cooling rate in the hot rolling step is low, the uneven arrangement of hard structures increases, and the proportion of interfaces of the retained austenite with the tempered martensite increases, leading to deterioration in impact property.

Experiment examples No. 103 and No. 105 each are an example in which the coil cooling rate in the hot rolling step is high, the uneven arrangement of hard structures increases, and the proportion of interfaces of the retained austenite with the tempered martensite increases, leading to deterioration in impact property.

Experiment example No. 106 is an example in which the coiling tempered $T_c$ in the hot rolling is high, the uneven arrangement of Mn increases, and the proportion of interfaces of the retained austenite with the tempered martensite increases, leading to deterioration in impact property.

Experiment example No. 42 is an example in which the average heating rate in the range of $A_{C1}$ point to ($A_{C1}$ point+25)° C. in the annealing step is low, the uneven arrangement of hard structures increases, the proportion of interfaces of the retained austenite with the tempered martensite increases and the retained austenite grains become coarse, thus leading to deterioration in impact property.

Experiment example No. 87 is an example in which the maximum heating temperature $T_{max}$ in the annealing step is low and a large amount of coarse carbide has remained unmelted, and thus the percentage of the total of the pearlite and the cementite increases, leading to deterioration in formability.

Experiment example No. 21 and Experiment example No. 69 each are an example in which the parameter Q1 relating to the maximum heating temperature $T_{max}$ and the retention time $t_{max}$ in the annealing step is too large, the uneven arrangement of hard structures increases, and the proportion of interfaces of the retained austenite with the tempered martensite increases, leading to deterioration in impact property.

Experiment example No. 78 is an example in which the average cooling rate in the range of (maximum heating temperature−10° C.) to 650° C. (first cooling rate) in the annealing step is low and a large amount of soft pearlite is generated during cooling, leading to deterioration in the balance between strength and formability of the steel sheet.

Experiment example No. 36 is an example in which the average cooling rate in the range of 650° C. to 500° C. (second cooling rate) in the annealing step is low and a large amount of soft pearlite is generated during cooling, leading to deterioration in the balance between strength and formability of the steel sheet.

Experiment example No. 12 is an example in which the parameter Q2 relating to the average process temperature L and the process time $T_B$ of the bainite transformation step is too small and the bainite transformation did not progress sufficiently, and is an example in which neither tempered martensite nor retained austenite is obtained, leading to deterioration in formability.

Experiment example No. 45 is an example in which the parameter Q2 relating to the average process temperature $T_i$ and the process time $T_B$ of the bainite transformation step is too large and the bainite transformation progressed sufficiently, resulting in that neither tempered martensite nor retained austenite is obtained, leading to deterioration in the balance between strength and formability.

Experiment example No. 27 is an example in which the average cooling rate from the bainite transformation step to the martensite transformation step, namely the third cooling rate is low, a large amount of lower bainite is generated, no tempered martensite is obtained, and the content of the fresh martensite is large, leading to deterioration in formability.

Experiment example No. 6 is an example in which the cooling stop temperature in the martensite transformation step fell below the Mf point, resulting in that no retained austenite is obtained, leading to deterioration in formability.

Experiment example No. 24 is an example in which the cooling stop temperature in the martensite transformation step exceeded the Mf point, and is an example in which no tempered martensite is obtained and a part of the austenite was transformed into the fresh martensite after the tempering treatment, thus leading to deterioration in the balance between strength and formability.

Experiment example No. 53 is an example in which excessive cold rolling was performed between the martensite transformation step and the tempering treatment step, and is an example in which the retained austenite formed in the martensite transformation step was transformed by rolling and after the tempering treatment, the retained austenite disappeared, leading to deterioration in the balance between strength and formability.

Experiment example No. 15 is an example in which the tempering temperature $T_{tem}$ in the tempering treatment step fell below 200° C., the martensite was not tempered sufficiently, and a large amount of the fresh martensite remained, thus leading to deterioration in the balance between strength and formability and impact resistance.

Experiment example No. 18 is an example in which the parameter Q3 relating to the tempering temperature $T_{tem}$ and the treatment time $t_{tem}$ in the tempering treatment step is too small, the martensite was not tempered sufficiently, and a large amount of the fresh martensite remained, thus leading to deterioration in the balance between strength and formability and impact resistance.

Experiment example No. 48 is an example in which the parameter Q4 relating to the tempering temperature $T_{tem}$ and the treatment time $t_{tem}$ in the tempering treatment step is too large and the solid-solution C content in the retained austenite increases excessively, leading to deterioration in the balance between strength and formability.

Experiment examples No. 33 and No. 66 each are an example in which the parameter Q5 relating to the tempering temperature $T_{tem}$ and the treatment time $t_{tem}$ in the tempering treatment step is too large and a large amount of pearlite is generated, leading to deterioration in the balance between strength and formability.

In Experiment examples No. 15, No. 18, No. 33, No. 48, and No. 66, it was possible to obtain a desired steel sheet for tempering treatment, but the subsequent tempering treatment is inappropriate, the microstructure is not controlled appropriately, and the property after the tempering becomes inferior.

Experiment examples No. 1 to No. 5, No. 7 to No. 11, No. 13, No. 14, No. 16, No. 17, No. 19, No. 20, No. 22, No. 23, No. 25, No. 26, No. 28 to No. 32, No. 34, No. 35, No. 37 to No. 41, No. 43, No. 44, No. 46, No. 47, No. 49 to No. 52, No. 55, No. 56, No. 58 to No. 62, No. 64, No. 65, No. 67, No. 68, No. 70 to No. 74, No. 76, No. 77, No. 79 to No. 83, No. 85, No. 86, No. 88 to No. 90, No. 102, and No. 104 each are in conformity with the present invention and an example in which the high-strength steel sheet excellent in formability and impact resistance can be obtained.

Experiment example No. 29 is an example in which the softening treatment is performed between the hot rolling step and the cold rolling step and the high-strength steel sheet excellent in formability and impact resistance can be obtained.

Experiment example No. 3 is an example in which the softening treatment is performed between the hot rolling step and the cold rolling step and the cold rolling is performed between the martensite transformation step and the tempering step and the high-strength steel sheet excellent in formability and impact resistance can be obtained.

Experiment examples No. 46 and No. 52 each are an example in which the cooling stop temperature before the bainite transformation step, namely the second cooling stop temperature is set to fall within the range of Ms* point or less and Mf* point or more, the cooling is stopped at the second cooling stop temperature, reheating is performed up to a temperature of 340 to 500° C. to then perform the bainite transformation process, and a part of the microstructure is transformed into martensite before the bainite transformation. Experiment examples No. 46 and No. 52 each are an example in which the high-strength steel sheet having a particularly excellent impact resistance can be obtained.

Experiment examples No. 4, No. 9, No. 10, No. 17, No. 19, No. 30, and No. 79 each are an example in which the cold rolling is performed between the martensite transformation step and the tempering step and the high-strength steel sheet excellent in formability and impact resistance can be obtained.

Experiment example No. 2 is an example in which the cold rolling is performed between the martensite transformation step and the tempering step and the electrogalvanizing is performed after the tempering treatment, and thereby the high-strength galvanized steel sheet excellent in formability and impact resistance can be obtained.

Experiment examples No. 25, No. 43, No. 49, and No. 67 each are an example in which between the annealing step and the bainite transformation step, the steel sheet is immersed in the galvanizing bath and the high-strength galvanized steel sheet excellent in formability and impact resistance can be obtained.

Experiment examples No. 77 and No. 81 each are an example in which between the bainite transformation step and the martensite transformation step, the steel sheet is immersed in the galvanizing bath and the high-strength galvanized steel sheet excellent in formability and impact resistance can be obtained.

Experiment example No. 37 is an example in which in the tempering treatment step, the steel sheet is immersed in the galvanizing bath and the high-strength galvanized steel sheet excellent in formability and impact resistance can be obtained.

Experiment example No. 50 is an example in which between the annealing step and the bainite transformation step, the steel sheet is immersed in the galvanizing bath, and then immediately, is subjected to the alloying treatment and the high-strength galvanized steel sheet excellent in formability and impact resistance can be obtained.

Experiment examples No. 22 and No. 83 each are an example in which between the annealing step and the bainite transformation step, the steel sheet is immersed in the galvanizing bath, and then immediately, is subjected to the alloying treatment, the coating film made of the composite oxide containing phosphorus oxide and phosphorus is applied on the galvanized layer after the tempering treatment, and the high-strength galvanized steel sheet excellent in formability and impact resistance can be obtained.

Experiment example No. 60 is an example in which between the hot rolling step and the cold rolling step, the softening treatment is performed, between the annealing step and the bainite transformation step, the steel sheet is immersed in the galvanizing bath, and then immediately, is subjected to the alloying treatment, and the high-strength galvanized steel sheet excellent in formability and impact resistance can be obtained.

Experiment examples No. 34, No. 41, and No. 73 each are an example in which between the bainite transformation step and the martensite transformation step, the steel sheet is immersed in the galvanizing bath, and then immediately, is subjected to the alloying treatment, and the high-strength galvanized steel sheet excellent in formability and impact resistance can be obtained.

Experiment example No. 13 is an example in which in the tempering step, the steel sheet is immersed in the galvanizing bath, and further is subjected to the alloying treatment, and the high-strength galvanized steel sheet excellent in formability and impact resistance can be obtained.

Experiment example No. 70 is an example in which between the annealing step and the bainite transformation step, the steel sheet is immersed in the galvanizing bath, between the bainite transformation step and the martensite transformation step, the steel sheet is subjected to the alloying treatment, and the high-strength galvanized steel sheet excellent in formability and impact resistance can be obtained.

Experiment example No. 61 is an example in which between the annealing step and the bainite transformation step, the steel sheet is immersed in the galvanizing bath, the cooling stop temperature before the bainite transformation step, namely the second cooling stop temperature is set to fall within the range of Ms* point or less and Mf* point or more, between the bainite transformation step and the martensite transformation step, the steel sheet is subjected to the alloying treatment, and the high-strength steel sheet having a particularly excellent impact resistance can be obtained.

Experiment example No. 28 is an example in which between the bainite transformation step and the martensite transformation step, the steel sheet is immersed in the galvanizing bath, and in the tempering treatment step, is subjected to the alloying treatment, and the high-strength galvanized steel sheet excellent in formability and impact resistance can be obtained.

Experiment example No. 65 is an example in which between the martensite transformation step and the tempering step, the steel sheet is subjected to the electrogalvanizing treatment, and in the tempering treatment step, subjected to the alloying treatment, and the high-strength galvanized steel sheet excellent in formability and impact resistance can be obtained.

INDUSTRIAL APPLICABILITY

The present invention can be utilized for industries relating to a high-strength steel sheet and a high-strength galvanized steel sheet such as automobile steel sheets, for example.

The invention claimed is:
1. A high-strength steel sheet, comprising:
a chemical composition represented by, in mass %,
C: 0.075 to 0.400%,
Si: 0.01 to 2.50%,
Mn: 0.50 to 3.50%,
P: 0.1000% or less,
S: 0.0100% or less,
Al: 2.000% or less,
N: 0.0100% or less,
O: 0.0100% or less,
Ti: 0.000 to 0.200%,
Nb: 0.000 to 0.100%,
V: 0.000 to 0.500%,
Cr: 0.00 to 2.00%,
Ni: 0.00 to 2.00%,

Cu: 0.00 to 2.00%,
Mo: 0.00 to 1.00%,
B: 0.0000 to 0.0100%,
W: 0.00 to 2.00%,
one type or two types or more selected from the group consisting of Ca, Ce, Mg, Zr, La, and REM: 0.0000 to 0.0100% in total,
a balance: Fe and impurities, and
a parameter Q0 expressed by (Expression 1): 0.35 or more; and
a microstructure represented by, in a 1/8 thickness to 3/8 thickness range with 1/4 thickness of a sheet thickness from a surface being a middle, in volume fraction,
ferrite: 85% or less,
bainite: 3% or more and 95% or less,
tempered martensite: 1% or more and 80% or less,
retained austenite: 1% or more and 25% or less,
pearlite and coarse cementite: 5% or less in total, and
fresh martensite: 5% or less, wherein
a solid-solution carbon content in the retained austenite is 0.70 to 1.30 mass %, and
in all grain boundaries of retained austenite grains having an aspect ratio of 2.50 or less and a circle-equivalent diameter of 0.80 μm or more, a proportion of interfaces with the tempered martensite or the fresh martensite is 75% or less, $$Q0 = Si + 0.1Mn + 0.6Al \quad \text{(Expression 1)}$$

wherein Si, Mn, and Al are set to the contents of the respective elements in mass %.

2. The high-strength steel sheet according to claim 1, further containing:
in mass %,
one type or two types or more selected from the group consisting of
Ti: 0.001 to 0.200%,
Nb: 0.001 to 0.100%, and
V: 0.001 to 0.500%.

3. The high-strength steel sheet according to claim 1, further containing:
in mass %,
one type or two types or more selected from the group consisting of
Cr: 0.01 to 2.00%,
Ni: 0.01 to 2.00%,
Cu: 0.01 to 2.00%,
Mo: 0.01 to 1.00%,
B: 0.0001 to 0.0100%, and
W: 0.01 to 2.00%.

4. The high-strength steel sheet according to claim 1, further containing:
in mass %,
0.0001 to 0.0100% in total of one type or two types or more selected from the group consisting of Ca, Ce, Mg, Zr, La, and REM.

5. The high-strength steel sheet according to claim 1, wherein
a density of the retained austenite grains having an aspect ratio of 2.50 or less and a circle-equivalent diameter of 0.80 μm or more is $5.0 \times 10^{10}$ piece/m$^2$ or less.

6. A high-strength galvanized steel sheet, comprising:
a galvanized layer formed on a surface of the high-strength steel sheet according to claim 1.

7. The high-strength galvanized steel sheet according to claim 6, wherein
an Fe content in the galvanized layer is 3.0 mass % or less.

8. The high-strength galvanized steel sheet according to claim 6, wherein
an Fe content in the galvanized layer is 7.0 mass % or more and 13.0 mass % or less.

* * * * *